(12) United States Patent
Yamada et al.

(10) Patent No.: US 7,713,129 B2
(45) Date of Patent: May 11, 2010

(54) IMAGE PROCESSING SYSTEM

(75) Inventors: Yoichi Yamada, Kyoto (JP); Tomoaki Yoshinobu, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1507 days.

(21) Appl. No.: 10/912,047

(22) Filed: Aug. 6, 2004

(65) Prior Publication Data

US 2005/0007384 A1  Jan. 13, 2005

Related U.S. Application Data

(62) Division of application No. 10/440,128, filed on May 19, 2003, now Pat. No. 6,970,177.

(30) Foreign Application Priority Data

| May 17, 2002 | (JP) | ............................. 2002-142476 |
| Apr. 2, 2003 | (JP) | ............................. 2003-098829 |

(51) Int. Cl.
  *A63F 9/24*   (2006.01)
  *A63F 13/00*  (2006.01)
  *G06F 17/00*  (2006.01)
  *G06F 19/00*  (2006.01)
(52) U.S. Cl. ............................ 463/44; 463/39; 463/40; 463/42; 463/43
(58) Field of Classification Search .................. 463/39, 463/40, 42–44
 See application file for complete search history.

(56) References Cited

U.S. PATENT DOCUMENTS

| 6,120,379 | A  | * | 9/2000  | Tanaka et al. ................. 463/44 |
| 6,690,376 | B1 | * | 2/2004  | Saito et al. ................... 345/473 |
| 6,811,492 | B1 | * | 11/2004 | Arakawa et al. ............... 463/47 |
| 6,894,686 | B2 | * | 5/2005  | Stamper et al. ............. 345/419 |
| 2002/0065137 | A1 | * | 5/2002 | Tonomura ..................... 463/43 |
| 2002/0082082 | A1 |   | 6/2002 | Stamper et al. |

FOREIGN PATENT DOCUMENTS

| EP | 1 033 649   | 9/2000 |
| JP | 11-144040   | 5/1999 |

* cited by examiner

*Primary Examiner*—John M Hotaling, II
*Assistant Examiner*—Adetokunbo Torimiro
(74) *Attorney, Agent, or Firm*—Nixon & Vanderhye P.C.

(57) ABSTRACT

An image processing system includes a fixed-type game machine and a hand-held type game machine. To the hand-held type game machine, an imaging cartridge is attached, and therefore, when an operator photographs a face image of a desired object, for example, face image data corresponding thereto is produced. In addition, by operating an operating switch of the hand-held type game machine, the operator can input feature data representing a feature of the object. The hand-held type game machine transmits the face image data and the feature data to the fixed-type game machine. The fixed-type game machine deforms provisional three-dimensional character data selected by the operator based on the feature data, and attaches the face image data to the deformed provisional three-dimensional feature data so as to compose an image. A composed image is displayed on an image display device by an animation based on the feature data.

10 Claims, 37 Drawing Sheets

FIG.6
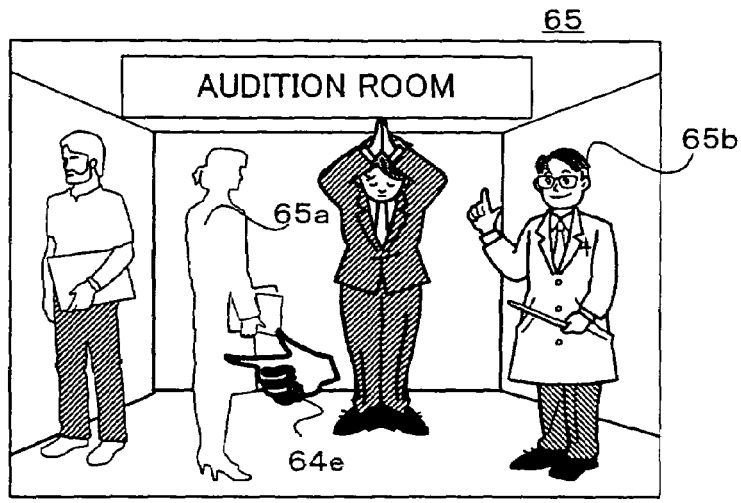
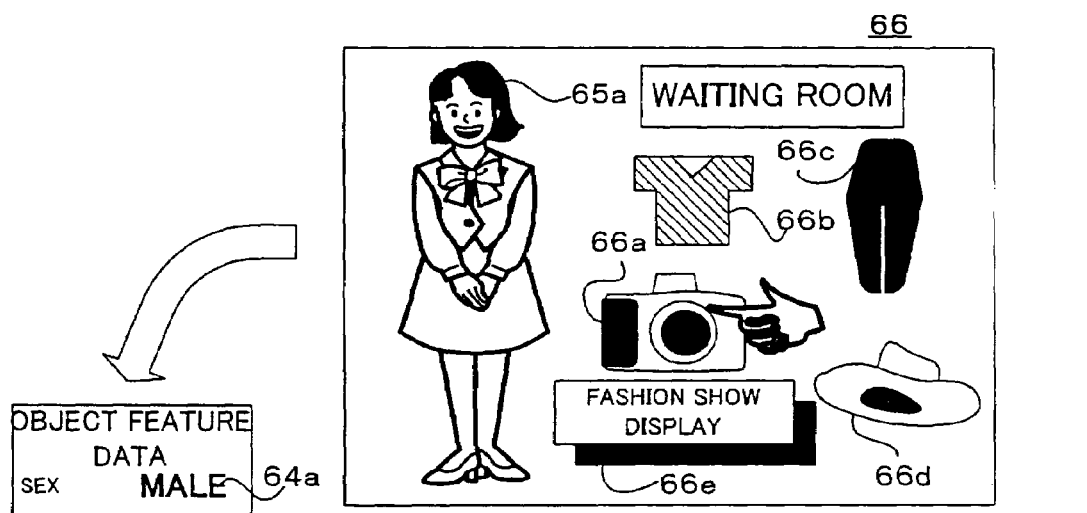
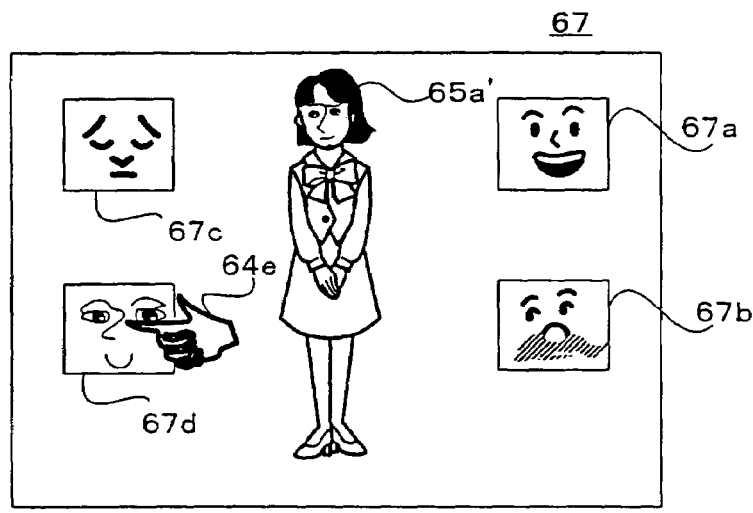

FIG.8
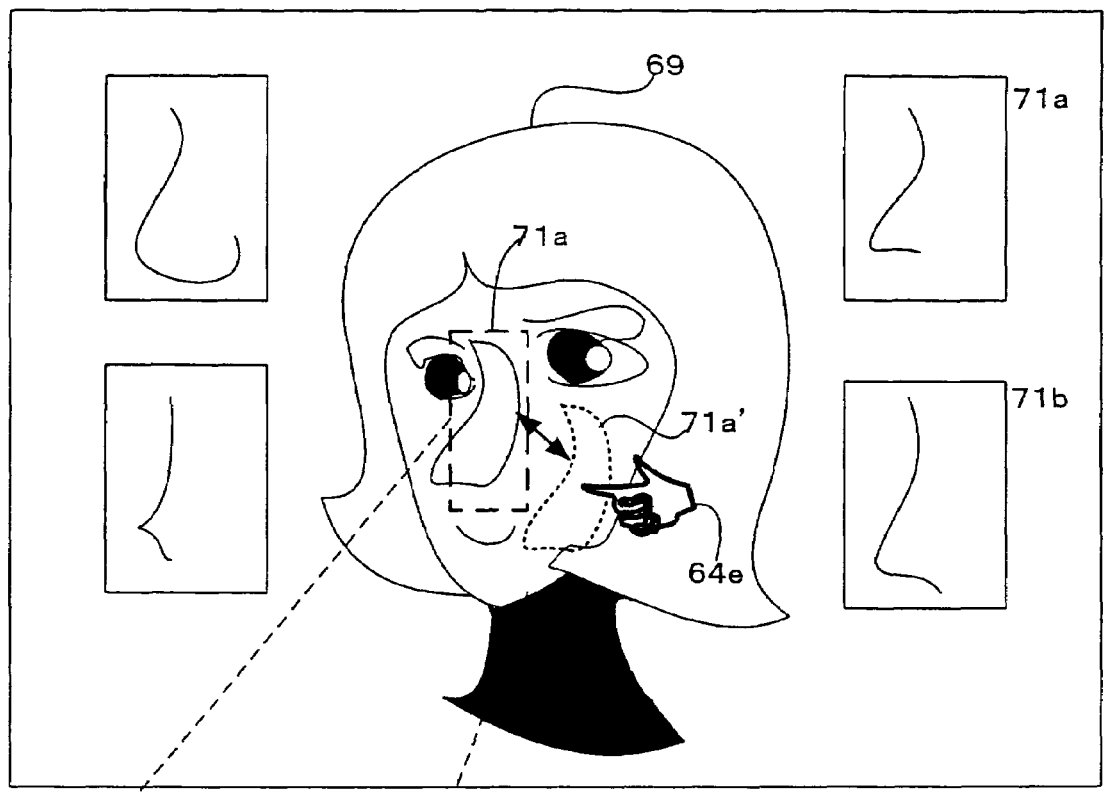
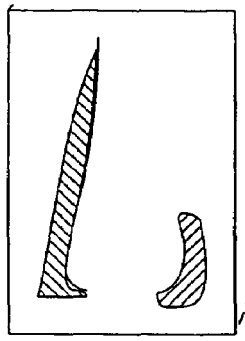
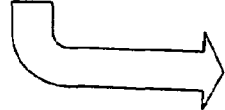
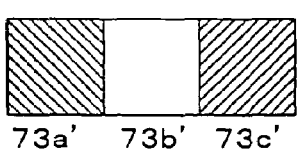
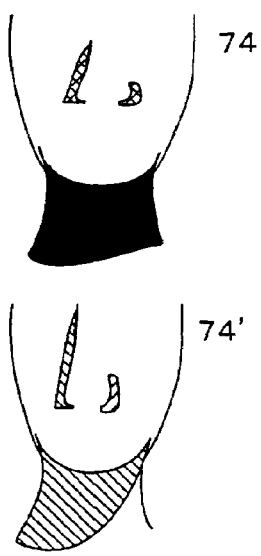

FIG.11  FIXED-TYPE GAME MACHINE 11(CPU11a)

FIG.18

CONTENTS OF DATA RECORDED IN CARD 23a

- NAME
- DISTINCTION OF SEX
- HEIGHT
- WEIGHT
- AGE
- BIRTHDAY
- CHARACTER
- HOBBY
- COMMENT
- PROFESSION
- FACE IMAGE
- SHAPE OF BODY (LENGTH AND THICKNESS OF HEAD, HAND, LEG, ARM)
- HAIR MODEL ID, COLOR ID, PATTERN ID
- NOSE MODEL ID, SIZE, POSITION
- EAR MODEL ID, SIZE
- JACKET MODEL ID, COLOR ID, PATTERN ID
- SHIRT MODEL ID, COLOR ID, PATTERN ID
- SLACK MODEL ID, COLOR ID, PATTERN ID
- PANTS MODEL ID, COLOR ID, PATTERN ID
- STOCKINGS MODEL ID, COLOR ID, PATTERN ID
- SHOES MODEL ID, COLOR ID, PATTERN ID
- ACCESSORIES MODEL ID, COLOR ID, PATTERN ID

FIG.19

MEMORY MAP OF ROM 23b

80

PROGRAM STORING AREA 81

| FACE IMAGE FETCHING PROGRAM STORING REGION | 81a |
| IMAGE FEATURE DATA FETCHING PROGRAM STORING REGION | 81b |
| DATA TRANSMITTING PROGRAM STORING REGION | 81c |

DATA STORING AREA 82

| IMAGE DATA FOR CARD READER PROGRAM STORING REGION | 82a |
| SOUND DATA FOR CARD READER PROGRAM STORING REGION | 82b |

FIG.20

MEMORY MAP OF RAM 11b

40

PROGRAM STORING AREA 41

| ACTOR SELECTING PROGRAM | 42 |

ACTOR EDITING PROGRAM 43

| ACTOR DISPLAYING PROGRAM | 43a |
| DATA RECEIVING PROGRAM | 43b |
| FACE IMAGE PASTING PROGRAM | 43c |
| ACTOR DEFORMING PROGRAM | 43d |
| ACTOR CLOTHES-CHANGING PROGRAM | 43e |
| ACTOR COLORING PROGRAM | 43f |
| COLOR ADJUSTING PROGRAM | 43g |
| FEATURE DATA EDITING PROGRAM | 43h |

| ANIMATION PROGRAM | 44 |

DATA STORING AREA 51

| RECEIVED DATA STORING REGION | 52 |
| ACTOR POLYGON DATA | 53 |
| ACTOR COLOR PALETTE DATA | 54 |
| DATA FOR COLOR ADJUSTMENT | 55 |
| DATA FOR CHANGING CLOTHES OF ACTOR | 56 |
| ANIMATION DATA | 57 |
| DATA FOR IMAGE PRODUCING PROGRAM | 58 | ved from the operator. The photographed images can be displayed on an image display provided on one main surface of the main body. Regarding the image, which is photographed by such the hand-held type game machine or an imaging means such as a digital camera, it is well known that the image is transferred to a personal computer for processing to be applied thereto. The operator can edit the image transferred to the personal computer using an image processing software (such as a photo-retouching software, etc.).
IMAGE PROCESSING SYSTEM This application claims priority to U.S. patent application Ser. No. 10/440,128, filed May 19, 2003; that application claims priority to Japanese Patent Application No. 2003-098829, filed Apr. 2, 2003, and Japanese Patent Application No. 2002-142476, filed May 17, 2002. The entire contents of these applications are incorporated by reference.

TECHNICAL FIELD

Certain exemplary embodiments relate to an image processing system. More specifically, certain exemplary embodiments relate to an image processing system including a face image data providing apparatus, and an image composing apparatus provided separately from the face image providing apparatus and having no face image providing function, and generating a polygon image by the image composing apparatus using face image data fetched from the face image data providing apparatus.

BACKGROUND AND SUMMARY

An example of such a kind of a prior art is disclosed in a patent document 1. In a hand-held type game machine disclosed in the patent document 1, a camera portion is formed on an upper portion of a main body. The camera portion is in a rotational-free manner supported relative to the main body thus possible to photograph both images; one is a front image viewed from an operator, and the other is a rear image viewed from the operator. The photographed images can be displayed on an image display provided on one main surface of the main body. Regarding the image, which is photographed by such the hand-held type game machine or an imaging means such as a digital camera, it is well known that the image is transferred to a personal computer for processing to be applied thereto. The operator can edit the image transferred to the personal computer using an image processing software (such as a photo-retouching software, etc.).

Furthermore, in a provisional three-dimensional image producing software, as disclosed in a non-patent document 1, it is also well known that arbitrary image data is attached to a polygon figure produced by the three-dimensional image producing software using a method such as a texture mapping so as to create an image.

(Patent Document 1)
Japanese Patent Application Laying-open No. H11-144040
(Non-patent document 1)
3D TEXTURE LIBRARY (Ohm-sha, Nov. 20, 2000)

However, in the prior art, both the imaging apparatus and the personal computer are respectively independently manufactured, and therefore, a product was not designed to take into account a conjunction of the both. In addition, both the digital camera and the personal computer had a function too complicated for a beginner and children to operate, and some even required expertise. Furthermore, the digital camera and the personal computer did not interface with each other and, needless to say, a product in which an entertaining purpose was not considered, thus resulting in a disadvantage that the operator easily became bored.

Therefore, it is a feature of certain exemplary embodiments to provide a novel image processing system.

It is another feature of certain exemplary embodiments to provide an image processing system capable of creating an image with an entertainment using both a hand-held type game machine and a fixed-type television game apparatus.

It is still another feature of certain exemplary embodiments to provide an image processing system that photographs an image using a cartridge adding a photographing function to an accustomed hand-held type game machine, and using an environment in which an accustomed fixed-type television game apparatus can be connected to the hand-held type game machine, with a purpose of creating an image by previously taking into consideration a conjunction of the both.

It is yet still another feature of certain exemplary embodiments to provide an image processing system enjoyable as a result of a various kinds of models of three-dimensional computer images such as a man-looking figure, for example, being previously prepared in a fixed-type television game apparatus, and a face image photographed by a camera of a hand-held type game machine, for example, being transferred to the television game apparatus, which is attached to the model of the three-dimensional computer image.

It is another feature of certain exemplary embodiments to provide an image processing system capable of easily adjusting a color in such a manner that a difference in color between the face image and the model do not become unnatural when the face image is attached to the model of the three-dimensional computer image.

An image processing system according to certain exemplary embodiments includes a face image data producing apparatus, and an image composing apparatus provided separately from the face image data providing apparatus, and having no face image providing function. The face image data providing apparatus comprises a face image data fetching means, a feature data fetching means, and a data transmitting means. The face image data fetching means fetches face image data. The feature data fetching means fetches, in correspondence to the face image data, feature data associated with a face image. The data transmitting means transmits the face image data and the feature data to the image composing apparatus. The image composing apparatus includes a data receiving/storing means, a character polygon data storing means, an image composition processing means, and a first display means. The data receiving/storing means receives and stores the data transmitted by the data transmitting means. The character polygon data storing means stores polygon data for producing at least one provisional three-dimensional character image. The image composition processing means produces character polygon data based on the feature data and the polygon data stored in the character polygon data storing means so as to compose a character polygon image using the face image data as a face texture of the character polygon. The first display means displays an image composed by the image composition processing means.

More specifically, the image processing system (10: reference numeral in embodiments, and so forth) includes the face image data providing apparatus (20), and the image composing apparatus (11) not having a face image providing function. In the face image data providing apparatus (20), the face image data fetching means (21c, 22, 23) fetches face image data. In addition, the feature data fetching means (21c, 22, 23) fetches, in correspondence to the face image data, feature data associated with a face image. The data transmitting means (21c, 21h, 16) transmits the face image data fetched by the face image data fetching means (21c, 22, 23) and the feature data fetched by the feature data fetching means (21c, 22, 23) to the image composing apparatus (11). On the other hand, the image composing apparatus (11) is provided separately from the face image data providing apparatus, and in the image composing apparatus (11), the data receiving/storing means (11a, 11b, 11e) receives and stores data, that is, the face image data and the feature data, transmitted by the data transmitting means (21c, 21h, 16). The character polygon data storing means (11b) stores polygon data for producing at least one provisional three-dimensional character image. The image composition processing means (11a) produces character polygon data based on the feature data and the polygon data so as to compose a character polygon image using the face image data as a face texture of the character polygon. The first display means (11a, 11c, 11d, 14) displays an image composed (generated) by the image composition processing means.

According to certain exemplary embodiments, the face image data provided by the face image data providing apparatus and the feature data are used to produce a character, thus making it possible to freely facilitate creating an image. Furthermore, since it is possible to produce the character image according to the feature data, it is possible to increase a level of amusement (entertainment).

In a certain embodiment, the face image data fetching means includes an imaging apparatus that photographs a face image of an object so as to produce the face image data, and the feature data fetching means includes a feature data inputting means for inputting feature data associated with the face image corresponding to the imaging data. More specifically, the face image data fetching means (21c, 22) includes the imaging apparatus (21c, 22a, 21d) for imaging or photographing the face image of the object, and the imaging apparatus (21c, 22a, 21d) images or photographs the face image of the object in accordance with a photograph instruction of an operator. This allows the face image data fetching means (21c, 22) to fetch the face image data. That is, the face image data regarding the face image of the photographed object is fetched. In addition, the feature data fetching means (21c, 22, 23) includes the feature data inputting means (21a) for inputting feature data associated with the face image photographed by the imaging apparatus (21c, 22a, 21d), and fetches the feature data input by the feature data inputting means (21a).

In this embodiment, the face image data providing apparatus further comprises a second display means for displaying at least the face image, which is being photographed, and an imaging indexing data display means for displaying an imaging index for adjusting the face image of the object to a desired location on the second display means when photographing the face image. More specifically, the face image data providing apparatus (20) further comprises the second display means (21b) for displaying at least the face image, which is being photographed. The imaging index data display means (21c, 21d) displays imaging indexes (62a-62d) on the second display means (21b, 21e, 21f, 21g) when photographing the face image. Therefore, it is possible to image or photograph the face image in a manner that the face image is positioned at the desired location.

In a certain aspect, the face image data providing apparatus further comprises a data reading-out means capable of reading-out data stored in an external storage medium, and a data generating means for generating the face image data and the feature data based on the data read-out by the data reading-out means, the face image data fetching means fetches the face image data generated by the generating means, and the feature data storing means fetches the feature data generated by the generating means. More specifically, the face image data providing apparatus (20) comprises the data reading-out means (23e). The data reading-out means (23e) is capable of reading-out the data stored in the external storage medium (23a) such as a card, etc. The data generating means (21c) generates the face image data and the feature data based on the data read-out by the data reading-out means (23e). Therefore, the face image data fetching means (21c, 23) fetches the generated face image data, and the feature data storing means (21c, 23) fetches the generated feature data. Accordingly, it is possible to fetch the face image data and the feature data from the external recording medium (23a).

In an embodiment, the image composing apparatus further comprises an animation automatically selecting means that automatically selects certain animation data out of at least one kind according to the feature data after the provisional three-dimensional character image is composed, and an animation display means that uses the selected animation data and the composed provisional three-dimensional character image so as to display an animation. More specifically, in the image composing apparatus (11), when the provisional three-dimensional character image is composed, the animation automatically selecting means (11a, 11b) automatically selects arbitrary animation data out of at least one kind animation data in response to the feature data. The animation display means (11a, 11c, 11d, 14) displays the animation using the selected animation data and the composed provisional three-dimensional character image. The composed provisional three-dimensional character image is animation-displayed so that it is not only possible to simply enjoy the composed image, but also enjoy the animation display of the composed image.

Another image processing system according to certain exemplary embodiments includes a hand-held type image processing apparatus having an imaging function, and an image composing apparatus provided separately from the hand-held type image processing apparatus and having no the imaging function. The hand-held type image processing apparatus comprises an imaging means, an object feature data inputting means, and a data transmitting means. The imaging means photographs an object and produces imaging data. The object feature data inputting means inputs object feature data representing a feature of the object corresponding to the imaging data. The data transmitting means transmits to the image composing apparatus the imaging data produced by the imaging means, and the object feature data input by the object feature data inputting means. The image composing apparatus includes a data receiving/storing means, a character polygon data storing means, a character selecting means, an image composition processing means, and a first display means. The data receiving/storing means receives and stores the data transmitted from the data transmitting means. The character polygon data storing means stores polygon data for generating at least one provisional three-dimensional character image. The character selecting means allows an operator to select the polygon data for composing at least one provisional three-dimensional character image. The image composition processing means processes the polygon data selected by the character selecting means using the object feature data, and composes the provisional three-dimensional character image by using the processed polygon data and the imaging data. The first display means displays an image composed by the image composition processing means.

More specifically, the image processing system (10) is constructed by a hand-held type image processing apparatus (20) such as a hand-held type game machine having an imaging function, the image composing apparatus (11) such as a fixed-type game machine not having the imaging function. In the hand-held type image processing apparatus (20), the imaging means (21c, 22a, 21d) photographs an object so as to generate the imaging data. The object feature data representing a feature of the object in correspondence to the generated imaging data is input by the object feature data inputting means (21a). The data transmitting means (21c, 21h, 16) transmits to the image composing apparatus (11) the imaging data generated by the imaging means (21c, 22a, 21d), and the object feature data input by the object feature data inputting means (21a). On the other hand, the image composing apparatus (11) is provided separately from the hand-held type image processing apparatus (20), and in the hand-held type image processing apparatus (20), the data receiving/storing means (11a, 11b, 11e) receives and stores the data transmitted from the data transmitting means (21c, 21h, 16), that is, the imaging data and object feature data. Furthermore, the character polygon data storing means (11b) stores the polygon data for generating at least one provisional three-dimensional character image. The character selecting means (12) allows an operator to select the polygon data for composing at least one provisional three-dimensional character image. Therefore, the image composing means (11a) processes the polygon data selected by the character selecting means (12) using the object feature data, and uses the processed polygon data and the imaging data so as to generate the provisional three-dimensional character image. The composed (generated) provisional three-dimensional character image is displayed on the first display means (11a, 11c, 11d, 14).

According to certain exemplary embodiments, the imaging data photographed by the hand-held type image processing apparatus and the feature data input by the hand-held type image processing apparatus are used so as to generate a character, thus making it possible to freely facilitate creating an image. Furthermore, since it is possible to generate the character image according to the feature data, it is possible to increase a level of amusingness (entertainment).

Furthermore, the image composition processing means carries out a process of attaching the face image data to a portion of the provisional three-dimensional character image generated from the polygon data so as to compose the image. The image composing apparatus further includes a region polygon data selecting means, a region polygon positioning means, and a character color retrieving means. The region polygon data selecting means, when the provisional three-dimensional character image is to be composed, in a range to which an attaching process of the face image data is applied, allows an operator to select, out of at least one data, polygon data representing a shape of at least one region which constitutes the provisional three-dimensional character. The region polygon positioning means allows the operator to instruct in what position of the provisional three-dimensional character image the region polygon data selected by the region polygon data selecting means is positioned so as to compose the image, with the range to which the attaching process of the face image data is applied. The character color retrieving means retrieves from the imaging data in a range in which the region polygon data is positioned so as to determine at least one color data of the provisional three-dimensional character image in a portion in which the imaging data is not attached. More specifically, the image composition processing means (11a) carries out the process attaching the face image data to the portion of the provisional three-dimensional character image produced from the polygon data so as to perform the image composition. In the image composing apparatus (11), the region polygon data selecting means (12) allows the operator to select, out of at least one data, the polygon data representing the shape of at least one region, which constitutes the provisional three-dimensional character, in the range to which an attaching process of the face image data is applied when the provisional three-dimensional character image is composed. The region polygon positioning means (12) allows the operator to instruct in what position of the provisional three-dimensional character image the region polygon data selected by the region polygon data selecting means (12) is positioned in order to compose the image, in the range to which the attaching process of the face image data is applied. Furthermore, the character color retrieving means (11a) retrieves from the imaging data in the range in which the region polygon data to be positioned in order to determine at least one color data of the provisional three-dimensional character image in the portion in which the imaging data cannot be attached. That is, it is possible to change attaching a region of a portion of the produced face, and adjust a difference in color caused by changing attaching the region.

An image processing method according to certain exemplary embodiments is executed in an image composing apparatus capable of being connected to a face image data providing apparatus provided with a face image data fetching means for fetching face image data, a feature data fetching means for fetching feature data associated with the face image in correspondence to the face image data, a data transmitting means for transmitting to the image composing apparatus the face image data and the feature data. The image composing apparatus comprises at least a data receiving/storing means, a character polygon data storing means, and a composed image displaying means. The data receiving/storing means receives and stores the data transmitted from the face image data providing apparatus. The character polygon data storing means stores the polygon data for generating at least one provisional three-dimensional character image. The composed image displaying means displays a composed image. Then, the image composing apparatus executes a character selecting step, a polygon data processing step, and a provisional three-dimensional character image composing step. The character selecting step allows an operator to select the polygon data for generating at least one provisional three-dimensional character image. The polygon data processing step processes the polygon data selected by the character selecting step using the polygon data processing step. The provisional three-dimensional character image composing step composes the provisional three-dimensional character image using the polygon data processed by the polygon data processing step and the face image data.

In a certain embodiment, the image composing apparatus further executes an animation automatically selecting step for automatically selecting arbitrary animation data out of at least one kind in accordance with the feature data after composing the provisional three-dimensional character image, and an animation displaying step for displaying an animation using the selected animation data and the composed provisional three-dimensional character image.

Another image processing method according to certain exemplary embodiments is executed in an image composing apparatus capable of being connected to an image processing apparatus provided with an imaging means for photographing an object so as to generate imaging data, an object feature data inputting means for inputting object feature data representing a feature of the object corresponding to the imaging data, and a transmitting means for transmitting the imaging data and the object feature data. The image composing apparatus comprises at least data receiving/storing means, a character polygon data storing means, and a composed image displaying means. The data receiving/storing means receives and stores the data transmitted from the image processing apparatus. The character polygon data storing means stores polygon data for generating at least one provisional three-dimensional character image. The composed image displaying means displays the composed image. Then, the image composing apparatus executes following steps: a character selecting step, a polygon data processing step, and a provisional three-dimensional character image composing step are executed. The character selecting step allows an operator to select the polygon data for generating at least one provisional three-dimensional character image. The polygon data processing step processes the polygon data selected by the character selecting step using the object feature data. The character image composing step composes the provisional three-dimensional character image using the polygon data processed in the polygon data processing step and the imaging data.

In a certain embodiment, the image composing apparatus further executes an animation automatically selecting step for automatically selecting certain animation data out of at least one kind in accordance with the object feature data after composing the provisional three-dimensional character image, and an animation displaying step for displaying an animation using the selected animation data and the composed provisional three-dimensional character image.

In an embodiment, the image composing step includes an imaging data attaching step, a region polygon data selecting step, a region polygon positioning step, and a character color retrieving step. The imaging data attaching step carries out a process of attaching the imaging data to a portion of the provisional three-dimensional character image generated from the polygon data. The region polygon data selecting step allows an operator to select the polygon data representing a shape of at least one region constituting the provisional three-dimensional character out of one data in a range in which the imaging data is subjected to the attaching process. The region polygon positioning step allows the operator to instruct to position the region polygon data selected by the polygon data selecting step in what position of the provisional three-dimensional character image so as to produce an image in a range in which the imaging data is subjected to the attaching process. The character color retrieving step retrieves from the imaging data in a range in which the region polygon data is positioned at least one color data of the provisional three-dimensional character image in a portion in which the imaging data is not to be attached.

An external storing device according to certain exemplary embodiments is an external recording device detachably attached to a hand-held type game machine at least provided with a data transmitting means for transmitting data to an image composing apparatus. The external recording device comprises a face image fetching means, a feature data fetching means, and a data storing means. The face image fetching means fetches face image data. The feature data fetching means fetches feature data associated with the face image in correspondence to the face image data. The data storing means for storing the face image data and the feature data in a manner that the both data are associated with each other.

More specifically, the external recording device (22, 23) detachably attached to a hand-held type game machine (20) provided with at least the data transmitting means (21c, 21h, 16) for transmitting the data to an image composing apparatus (11) such as fixed-type game machine. In the external recording device (22, 23), the face image fetching means (21c, 22a, 23e) fetches the face image data, and the feature data fetching means (21a, 21c, 22a, 23e) fetches the feature data associated with the face image in correspondence to the face image data. The data storing means (22c, 23c) stores the face image data and the feature data by associating with each other.

According to certain exemplary embodiments, the fetched face image data and the feature data are associated with each other to be stored in the external recording device so that it is possible to enjoy the image production utilizing the face image data and the feature data by attaching the external recording device to another hand-held type game machine.

An external storage device according to certain exemplary embodiments is an external storage device detachably attached to a hand-held type game machine at least provided with a photographing processing means for executing a photographing process in accordance with a photographing instruction by an operator, an image displaying means for displaying at least an image of an object during when the photographing process is being executed by the photographing processing means, and an object feature data inputting means for inputting object feature data representing a feature of the object corresponding to the imaging data fetched as a result of the photographing process by the photographing processing means. The external storage device comprises an imaging means, and a data storing means. The imaging means images or photographs the object so as to generate the imaging data. The data storing means associates, and stores the imaging data generated by the imaging means, and the object feature data input by the object feature data inputting means.

More specifically, the external storage device (22) is provided in such a manner as to be detachably attached to the hand-held type game machine (20). The hand-held type game machine (20) is at least provided with the photographing processing means (21c, 22a, 21d) for executing the photographing process in accordance with the photographing instruction by the operator, the image displaying means (21b, 21e, 21f, 21g) for displaying at least the image of the object when the photographing process is being executed by the photographing processing means (21c, 21a, 21d), and the object feature data inputting means for inputting object feature data representing the feature of the object corresponding to the imaging data fetched as a result of the photographing process by the photographing processing means (21c, 21a, 21d). In the external storage device (22), the imaging means (22a) photographs the object in accordance with the photographing instruction so as to produce the imaging data. The data storing means (22c) stores the imaging data produced by the imaging means (22a) and the object feature data input by the object feature data inputting means (21a) in a manner that the both data are associated with each other.

According to certain exemplary embodiments, since the fetched imaging data and the object feature data are associated with each other to be stored in the external storage device so that by attaching the external storage device to another hand-held type game machine, it is possible to enjoy the image production utilizing the imaging data and the object feature data.

The above-described external storage device may further comprise a photographing process executing a program for executing the photographing process, and a program storing means for storing an imaging index displaying program for displaying on the image displaying means an imaging index for setting an image of the object to a desired location when the photograph process is being executed. In this case, the external storage device (22) further comprises a program storing means (22b). In the program storing means (22b), the photographing process executing program for executing the photographing process, and the imaging index displaying program for displaying on the image displaying means the imaging index for setting the image of the object to the desired location during when the photograph process is being executed. That is, by attaching the external storage device, it becomes possible to allow the hand-held type game machine to have a photographing function, and when photographing, since the imaging index is displayed, it is possible to photograph the image of the object to be located to the desired location.

According to certain exemplary embodiments, it is possible to provide an image processing system capable of creating an image having an entertainment value utilizing the hand-held type game machine, and the fixed-type television apparatus.

In addition, according to certain exemplary embodiments, it is possible to provide an image processing system that even a beginner and children can easily operate with a purpose of creating an image, using an accustomed environment such as the hand-held type game machine, the fixed-type television game apparatus, etc.

Furthermore, according to certain exemplary embodiments, it is possible to provide an image processing system having too high an entertainment not to be easily tired of.

In addition, according to certain exemplary embodiments, it is possible to provide an image processing system capable of easily adjusting a difference in color between an image and a model.

The above described and other features, aspects and advantages of certain exemplary embodiments will become more apparent from the following detailed description of certain exemplary embodiments when taken in conjunction with the accompanying drawings.

BRIEF DESCRIPTION OF THE DRAWINGS

FIG. 6 is an illustrative view of a process until an image of a face image is attached to an image of an actor to be used in the fixed-type game machine of the FIG. 1 embodiment;

FIG. 8 is an illustrative view of a process adjusting colors of an attached image and a polygon;

FIG. 18 is an illustrative view showing a content of data recorded in a card shown in the FIG. 16 embodiment;

FIG. 19 is a memory map of the hand-held type game machine;

FIG. 20 is a memory map of the fixed-type game machine;

DETAILED DESCRIPTION

First Embodiment

Figure 1:
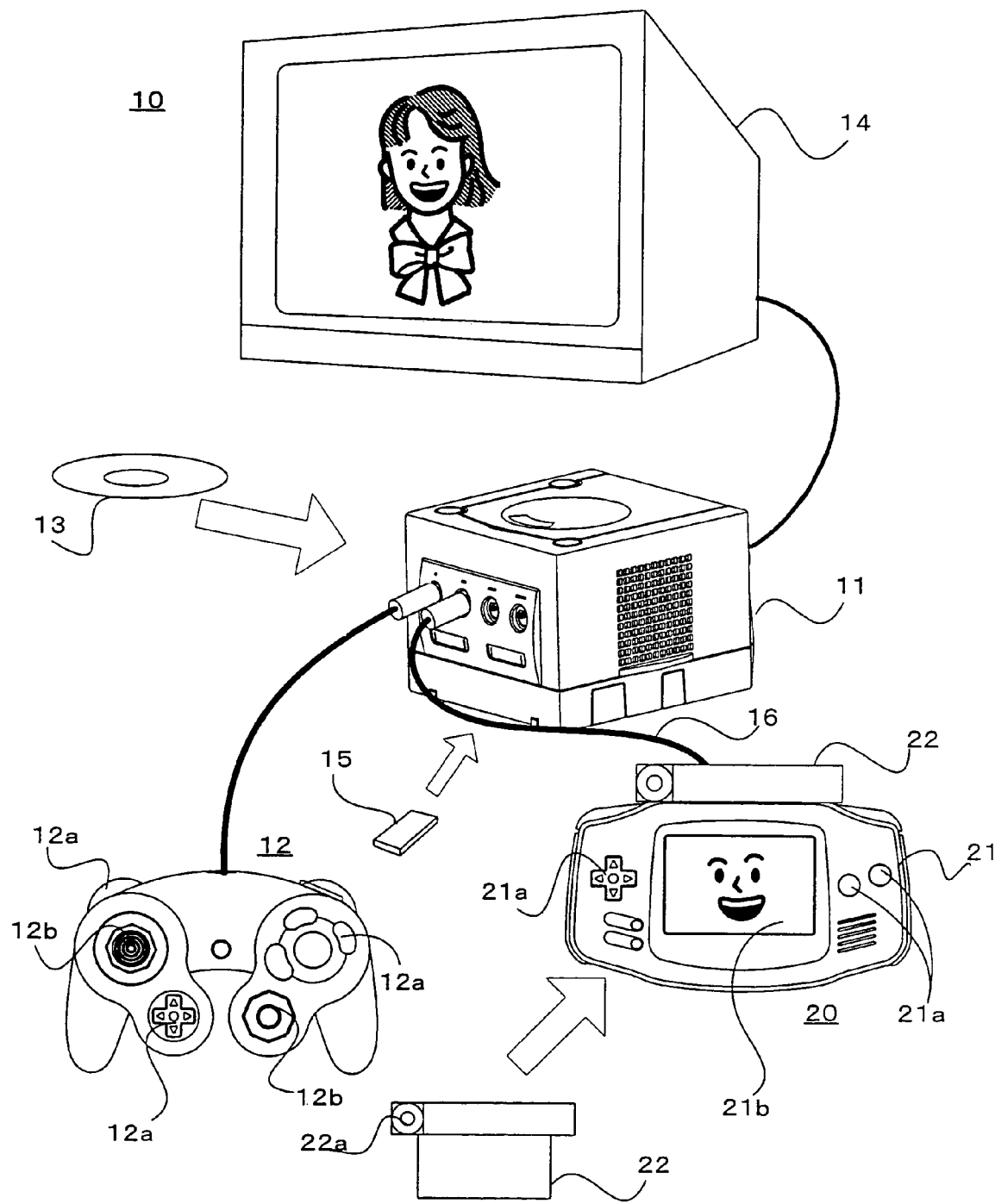
FIG. 1 is an outline view showing one example of an image processing system according to an exemplary embodiment.

FIG. 1 is a view showing an outline of an image processing system 10 according to certain exemplary embodiments. The image processing system 10 includes a fixed-type game machine 11 as an image composing apparatus. A controller 12 is connected to the fixed-type game machine 11. The controller 12 is provided with an operating switch 12*a*, and a joystick 12*b* for carrying out an input operation by an operator who performs an image composition. The operating switch 12*a* is mainly used for operating a determination, etc., in a menu selection, etc. The joystick 12*b* is primary used for operating a direction instruction, a selected item change, etc., in a menu selection, etc.

An image composing program for allowing the fixed-type game machine 11 to function as an image composing apparatus is supplied from an external storage medium 13. In addition, an image display device 14 is connected to the fixed-type game machine 11. On the image display device 14, an image generated in accordance with a process of the image composing program is displayed. While the operator watches the image displayed on the image display device 14, the operator performs the image composition using the controller 12.

Furthermore, an external storage medium 15 may be capable of being connected to the fixed-type game machine 11. This makes it possible to carry out an operation, in which progress of the image composing process is stored in the external storage medium 15, a process of composing the image is suspended, and later, the process is resumed, and so on, for example.

The image processing system 10 includes a hand-held type game machine 20 as an image composing apparatus having as an imaging function. The hand-held type game machine 20 includes a hand-held type game machine main body 21, and an imaging or photographing cartridge 22. On the hand-held type game machine main body 21, an operating switch 21a is provided. The operator operates the operating switch 21a, which is used as a shutter button for photographing an object, for example. The hand-held type game machine 20 is provided with a liquid crystal display screen 21b. The liquid crystal display screen 21b has a function to display a result of a game program processed in the hand-held type game machine main body 21, etc., as an image.

The photographing cartridge 22 includes an imaging portion 22a. In the imaging portion 22a, an image creating program for allowing the hand-held type game machine main body 21 to function as the image creating apparatus is stored. In addition, it may be possible to enable such a process in which a temporary storing function of data is assigned, and the imaging data photographed by the imaging portion 22a is stored, which is used in another hand-held type game machine, for example, etc.

The hand-held type game machine 20 is connected to the fixed-type game machine 11 via a connection cable 16 as illustrated.

Figure 2:
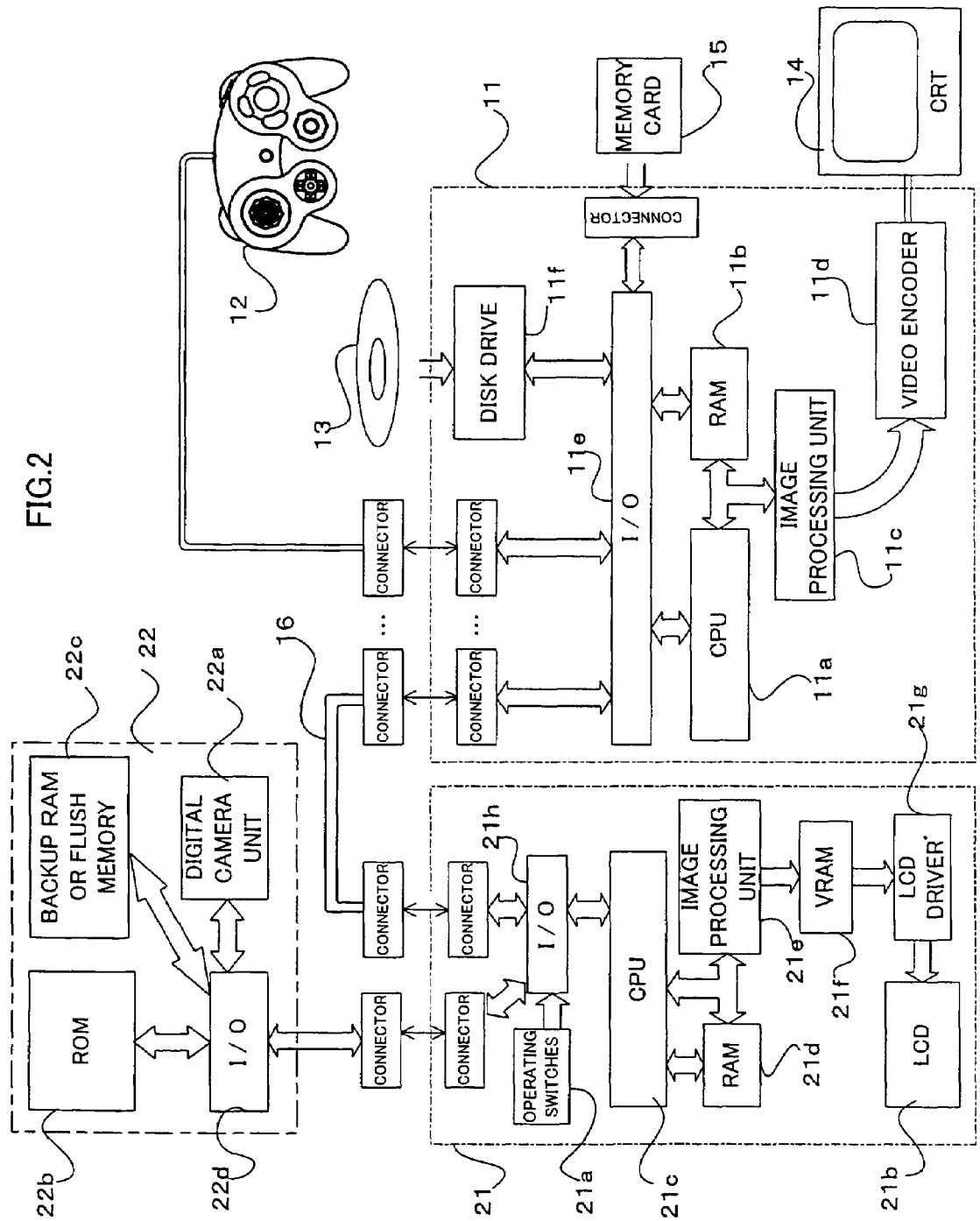
FIG. 2 is an internal block diagram of the image processing system of the FIG. 1 embodiment.

FIG. 2 is an internal block diagram of the image processing system 10 of the embodiment. The fixed-type game machine 11 is incorporated with a CPU 11a. To the CPU 11a, a RAM 11b is connected. In the RAM 11b, a program and data to be processed by the CPU 11a is temporarily stored.

To the CPU 11a, an image processing unit 11c is further connected. The image processing unit 11c has a function in which the image data stored in the RAM 11b is processed so as to generate an image in response to an instruction from the CPU 11a. A generated image is displayed on the image display device 14 via a video encoder 11d.

To the CPU 11a, an interface 11e is further connected. Furthermore, the interface 11e is also connected to the RAM 11b. The controller 12 is connected to the CPU 11a via the interface 11e. In addition, a disk drive unit 11f is connected to the interface 11e. The data of the external storage medium 15 is, based on an instruction from the CPU 11a, read-out by the disk drive unit 11f, and then transferred and stored in the RAM 11b. When the data fetched as a result of a program processing is saved and stored, the data is transferred and stored to the external data storing medium 15 (memory card, for example) via the interface 11e from the RAM 11b.

The hand-held type game machine main body is incorporated with a CPU 21c. The CPU 21c is connected to a RAM 21d. In the RAM 21d, data having a program processed by the CPU 21c is temporarily stored. To the CPU 21c and the RAM 21d, an image processing unit 21e is connected. The image processing unit 21e generates an image in response to an instruction of the CPU 21c based on the image data temporarily stored in the RAM 21d. A generated image is stored in a VRAM 21f. The image stored in the VRAM 21f is displayed on the liquid crystal display screen 21b within the hand-held type game machine main body 21 via a LCD driver 21g.

The imaging cartridge 22 is detachably attached to the hand-held type game machine main body 21 via the connector. In addition, the imaging cartridge 22 is incorporated with a ROM 22b storing a program and data used in the hand-held type game machine 20. Furthermore, in the imaging cartridge 22, a back up memory (RAM) 22s is mounted.

The CPU 21c of the hand-held type game machine main body 21 accesses to the imaging cartridge 22 via the interface 21h. That is, the CPU 21c processes the program and the data stored in the ROM 22b so as to generate the imaging data from the image photographed by the imaging portion 22a. It may be possible that generated imaging data is saved in the backup memory 22c, and then, the imaging cartridge 22 is used by connecting to another hand-held type game machine.

Figure 3:
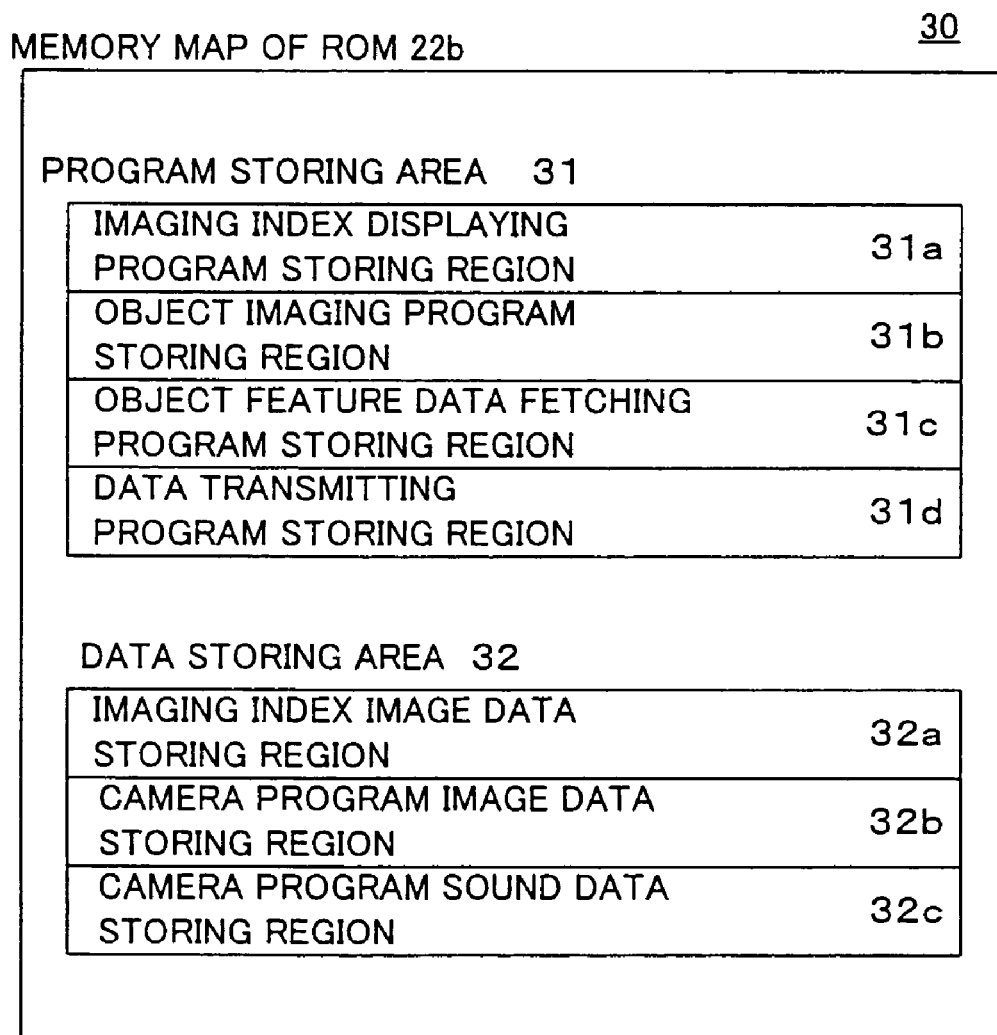
FIG. 3 is a memory map of a hand-held type game machine of the FIG. 1 embodiment.

FIG. 3 is a memory map 30 in the ROM 22b of the hand-held type game machine 20. The ROM 22b is primarily formed of a program storing area 31, and a data storing area 32. The program storing area 31 includes an imaging index displaying program storing region 31a, an object imaging program storing region 31b, an object feature data fetching program storing region 31c, and a data transmitting program storing region 31d.

In the imaging index displaying program storing region 31a, a program for enabling to fetch the imaging data of an optimized face at a time of photographing the object, that is, a face, for example, is stored. More specifically, as shown in a state chart 62 in FIG. 5, this is a program for displaying on the liquid crystal display screen 21 indexes 62a to 62d for adjusting approximate locations of an eye, a nose, a mouth, for example, of the object.

In the object imaging program storing region 31b, a program for photographing the image of the object by the imaging portion 22a is stored. More specifically, as shown in the state chart 62 in FIG. 5, this is a program for fetching the imaging data obtained by the imaging portion 22a into the RAM 22c as a result of the operator depressing the operating switch 21a, after determining the image of the face to be photographed, by adjusting from the imaging indexes 61a to 62d.

In the object feature data fetching program storing region 31c, a program for allowing the operator to input which represents a feature regarding the object photographed for obtaining the imaging data. More specifically, this is a program allowing the operator to input feature data of the object (object feature data) including data such as gender data 64a, body shape data 64b, personality character data 64c, age data 64d, etc. The input object feature data is brought into association with the imaging data, and then temporarily stored in the RAM 22c.

In the data transmitting program storing region 31d, a program for transmitting the imaging data and the object feature data to the fixed-type game machine 11.

The data storing area 32 includes an imaging index image data storing region 32a, a camera program image data storing region 32b, and a camera program sound data storing region 32c.

In the imaging index image data storing region 32a, data used by the program stored in the imaging index displaying program storing region 31a is stored. More specifically, as shown in the state chart 62, when photographing a face of the object, for example, data showing the indexes 62a-62d for adjusting approximate locations of an eye, a nose, a mouth is stored.

In addition, the camera program image data storing region 32b, and the camera program sound data storing region 32c are stored with data used during a time that the hand-held type game machine 20, like a camera, photographs an object as shown in the state chart 62 or a state chart 63, for example. In order to increase a presentation effect when various programs stored in the program storing area 31 are being executed, for example, data of a picture other than the object is displayed, data used when outputting a shutter sound is stored, etc.

Although not shown, an imaging data storing area, and an object feature data storing area are provided in the RAM 22c.

The imaging data storing area is an area for storing the imaging data of the object photographed by the imaging portion 22a by the program stored in the object imaging program storing region 31b.

Furthermore, in the object feature data storing area, data showing a feature of the object input by the operator (object feature data) is stored by the program stored in the object feature data fetching program storing region 31c as shown in the state chart 63. The object feature data stored in the object feature data storing area is associated with the image data of the object stored in the corresponding imaging data storing area, thus stored.

Figure 4:
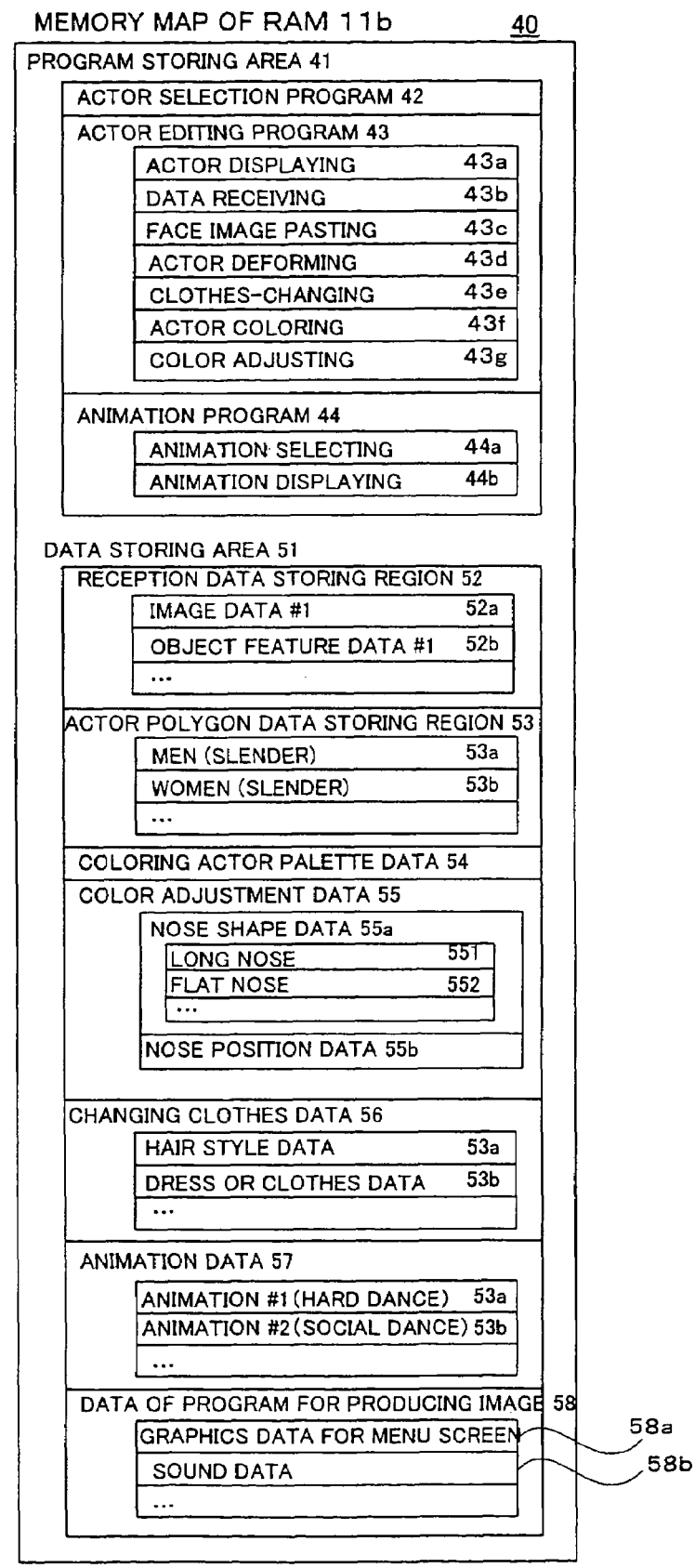
FIG. 4 is a memory map of a fixed-type game machine of the FIG. 1 embodiment.

FIG. 4 is a view showing a memory map 40 in the RAM 11b of the fixed-type game machine 11. The RAM 11b is primarily divided into a program storing area 41 and a data storing area 51.

The program storing area 41 includes an actor selection program storing region 42, an actor editing program storing region 43, and an animation program storing region 44.

In this embodiment, an actor means a provisional three-dimensional character image created in the image processing system 10 by the operator using the imaging data 32b. In the actor selection program storing region 42, a program allowing the operator to select the provisional three-dimensional character image (actor 65a, for example), which is a model of the actor to be created, is stored as shown in a state chart 65 in FIG. 6 (screen display of the screen display device 14), for example.

The actor editing program storing region 43 includes an actor displaying program storing region 43a, a data receiving program storing region 43b, an imaging data (face image) pasting program storing region 43c, an actor deforming program storing region 43d, an actor clothes-changing program storing region 43e, an actor coloring program storing region 43f, and a color adjustment program storing region 43g.

In the actor displaying program storing region 43a, a program for generating a provisional three-dimensional character image such as an actor 65a from the data stored in the data storing area 51 is stored.

In the data receiving program storing region 43b, a program for receiving the imaging data, and the object feature data, for example, via the connection cable 16 from the hand-held type game machine 20 and storing the same into a reception data storing region 52 is stored.

In the imaging data (face image) pasting program storing region 43c, a program for processing selecting one of the face images 67a-67d photographed by the imaging portion 22a of the hand-held type game machine 20, for example, to be pasted to a face portion of the actor using a texture mapping method, etc., as shown in the display screen 67 is stored.

In the actor deforming program storing region 43d, a program for deforming a shape (body shape) of the actor selected by the actor selecting program 42 based on the object feature data stored in the reception data storing area 52 is stored.

In the actor clothes-changing program storing region 43e, a program for changing a clothes of the selected actor by allowing the operator to select a clothes 66b, etc., as shown in "waiting room" on the display screen 66 is stored.

In the actor coloring program storing region 43f, a program for coloring the selected actor using actor coloring data 54 is stored.

In the color adjustment program storing region 43g, a program for carrying out a color adjustment of the actor is stored. More specifically, in a case of a process of pasting the imaging data to the selected actor, for example, a difference in color that the actor has by nature becomes apparent, thus it may look unnatural. The program stored in the color adjustment program storing region 43g is a program for adjusting the difference in color between the color that the actor has by nature, and the color that the imaging data has, thus generating a natural provisional three-dimensional character image of the actor.

The animation program storing region 44 further includes an animation selecting program storing region 44a, and an animation displaying program storing region 44b.

In the animation selecting program storing region 44a, a program for referring to the object feature data stored in the reception data storing area 52, and selecting most appropriate animation data from the animation data storing area 57 to the actor to which a pasting process of the imaging data is applied is stored.

In the animation displaying program storing region 44b, a program for displaying the animation selected by the program stored in the animation selecting program storing region 44a is stored.

The data storing area 51 includes the reception data storing region 52, an actor polygon data storing region 53, an actor coloring palette data storing region 54, a color adjustment data storing region 55, an actor changing-clothes data storing region 56, an animation data storing region 57, and an image composing program data storing region 58.

In the reception data storing region 52, data that the fixed-type game machine 11 receives from the hand-held type game machine 20 is stored. In the reception data storing region 52, the imaging data and the object feature data are associated with each other to be stored. As for a first object, image data 1 (52a) and object feature data 1 (52b) are thought to be stored adjacently as shown in FIG. 4, for example.

In the actor polygon data storing region 53, as shown in a state chart 65 in FIG. 6, polygon data for producing the provisional three-dimensional character image of the actor selected by the operator is stored. Polygon data 53a for producing a slender male character image, polygon data 53b for producing a slender female character image, etc., are stored, for example.

In the actor coloring palette data storing region 54, data which is used by the program stored in the actor coloring program storing region 43f, and allows the operator to determine what color is coated to the actor selected by the operator is stored.

The color adjustment data storing region 55 further includes a region shape data storing region 55a, and a region position data storing region 55b.

In the region shape data storing region 55a, data in which a shape of the region forming one portion of the character body for the basis of the color adjustment is stored is stored. More specifically, in a state chart 71 in FIG. 8, polygon data for rendering shape of a nose, for example, indicated as 71a and 71b, is stored.

In the region position data storing region 55b, data showing a location of arranging a nose which is at a time that is indicated by a cursor 64e where the nose is arranged is stored in a case that the nose is selected as a body portion, that is, the basis of the color adjustment, for example, in the state chart 71.

In the actor changing-clothes data storing region 56, data which is used for the program stored in the actor clothes-changing program storing region 43e is stored. That is, hair style data 56a, clothes data 56b, etc., for example.

In the animation data storing region 57, data of the animation used for program stored in the animation displaying program storing region 44b is stored. That is, animation data 57a, which is a hard dance, and animation data 57b, which is a social dance, etc., for example.

The image composing program data storing region 58 is a region in which data such an image (58a), e.g. a menu shown on the image display device 14, etc., a sound effect (58b) output from a sound outputting means (not shown), etc., are stored in a case that the operator carries out the image composition in the fixed-type game machine 11.

Figure 5:
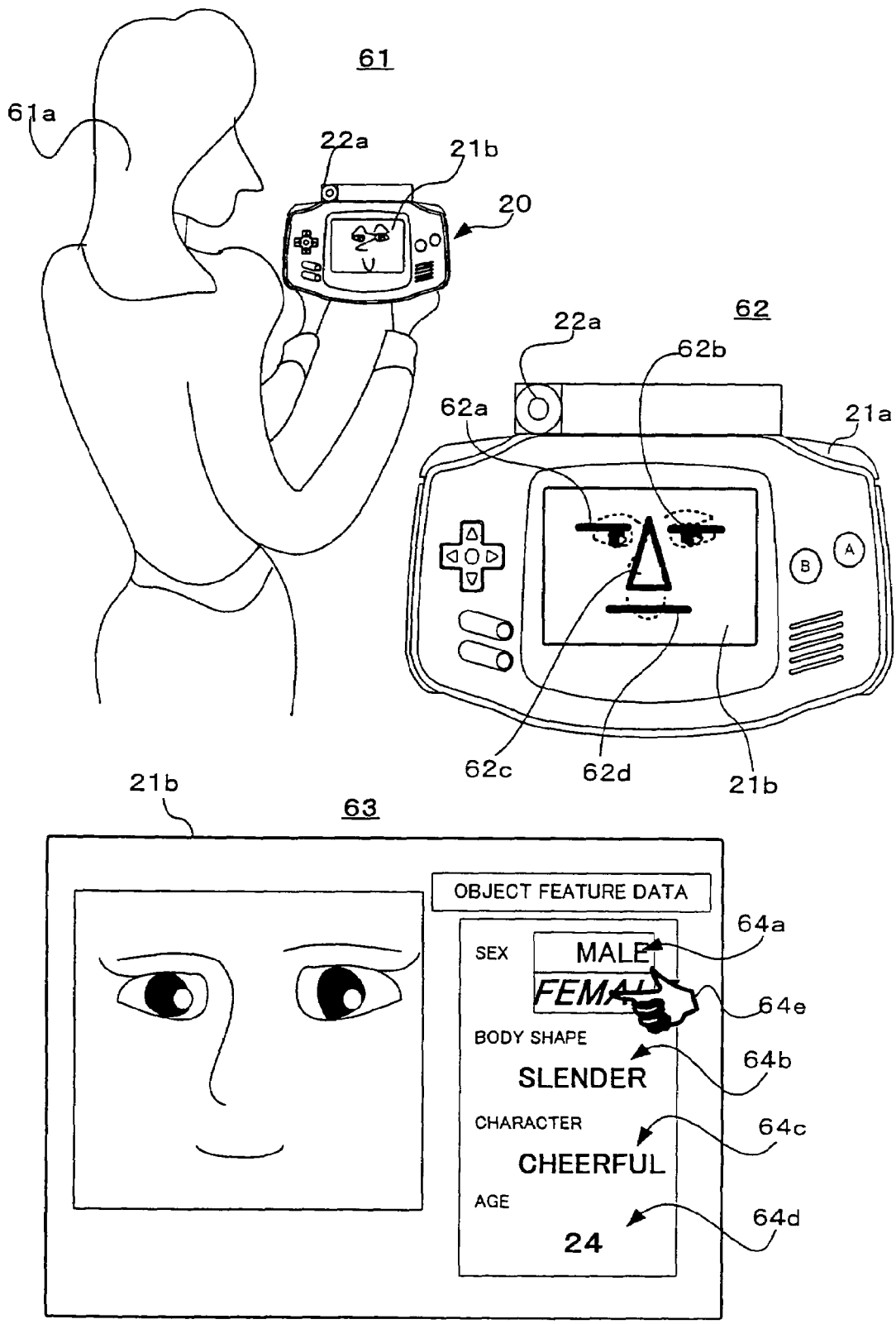
FIG. 5 is an illustrative view showing a scene in which a photographing is carried out while displaying an imaging index, and describing an input of object data using the hand-held type game machine of the FIG. 1 embodiment.

Referring to FIG. 5, a flow until the imaging image data is obtained in the image processing system 10 regarding certain exemplary embodiments.

A state chart 61 is a chart showing a state in which an operator 61a takes a picture of his own face using the hand-held type game machine 20. Although it is shown that herein, the imaging portion 22a is directed toward the operator 61a, if a direction to which the imaging is applied is freely to be changed, it is possible to respond to various photographing situations. At this time, the image photographed by the imaging portion 22a is displayed on the liquid crystal display screen 21b in a real time manner.

The state chart 62 is a magnified chart of the hand-held type game machine 20 in the state chart 61, which showing a state of the liquid crystal display screen 21b at a time of photographing. On the display screen 21b, an imaging index 62a for determining an imaging location of a right eye, an imaging index 62b for determining an imaging location of a left eye, an imaging index 62c for determining an imaging location of a nose, an imaging index 62d for determining an imaging location of a mouth are displayed as imaging indexes. The operator 60 operates the hand-held type game machine 20 in such a manner that these imaging indexes 62a to 61d are overlapped on respective portions, that is, his own right eye, his left eye, his nose, and his mouth as much as possible. When the imaging location is determined, the operator depresses the operating switch 21a so as to photograph.

In FIG. 5, a state chart 63 is a state chart of the liquid crystal display screen 21b after the photographing operation is done by the operator. On a left side of the screen, the imaging data of the object fetched into the fixed-type game machine 11 by the photographing operation is displayed as an image. On a right side of the screen, a menu for inputting a feature of the object shown on the left side of the screen is displayed. The operator inputs, as the feature of the object, gender data 64a (in this case, female), body shape data 64b (slender), character data 64c (cheerful), and age data 64d (24), for example. At this time, the operator will find it convenient to operate the cursor 64 so as to select the data from a menu which is shown. Needless to say, a format in which the operator operates the operating switch 21a so as to directly input the data may also be possible.

FIG. 6 is a view showing a display screen of the image display device 14 to which the fixed-type game machine 11 is connected.

A display screen 65 is a screen in which an actor is being selected as a provisional three-dimensional character image, which serves as the basis, for composing the provisional three-dimensional image as a result of the operator using the imaging data (face image, for example). More specifically, the cursor 64e is moved so as to select the actor 64a out of the actors 65a, 65b, etc., for example.

A subsequent display screen 66 is a screen in which the image of the selected actor is edited. On a left of the screen, the selected actor 65a is displayed. On the other hand, on a right of the screen, data 66b, e.g., a jacket, data 66c, e.g. pants, and data 66d, e.g., a hat, which are intended to have the selected actor to wear, are displayed. By operating the cursor 64e, the operator overlaps to the data used for changing the clothes, and then it becomes possible to carry out a changing-clothes operation of the actor 65a.

Herein, if the operator selects a camera image 66a, the fixed-type game machine 11 turns into a mode capable of receiving the imaging data and the object feature data from the hand-held type game machine 20. At this time, on the image display device 14, a display screen 67 is displayed. The face images 67a to 67d are imaging data received from the hand-held type game machine 20. Although not shown, the respective object feature data are also received, and stored therein while the feature data are respectively associated with the face images 67a to 67d.

On the display screen 67, if the operator uses the cursor 64e so as to select the imaging data 67d, then, the fixed-type game machine 11 deforms the actor 65a selected by the operator using the object feature data 64a-64d corresponding to the imaging data 67d. As result, an actor 65a' is composed on the display screen.

Figure 7:
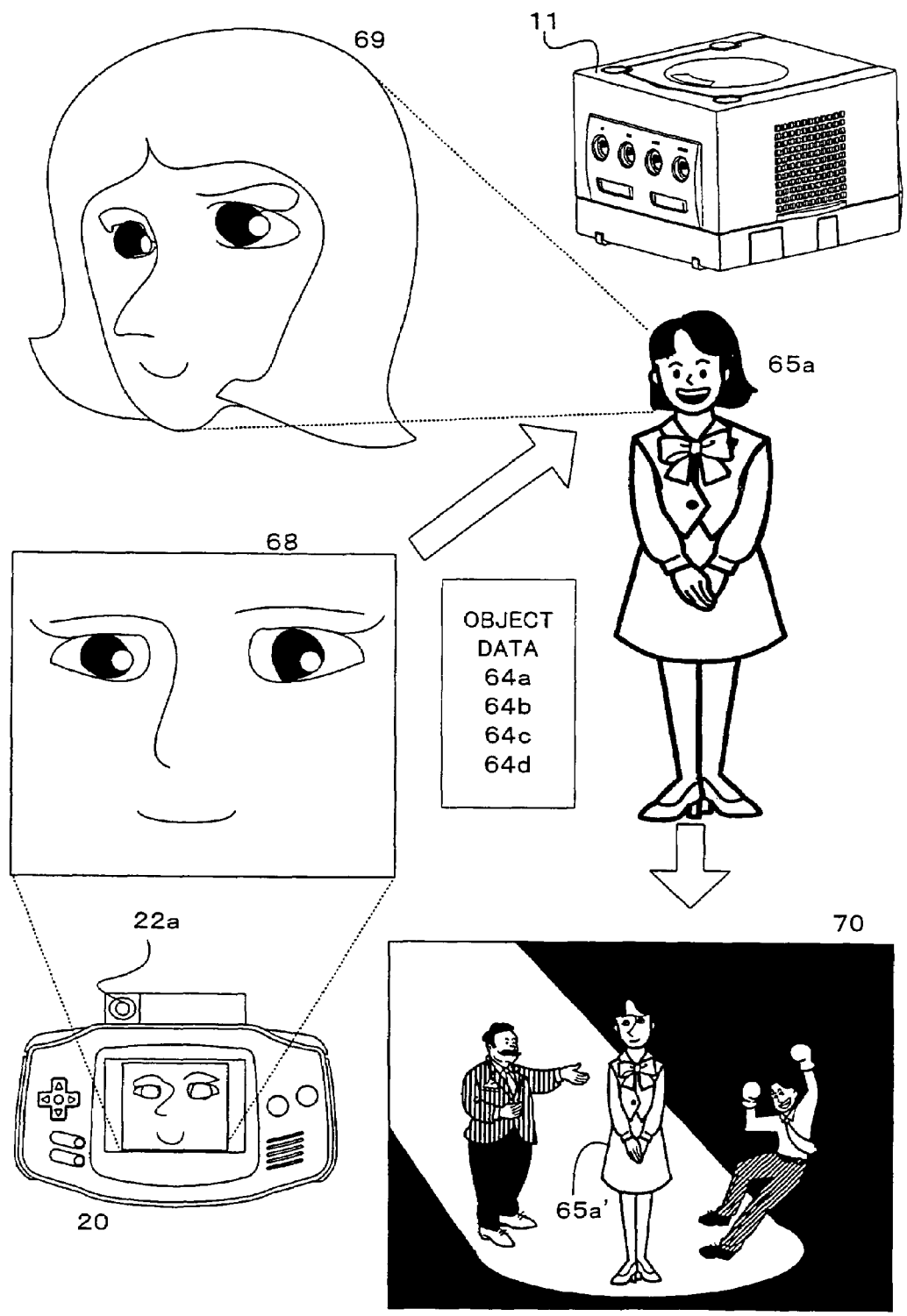
FIG. 7 is a conceptual diagram of the system of the FIG. 1 embodiment, and an illustrative view of an animation.

FIG. 7 is a schematic view describing a relationship between the hand-held type game machine 20 and the fixed-type game machine 11. The schematic view is used so as to summarize the above descriptions.

The operator uses the hand-held type game machine 20, and photographs the object by the imaging portion 22a so as to produce the imaging data. At the same time, the object feature data is input. On the other hand, in the fixed-type game machine 11, the actor is selected. Herein, provided that the actor 65a has been selected. After the actor 65a is selected, the fixed-type game machine 11 receives the imaging data and the object feature data. The imaging data is subjected to the pasting process to the face portion of the actor 65a in a case of this embodiment. As a result, the face portion of the actor 65a is changed as in a face image 69. On the other hand, the other portion of the actor 65 is deformed as in the actor 65a' shown in FIG. 6 based on the object feature data.

Furthermore, if the operator selects the animation display 66e in a display screen 66 in FIG. 6, for example, an animation display corresponding to the object feature data as in the display screen 70 (as long as the object feature data, that is, "personality is cheerful" is received, this means an animation of a hard dance, for example) is carried out.

Accordingly, the operator simply photographs the object, and then, inputs the data showing the feature of the object, then, it becomes possible to compose and enjoy a new actor.

Herein, a difference in color between the color of a skin primarily painted on the actor 65a, and the color of the skin of the imaging data pasted onto the face portion thereof, occurs. In this case, the operator may intend to adjust the unnaturalness of the image of the composed actor 65a'.

FIG. 8 is a schematic view of a case in which the actor 65a is selected, and then the imaging data is pasted onto the face portion so as to apply the color adjustment of the composed actor 65a' after obtaining the face image.

A display screen 71 is a display screen for applying the color adjustment. In the display screen 71, portions shown as 71a or 71b are shape images of various noses for allowing the operator to select the shape of the nose corresponding to the image 69 of the face image of the actor. Needless to say, in place of the nose, the data regarding other regions of the face may also be displayed as the image, and then, the operator is allowed to select them.

Provided that the operator selects nose shape data 71a in the display screen 71, and at this time, the operator can, as illustrated by an arrow 71a', use the cursor 64e so as to find a location in which the selected nose shape data 71a is to be arranged.

The nose shape data 71a is repeatedly subjected to the pasting process of the imaging data while the location is being found. This is to take into a view that unless an exact location is determined, the image of the nose of the imaging data is not always overlapped, presenting an unnatural image.

Provided that the nose shape data 71a selected by the operator is determined to be located in an area surrounded by a dotted square in this view. At this time, in a case that the image of the imaging data in a portion overlapped by the nose shape data 71a is a partial image 72, the color of the actor is once again determined from the partial image 72. The data of the primary color used for coloring the actor is actor coloring palette data 73, for example, and includes color data 73a, 73b, and 73c. At this time, the actor is colored as shown by a reference numeral in 74.

On the other hand, when the nose shape, and its arranging location are determined, the color data to be used for coloring the actor from the partial image 72 are determined as 73a', 73b', 73c', and the actor coloring data is changed to 73'. Then, the actor is once again re-colored as shown by a reference numeral in 74'.

Accordingly, the primary color data of the actor is changed from the partial image of the imaging data so as to apply a re-coloring, and the problem of the unnaturalness of the composed actor is thus dissolved.

Figure 9:
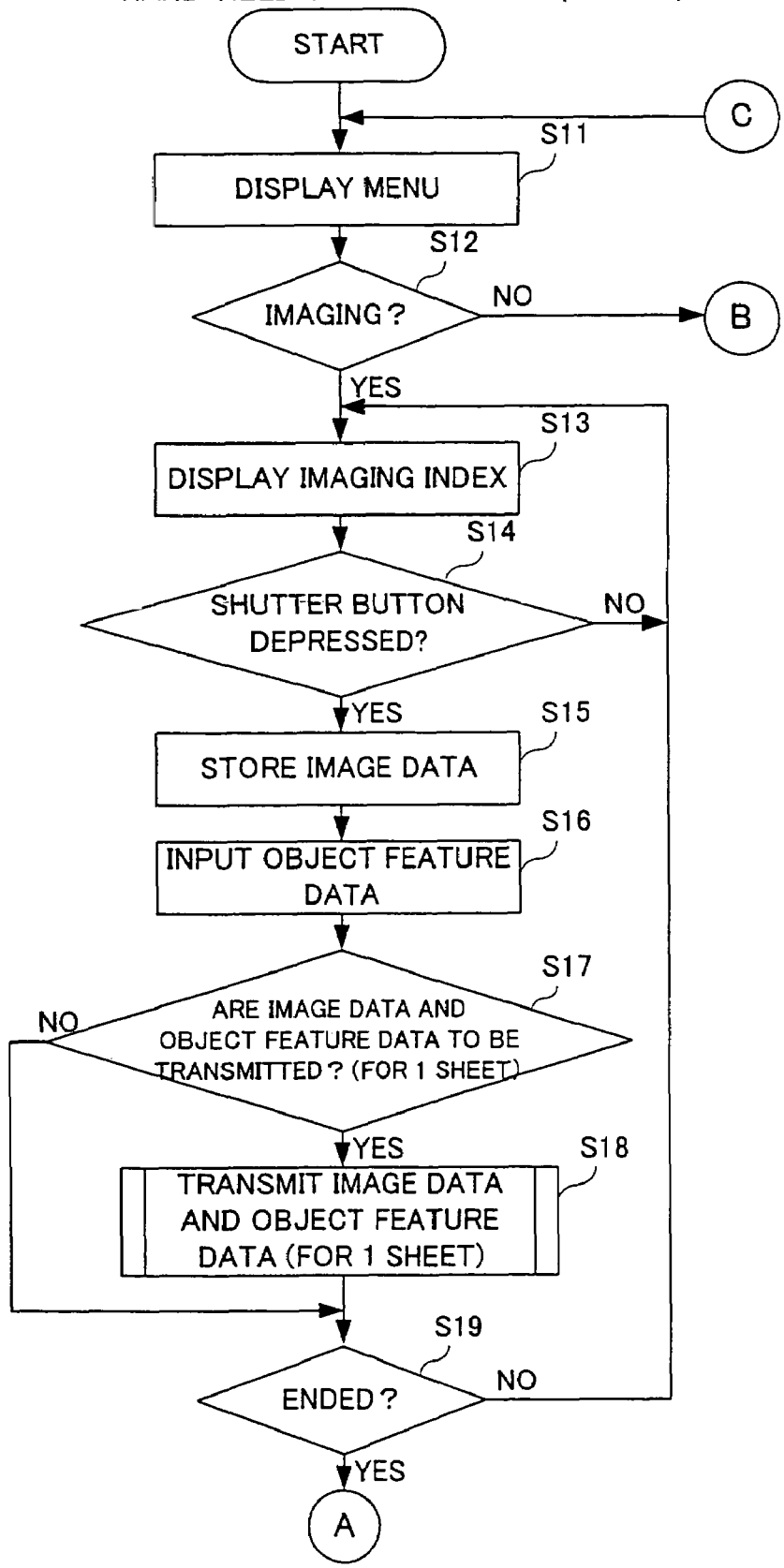
FIG. 9 is a flowchart showing one portion of a process of the fixed-type game machine of the FIG. 1 embodiment.
Figure 10:
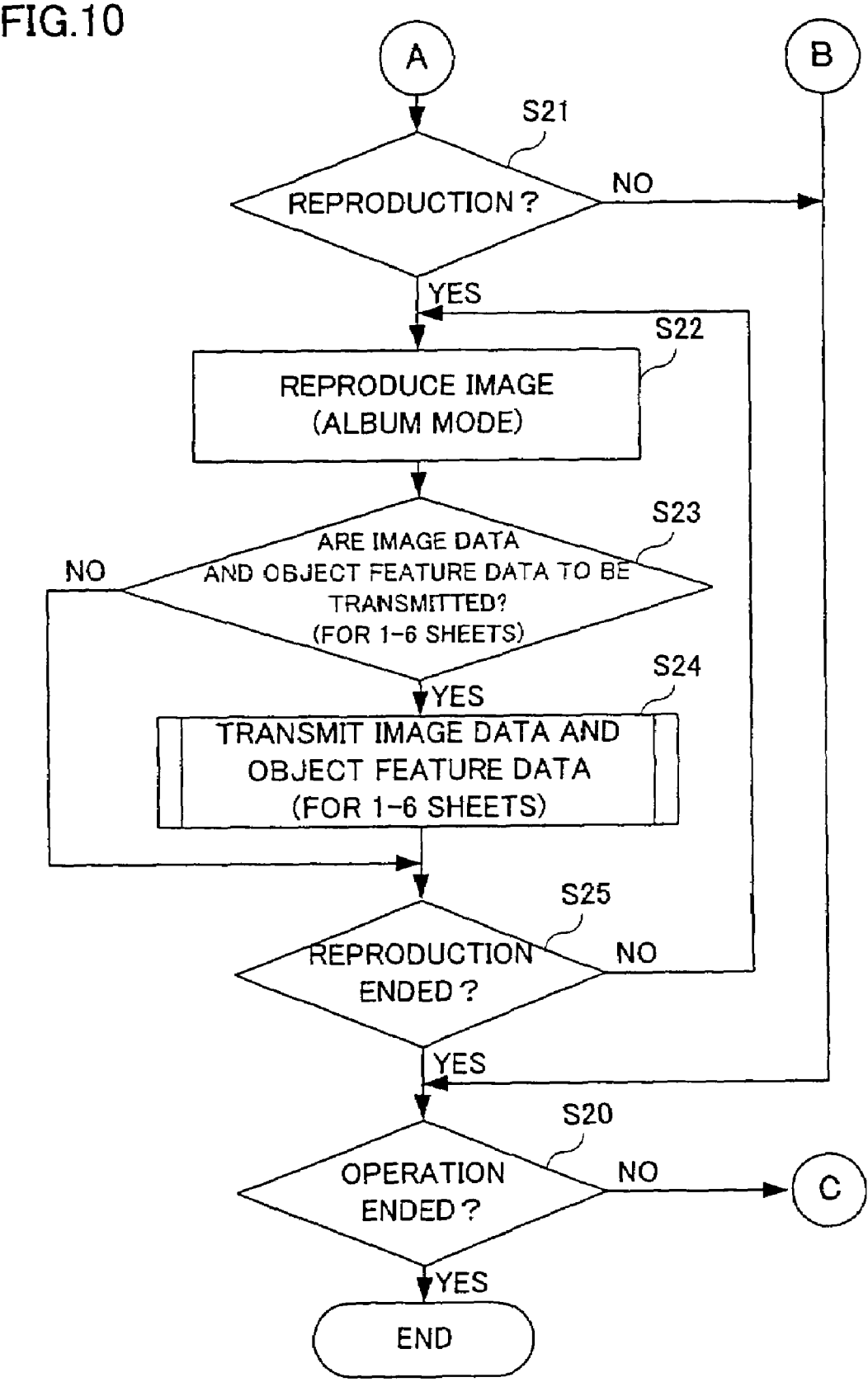
FIG. 10 is a flowchart showing another portion of the process of the fixed-type game machine of the FIG. 1 embodiment.

FIG. 9 and FIG. 10 are, in the hand-held type game machine 20, flowcharts of a process in which the object is photographed so as to generate the imaging data, and the object feature data is input.

Firstly, in step S11, a menu screen (not shown) for allowing the operator to select whether the hand-held type game machine 20 is started so as to photograph or watch the photographed image, is displayed. Then, in step S12, it is determined whether or not the operator selects photographing. In a case of determining that the photographing is performed, in step S113, the imaging index is displayed on the liquid crystal display screen 21b as shown in the state chart 62 in FIG. 5, encouraging the operator into photographing so as to obtain the appropriate imaging data for performing the image composition in the fixed-type game machine 11.

Next, in step S14, it is determined whether or not a shutter button (operating switch 21a of the hand-held type game machine 20, for example) is depressed. If depressed, the image photographed by the imaging portion 22a is stored in the hand-held type game machine 20 as the imaging data in step S15. If not depressed, a state where the imaging index is displayed is maintained in step S13.

Next, advancing to step S16, the data regarding the feature regarding the object of the imaging data stored in step S15 is input and stored by the operator as shown in the state chart 63, for example.

Next, in step S17, the operator is allowed to determine whether or not the imaging data currently photographed and its object feature data are transmitted to the fixed-type game machine 11. In case the photographed imaging data and its object feature data are to be transmitted, the process advances to step S18 so as to carry out a transmission process. The transmission process will be described later in FIG. 14. At this time, since the imaging data currently photographed is to be transmitted, transmittable data is one imaging data, and its object feature data only. After the transmission, or in a case of determining that the data is not to be transmitted later or in step S17, the process advances to step S19 so as to determine the photographing is to be ended. If the photographing is not to be ended, the process returns to step S13 so as to carry out another photographing process. On the other hand, in a case of ending the photographing, the process advances to step S20 shown in FIG. 10 so as to determine whether or not the task itself in the hand-held type game machine 20 is to be ended. At this time, if the task is to be ended is the photographing, the program is ended, otherwise the process returns to step S11 shown in FIG. 9 so as to display the menu screen.

Returning to step S12, in a case of not photographing, the process advances to step S21 shown in FIG. 10. In step S21, it is determined whether or not to enjoy the images photographed so far by displaying on the liquid crystal display screen 21b. At this time, if the photographed image is not to be displayed, the process advances to step S20.

If the photographed image is displayed, the process advances to step S21 so as to allow the images photographed so far to be watched on the liquid crystal display screen 21b. In step S23, it is determined whether or not to transmit favorite images to the fixed-type game machine 11 while watching the image photographed. In this embodiment, although it is possible to transmit the imaging data and its object feature data up to six pieces (sheets) as a maximum, it is obvious that the number of pieces or sheets to be transmitted is freely set depending on how a software program is created.

In a case of transmitting the imaging data and the object feature data, the process advances to step S24 so as to transmit the data to the fixed-type game machine 11. A transmission process at this time will be later described in FIG. 14. After the transmission, or in a case of determining that the data is not to be transmitted later in step S23, the process advances to step S25 so as to determine whether or not to end the display of the image. In case the display of the image is to be ended, the process advances to step S20, otherwise the process returns to step S22 so as to continue displaying the image.

Figure 11:
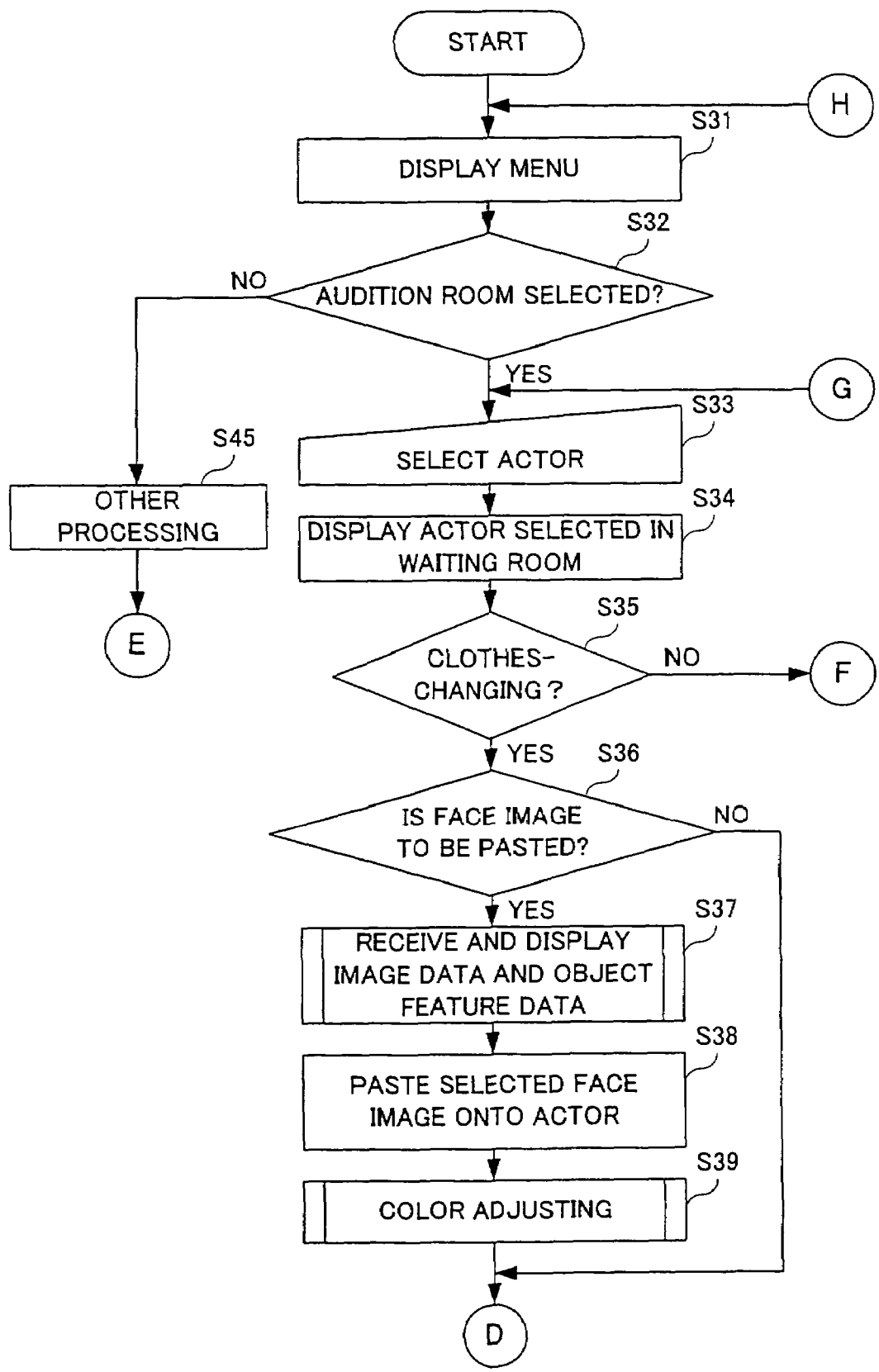
FIG. 11 is a flowchart showing one portion of the process of the fixed-type game machine of the FIG. 1 embodiment.
Figure 12:
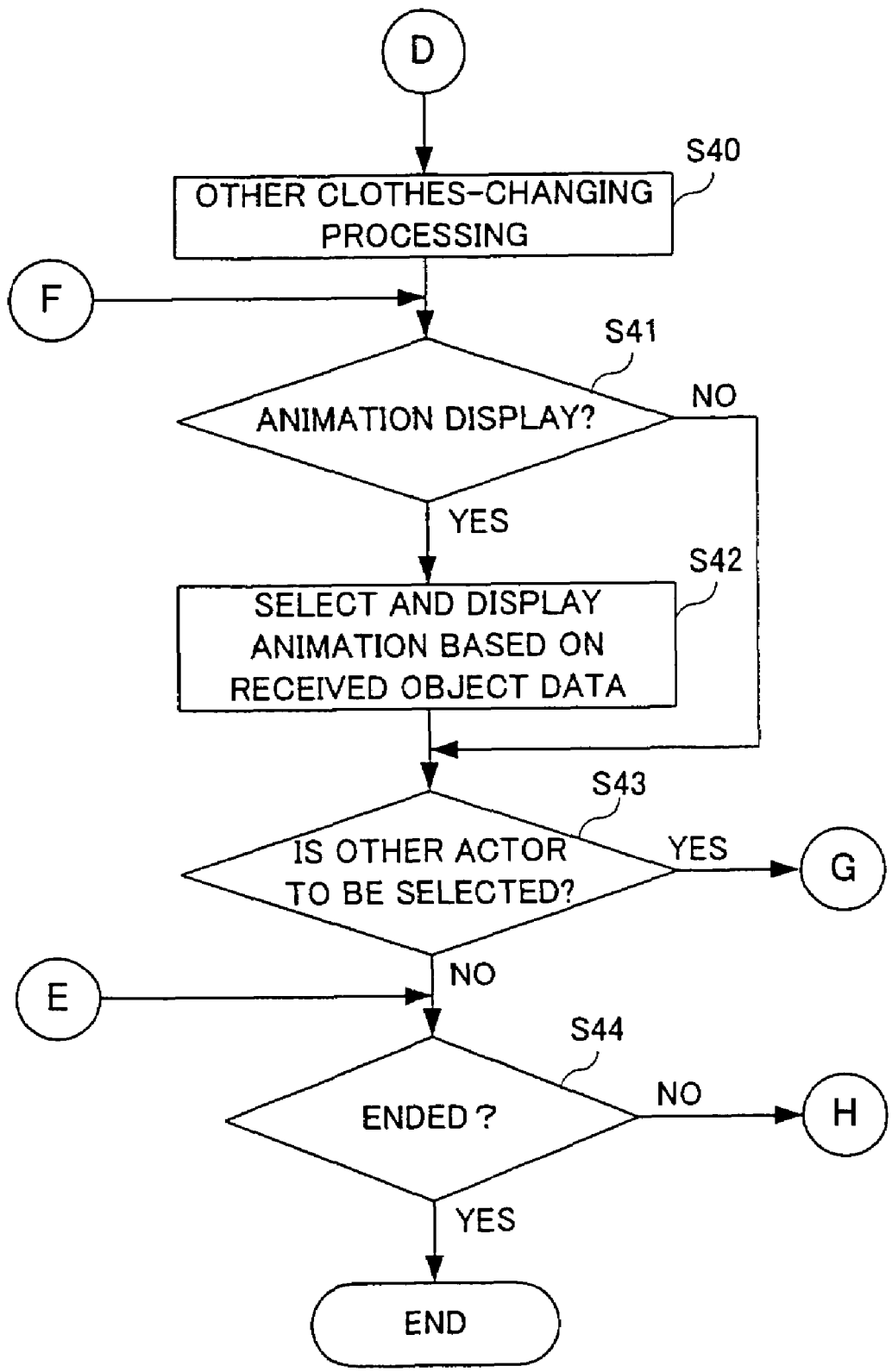
FIG. 12 is a flowchart showing another portion of the process of the fixed-type game machine of the FIG. 1 embodiment.

FIG. 11 and FIG. 12 are flowcharts of a process in which the operator uses the photographed imaging data so as to compose the provisional three-dimensional character image in the fixed-type game machine 11.

Firstly, after the fixed-type game machine 11 is activated, a menu screen (not shown), through which the operator selects a task to be done, for example, is displayed in step S31.

Next, it is determined whether or not the operator has selected is an audition room in step S32. The audition room is a virtual room shown in the screen display 65 for selecting the actor, that is, the provisional three-dimensional character image that the operator intends to compose. In step S33, the operator selects the actor, and then the process advances to step S34.

In step S34, the changing-clothes is applied to the selected actor, and the selected actor is displayed in the virtual waiting room for composing the imaging data, etc., as shown in the screen display 66. That is, this is a setting in which the actor selected in the audition room is brought along to the waiting room, for example.

In succeeding step S35, it is determined whether or not the changing-clothes is to be applied to the actor. If it is determined that the changing-clothes is to be applied, the process advances to step S36 shown in FIG. 12. In step S36, it is determined whether or not the operator pastes the imaging data to the face of the actor in the waiting room. In a case of pasting the imaging data, the process advances to step S37.

In step S37, the fixed-type game machine 11 carries out a communication with the hand-held type game machine 20 so as to receive and store the imaging data, and the object feature data from the hand-held type game machine 20. A transmission process at this time will be later described in FIG. 14.

In succeeding step S38, the pasting process of the imaging data transmitted from the hand-held type game machine 20 is applied to the actor selected by the operator while a deforming process of the actor based on the object feature data 20 is performed.

Then, in step S39, a process of adjusting a difference in color between the color of the imaging data, and the color primarily painted on the actor is carried out.

After the color adjustment is done, the process advances to step S40 so as to carry out processes such as another changing-clothes process, that is, a process of wearing a hat 66d in the display screen 66, for example, etc., are performed. Herein, in a case of not performing the pasting process of the imaging data in step S36, the process directly advances to step S40.

Next, after the deforming process is done, and upon completion of pasting the imaging data, and also composing the actor image to which the color adjustment is applied, the process advances to step S41. The operator selects whether or not to display the animation using the composed actor. In a case of selecting displaying the animation, the process advances to step S42 so as to select an animation program corresponding to the feature of the object based on the object feature data, and then the animation of the composed actor is displayed.

It is noted that in a case of determining that the changing-clothes process is not to be performed in step S35, the process may directly advance to the animation display of step S41. In this case, since the composing the actor using the imaging data is not performed, it is possible to perform the animation display using the feature data of the actor originally prepared.

Upon completion of the animation display, it is determined whether or not to perform similar processes using another actor in step S43. In addition, in a case of not selecting the animation display in step S41, the process directly advances to step S43.

In a case of selecting another actor, the process returns to step S33 shown in FIG. 11 so as to enjoy the image composition by selecting a new actor. Otherwise it is selected whether or not a series of operations are to be ended in step S44. If not ended here, the process returns to the very first step S31 shown in FIG. 11 so as to resume from the menu selection. In a case of selecting the ending in step S44, a series of operations are ended.

Figure 13:
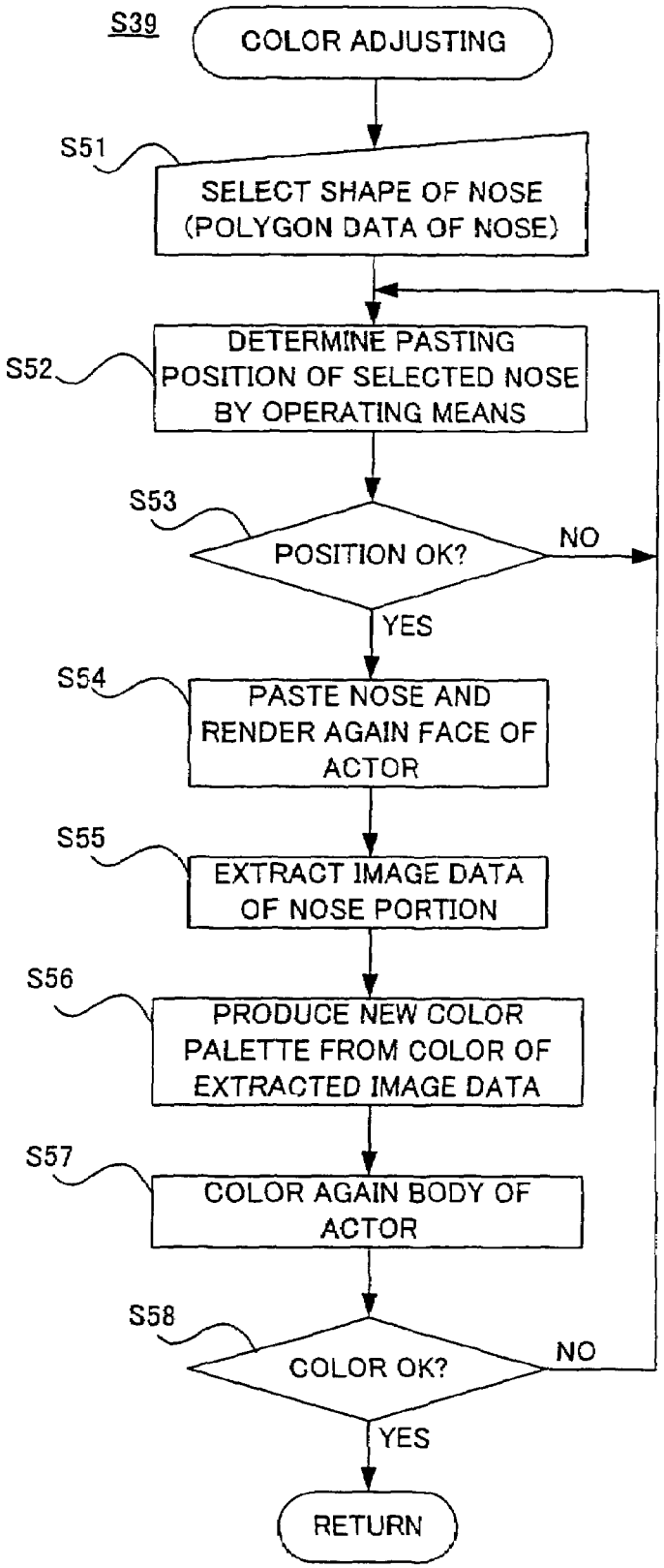
FIG. 13 is a flowchart a color adjusting process in the fixed-type game machine of the FIG. 1 embodiment.

FIG. 13 is a flowchart of the color adjustment process of step S39 in FIG. 11.

Now it is assumed that a process of pasting the imaging data to the image of the actor selected by the operator is ended. In this time in particular, it is taken into a consideration a case in which the image of the face is pasted to a portion of the face of the actor.

In step S51, a shape of the nose of the actor is selected. This process is made selectable after the pasting process of the image, taking into account that there is a case in which the shape of the nose of the actor selected in the first place, and the shape of the nose in the pasted image of the face are not matched.

Subsequently, in step S52, a process for determining in what position of the face of the actor the shape of the selected nose is arranged is carried out. Thus it is possible to determine the shape of the nose having a size and a position proportional to the pasted image of the face. In step S53, whether or not to determine the position is selected, and if not possible to select, the process returns to step S52 so as to continue positioning of the nose.

Upon completion of the positioning of the nose, the process advances to step S54 so as to redraw the image of the face based on the shape of the newly determined nose. This is due to the recreation of the polygon image once again now that the polygon image of the actor initially selected is changed by the changing of the shape of the nose. Then, the pasting of the face image is also redone.

After this, the process advances to step S55. A portion overlapped to the shape of the nose previously selected, and the face image in its adjacent portion are extracted. More specifically, this means that a portion of the image of the nose out of the face image to which the pasting process is applied is extracted.

After the imaging data of the nose is extracted, a palette of the color to be used for coloring a skin of the actor is reproduced from the imaging data in step S56. This is to take advantage of a fact that the imaging data of the nose has a shade, thus making it possible to estimate a color of a portion having a dark skin color of the object itself, a color of a portion having a shallow skin color, etc., from the imaging data. Herein, the palette originally prepared, for performing the coloring of the actor, is changed to a palette based on the imaging data.

Furthermore, the coloring of the actor, more specifically, a re-coloring of the skin color is done. As a result of the image thus pasted, and the difference in color between the actor being adjusted, the unnaturalness of the color in appearance is reduced.

In succeeding step S58, it is determined whether or not there is any problem regarding a color condition re-colored to the actor. If there is any problem, the process returns to step S52 so as to return to the positioning of the nose. Otherwise the process returns to the process of composing the image of the actor.

Figure 14:
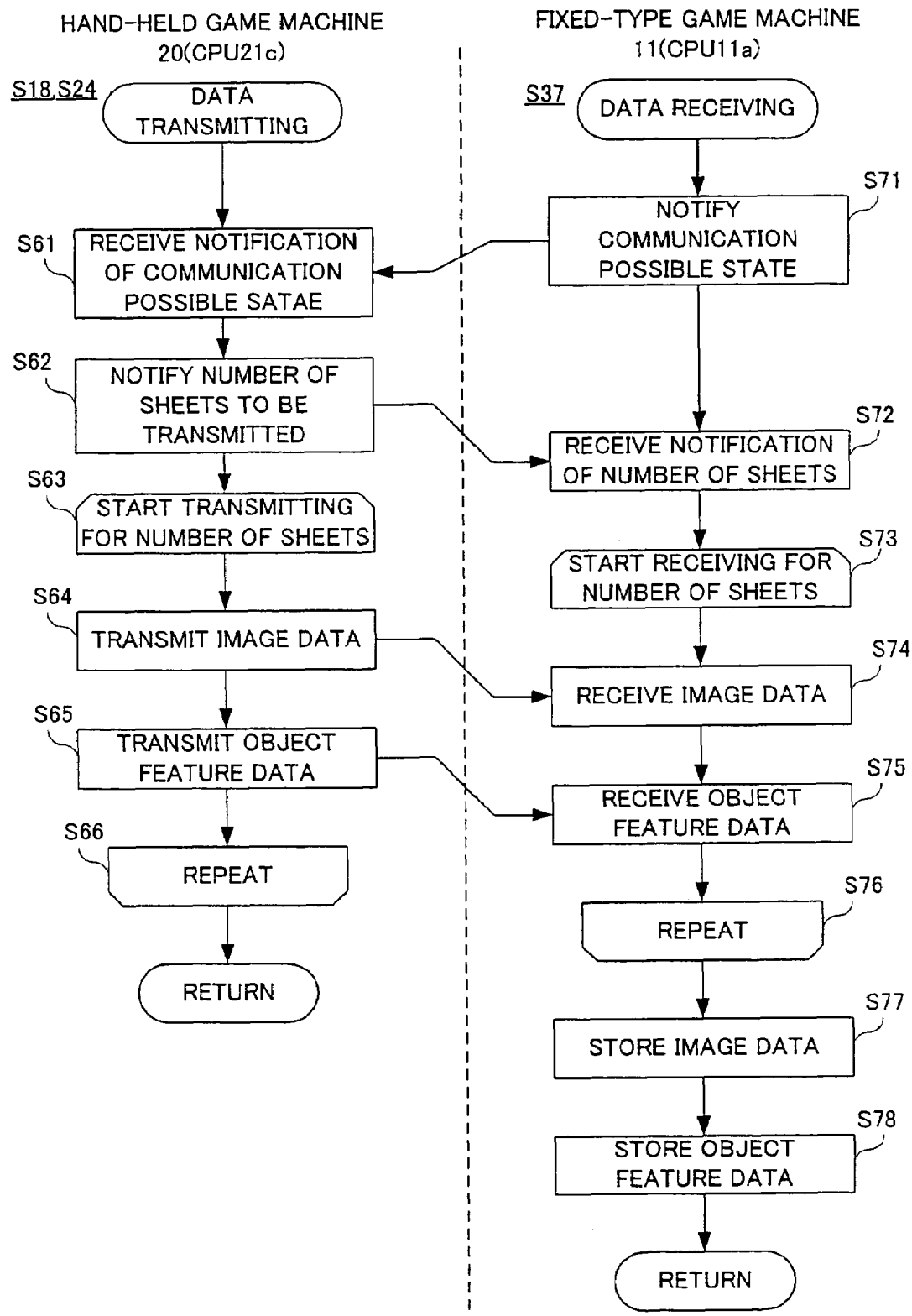
FIG. 14 is a flowchart related to a data transmission between the hand-held type game machine and the fixed-type game machine of the FIG. 1 embodiment.

FIG. 14 is a flowchart regarding a process in which a transmission of the imaging data and the object feature data is carried out between the hand-held type game machine 20 and the fixed-type game machine 11. At this time, the hand-held type game machine 20 carries out the process of step S18 or step S24 in its program process. On the other hand, the fixed-type game machine 11 carries out the process of step S37.

Firstly, in step S71, a signal indicating that the communication is possible is transmitted from the fixed-type game machine 11 to the hand-held type game machine 20. The hand-held type game machine 20 ascertains that it is communicable in step S61 before transmitting data of the number of sheets of the images to be transmitted to the fixed-type game machine 11 in step S62. In step S72, the fixed-type game machine 11 receives the data of the number of sheets of the images to be transmitted from the hand-held type game machine 20. Herein, descriptions are made provided that the number of images is the number indicating how many units of data are present, assuming that the imaging data and the object feature data are as a unit.

Next, the hand-held type game machine 20 carries out the processes from step S63 to step S66, and the fixed-type game machine 11 carries out the processes from step S73 to step S76 for as many times as the number of sheets of the images in such a manner that the both react on each other.

The hand-held type game machine 20, firstly, transmits the imaging data in step S64. On the other hand, the fixed-type game machine 11 receives the imaging data transmitted in step S74. Subsequently, in step S65, the hand-held type game machine 20 transmits the object feature data regarding the imaging data transmitted in step S64. The transmitted object feature data is received by the fixed-type game machine 11 in step S75.

Upon completion of transmitting the data as many as the number of the images, the hand-held type game machine 20 returns to a generating process of the imaging data. On the other hand, the fixed-type game machine 11 advances to step S77 upon completion of transmitting all the data. In step S77, the received imaging data is stored in such a manner as to be used in the display screen 67, and the like. In step S78, the object feature data stored while being brought into association with the corresponding imaging data. The process returns to the image producing process later.

According to the first embodiment, using the hand-held type game machine 20 and the fixed-type game machine 11, the operator can compose a desired actor while watching the display screen on the image display device 14. In particular, the imaging data is pasted to the selected image, and this is displayed as the animation, and it is quite interesting to see how it moves. In addition, when the image of the selected actor is deformed by the object feature data, it is still more interesting if changed to an unexpected image.

Furthermore, as a result of the face image being pasted to the actor, and the shape of the nose being selected and arranged, the color adjustment is performed. This may enable the operator to compose the image while enjoying it.

Figure 15:
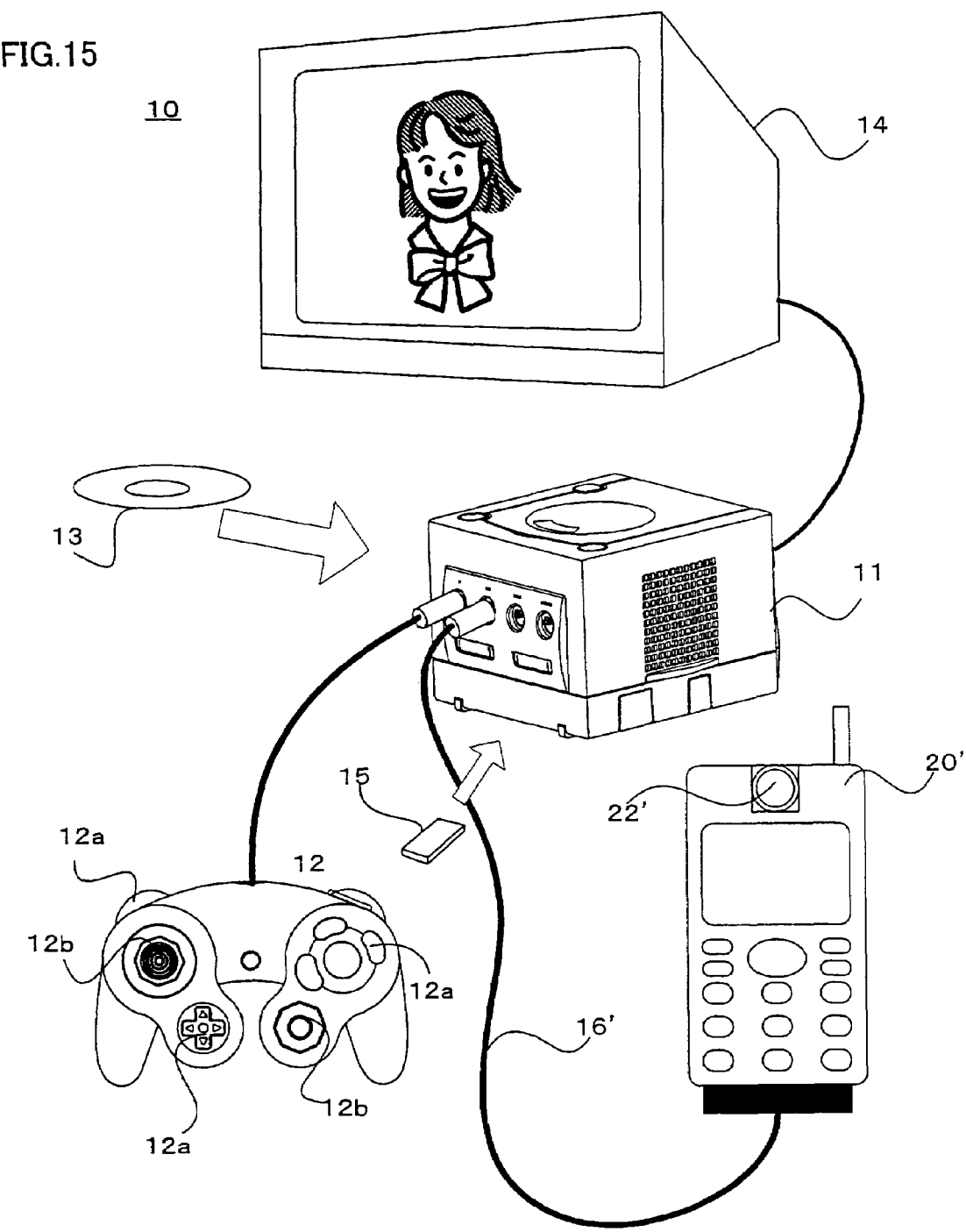
FIG. 15 is an outline view showing a modified example of the image processing system shown in FIG. 1.

It is noted that in the first embodiment, although the image data and the object feature data are to be transmitted from the hand-held type game machine 20, to which the imaging cartridge 22 is attached, to the fixed-type game machine 11, a camera-equipped cellular telephone 20' may be used instead of the hand-held type game machine 20, to which the imaging cartridge is attached, as shown in FIG. 15.

The camera-equipped cellular telephone 20' is provided with an imaging apparatus 22' such as a CCD imager, and connected to the fixed-type game machine 11 using a cable 16'. The camera-equipped cellular telephone 20' downloads the program or data shown in FIG. 3, and stores in an internal memory, for example. The program or the data is a WEB content such as "i-Appli (registered trademark)" provided by NTT DoCoMo, Inc., for example. Therefore, the operator operates a dial key (ten key, etc.), and photographs a face of himself, other persons, etc., by the imaging apparatus 22' so as to obtain photographing data. At this time, the imaging indexes 62a-62d as shown in the state chart 62 in FIG. 5 are displayed on the liquid crystal display device of the camera-equipped cellular telephone 20'. Furthermore, the operator inputs the object feature (data) shown in the state chart 63 in FIG. 5 by operating the dial key. However, in the camera-equipped cellular telephone 20', the display screen of the liquid crystal display device is so small that the face image as shown in the state chart 63 in FIG. 5 is not shown in a case of inputting the object feature.

Second Embodiment

Figure 16:
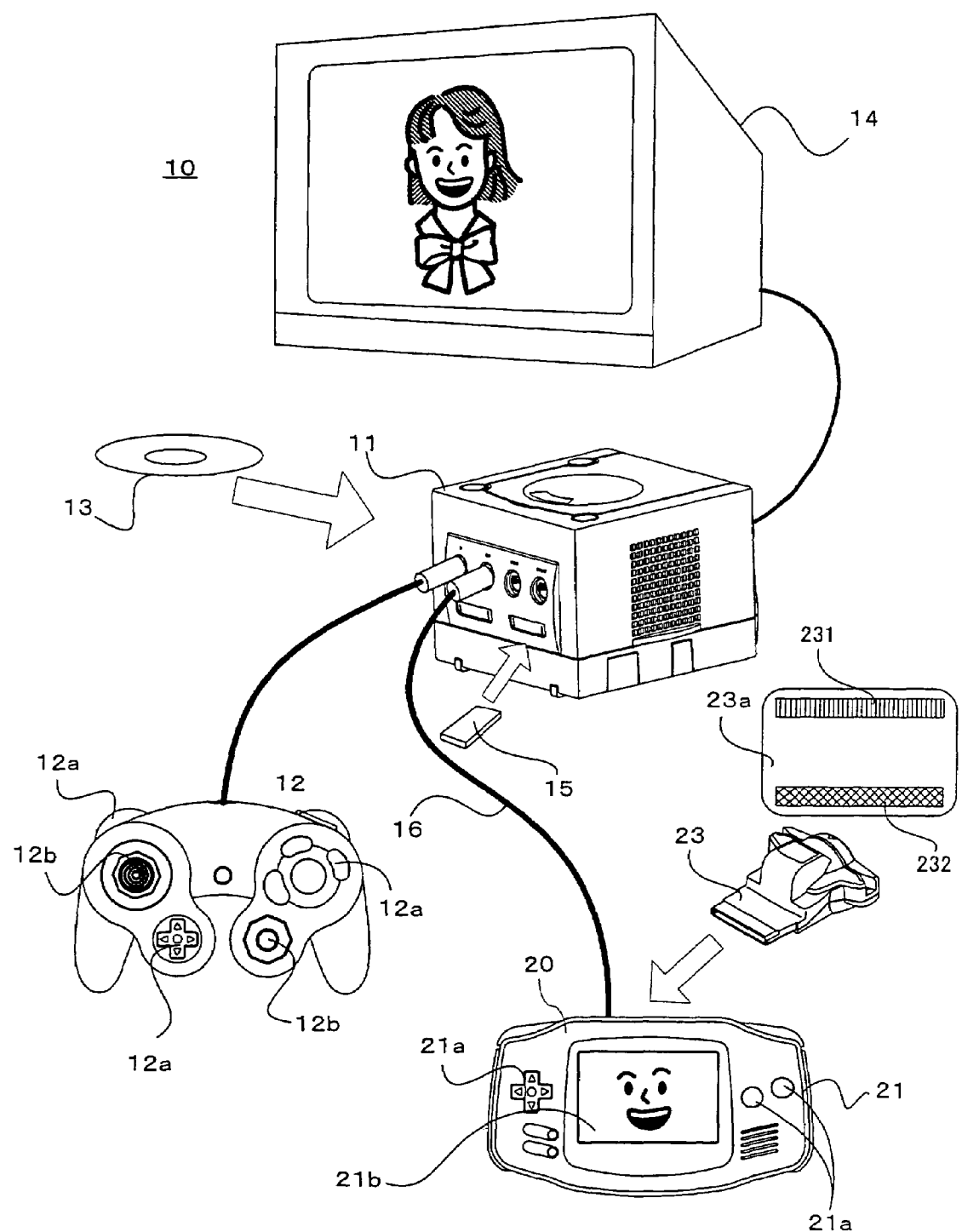
FIG. 16 is an outline view showing another example of the image processing system of certain exemplary embodiments.

FIG. 16 is a diagram showing an outline of another example of the image processing system 10 according to certain exemplary embodiments. Instead of the imaging cartridge 22, the image processing system 10 of the second embodiment has a card reader 23 attached to the hand-held type game machine 20, and is the same as the first embodiment except that the image data (equal to the imaging data in the first embodiment), and the image feature data (equal to the object feature data in the first embodiment) are read-out from a recording medium such as a card 23a ("CARD e" (trademark) manufactured and marketed by the applicant). Thus, descriptions are applied only to different portions, and the descriptions are omitted regarding duplicated portions.

As understood from FIG. 16, similar to the imaging cartridge 22 in the FIG. 1 embodiment, the card reader 23 is attached to the hand-held type game machine 20. When the card reader 23 is brought into a state capable of reading the data, the operator inserts the card 23a through the card reader 23. Then, the data stored in the card 23a is read by the card reader 23, and the image data and the image feature data are generated based on the read data.

Figure 17:
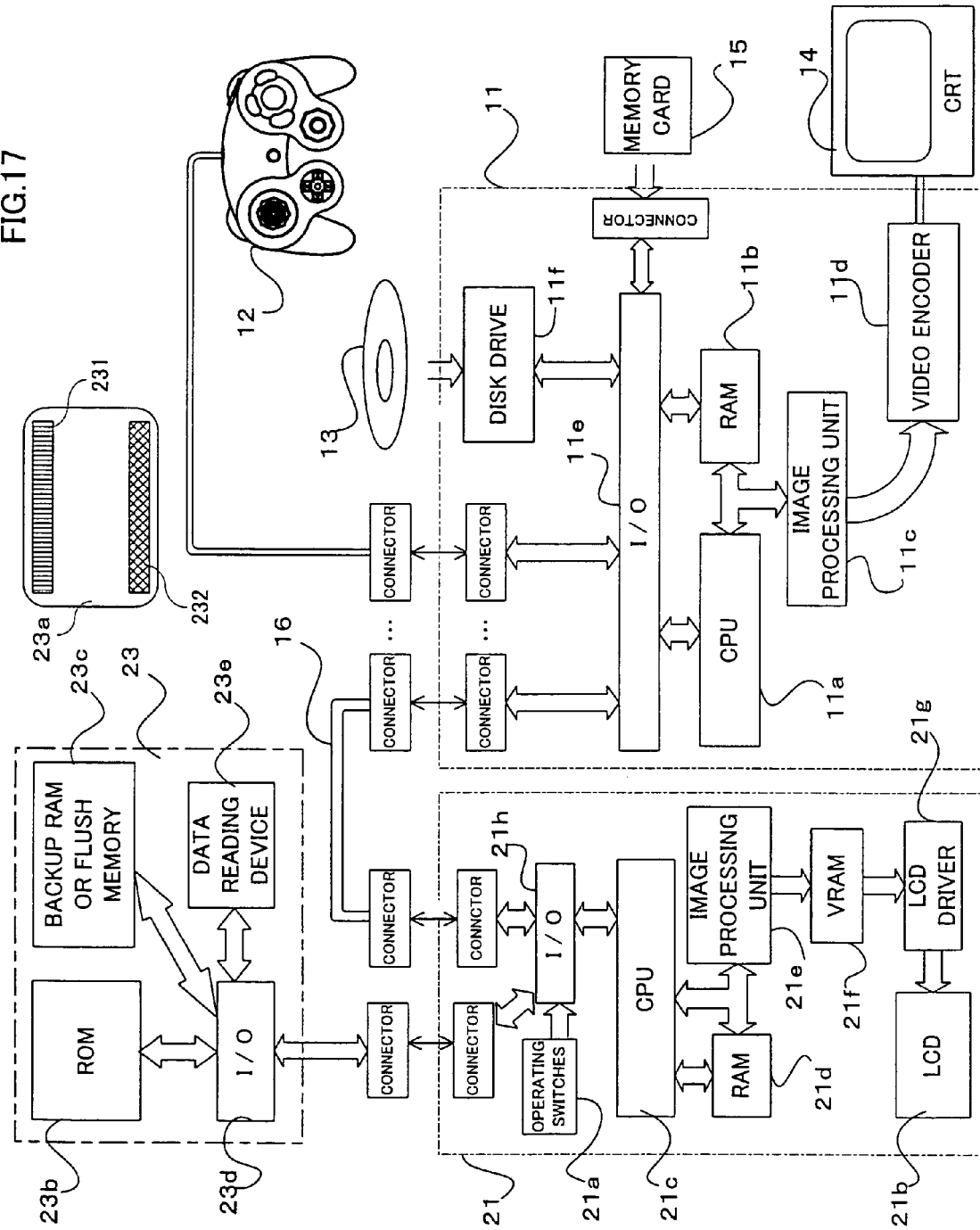
FIG. 17 is an internal block diagram of the image processing system shown in FIG. 16.

FIG. 17 is a block diagram showing a electrical constitution of the image processing system 10 of the second embodiment. Referring to FIG. 17, the card reader 23 is rendered detachable to the hand-held type game machine main body 21 via the connector. In addition, the card reader 23 is incorporated with a ROM 23b storing the program and the data used for the hand-held type game machine 20. Furthermore, a backup memory (RAM) 23c is mounted in the card reader 23.

Although not shown, an illustrated image or a photo image of a famous person (a sports athlete, an actor, a singer, a performer, etc.), a game character or an animation character, etc., are recorded (printed) in the card 23a. In addition, a storing area 231 for storing the printed image, and a storing area 232 for storing a feature (image feature) regarding the image are formed in the card 23a. In the storing area 231, the image data regarding the image is recorded (or printed) by a two-dimensional bar code, and rendered optically readable. In the storing area 232, the image feature (name of the famous person, and others, gender, profile, . . . etc., for example) data regarding the image data is recorded in a mechanically readable manner similar to the image data.

It is noted that the image data and the image feature data recorded in the storing area 231 and the storing area 232 can be recorded in another mechanically readable manner. Herein, another mechanically readable manner may be considered such as readable manners, which are electrically, magnetically, etc., for example.

FIG. 18 is an illustrative chart specifically showing contents of the data recorded in the card 23a. Referring to FIG. 18, the data of a name (title), a gender, a height, a weight, an age, a birthday, a personal character, a hobby, a comment, a profession, a face photograph (face image), and a body shape (a length and a thickness of a head, a hand, a leg, and an arm) is stored in the card 23a of the famous person. In addition, the data of a model ID, a color ID, and a pattern ID of a hair (hair style), a model ID, a size, and a location of the nose, a model ID, and a size of an ear, a model ID, and a color ID or a pattern ID of a jacket, and a model ID, a color ID, a pattern ID of a shirt is stored Furthermore, the data of a model ID, a color ID, a pattern ID of trousers, a model ID, a color ID, and a pattern ID of pants, a model ID, a color ID, and a pattern ID of socks, a model ID, a color ID, and a pattern ID of shoes, and a model ID, a color ID, and a pattern ID of an accessory is recorded.

Herein, the IDs regarding a body portion such as the hair, the nose, the ear, etc., and the IDs regarding a clothes, and the accessory such as the jacket, the shirt, etc., are identifying information for identifying actor changing-clothes data 56 stored in the RAM 11b of the fixed-type game machine 11.

In the card 23a of the game character or the animation character, similar data as described above is stored. However, if the character is like an animal, a model ID, a color ID, a pattern ID, etc., of a body hair is stored instead of the hair or the clothes (including the stock, the shoes, the accessory, etc.).

It is noted that in the card 23a of the game character, and the animation character, the data used for a game using the character is further stored. In the card 23a of the character, for example, the data of a tribe or kind and a capability of the character is stored. Herein, the tribe or kind means a property of the character set by the operator, and others of the game (animation) character. Furthermore, the capability includes an intellectual capability, a physical strength, an agility, a power, a popularity, etc.

Although not shown, information (card number) for identifying a kind (depending on the famous person, the game character, the animation character, etc.) of the card 23a is also recorded in the card 23a.

Furthermore, in the second embodiment, in order to empower versatility to an application of the game, etc., using the card 23a, the image data, and the image feature data described above are to be stored in the card 23a. However, the image data and the image feature data may be constituted in such a manner as to be stored in an internal memory (not shown) such as a ROM or an external storage medium 13 that supplies the fixed-type game machine 11 with the game program, the image data, etc., and rendered readable corresponding to the identifying information (card number or card ID) of the card 23a. In this case, only the card number and the card ID may be recorded in the card 23a.

Furthermore, in the second embodiment, in order that the image data, and the image feature data are easily understood, these data are recorded in such a manner as to be recorded into two divided portions, i.e., the storing area 231, and the storing area 232. However, it may be possible that these data are congregated so as to be recorded in one portion.

Returning to FIG. 17, a CPU 21a of the hand-held type game machine main body 21 accesses to the card reader 23 via an interface 21h. That is, the CPU 21a processes the program and the data stored in the ROM 23b so as to generate the image data and the image feature data based on the data read by a data reader 23e. More specifically, the read data is temporarily held in the RAM 23c, and the CPU 21c, using the RAM 23c or the RAM 21d, converts the data held in the RAM 23c into the image data and the image feature data. Later, converted (generated) image and image feature data are saved into the RAM 23c, and read-out in accordance with an instruction of the CPU 21c. A reason why the data read-out from the card 23a is converted so as to generate the image data and the image feature data is that the data is rendered processable in the fixed-type game machine 11 as an image composing apparatus. That is, the data is rendered the same format as the imaging data, and the object feature data as shown in the first embodiment.

Furthermore, the generated image data and the image feature data are saved in the RAM 23c, thus making it possible to connect the card reader 23 to another hand-held type game machine so as to be used.

It is noted that in the second embodiment, the image data and the image feature data are generated in accordance with the data read from the card 23a. However, in steps that follow, for the sake of simplicity, the data is referred to as the image data and the image feature data read-out from the card 23a.

In addition, the electrical constitution of the fixed-type game machine 11 and the hand-held type game machine 20 is the same as that of the first embodiment, thus the detailed descriptions are herein omitted.

FIG. 19 is a memory map 80 of the ROM 23b provided in the card reader 23. The ROM 23b is mainly formed of two divided portions, i.e., a program storing area 81, and a data storing area 82. The program storing area 81 includes an image fetching program storing region 81a, an image feature data fetching program storing region 81b, and a data transmitting program storing region 81c.

In the image fetching program storing region 81a, a program for reading-out the image data from the card 23a is stored. In addition, in the image feature data fetching program storing region 81b, a program for reading-out the image feature data from the card 23a is stored. In the data transmitting program storing region 81c, a program for transmitting the image data, and the image feature data to the fixed-type game machine 11 is stored.

The data storing area 82 includes a card reader program image data storing region 82a, and a card reader program sound data storing region 82b. In the storing region 82a, in a case of reading-out the data of the card 23a by the card reader 23, screen (image) data such as a message display screen, etc., for introducing the operator to the operation is stored. Furthermore, in the storing region 82b, in a case of reading-out the data of the card 23a by the card reader 23, sound data such as a sound effect indicating that the data is being read-out, and an informing sound indicating a success of reading the data or a warning sound indicating a failure of reading the data is stored.

Although not shown, in the RAM 23c, an image data storing region, and an image feature data storing region are provided.

The image data storing region is a region that stores the image data read-out by the card reader 23, by the program stored in the face image fetching program storing region 81a.

Furthermore, the image feature data storing region is a region that stores the image feature data read-out by the card reader 23, by the program stored in the image feature data fetching program storing region 81b. The image feature data stored in the image feature data storing area is stored in the image data stored in the corresponding image data storing area in such a manner so as to be brought into association with each other.

FIG. 20 is a memory map 40 in the RAM 11b of the fixed-type game machine 11 of the second embodiment. The memory map 40 shown in FIG. 20 is the same as the memory map 40 of the first embodiment except that a feature data editing program 43h is added to the actor editing program 43, and therefore, the duplicated descriptions are herein omitted. In addition, for the sake of illustration, details of the same content as the memory map 40 shown in the first embodiment are omitted in FIG. 20.

The feature data editing program 43h is a program for editing a body shape, a hair style, a nose, an eye, clothes, etc., of the three-dimensional character image regarding the famous person, the game character, and the animation character (these are hereinafter briefly referred to as the "character") shown in the image display device 14 based on the image feature data received from the card reader 23.

More specifically, the CPU 11a of the fixed-type game machine 11 executes processes according to flowcharts shown in FIG. 21-FIG. 27. It is noted that in the second embodiment, the image data and the image feature data read from the card 23 are obtained so that, regarding a certain process (character producing process: see FIG. 22), a process is executed even in the CPU 21c of the hand-held type game machine 20.

Figure 21:
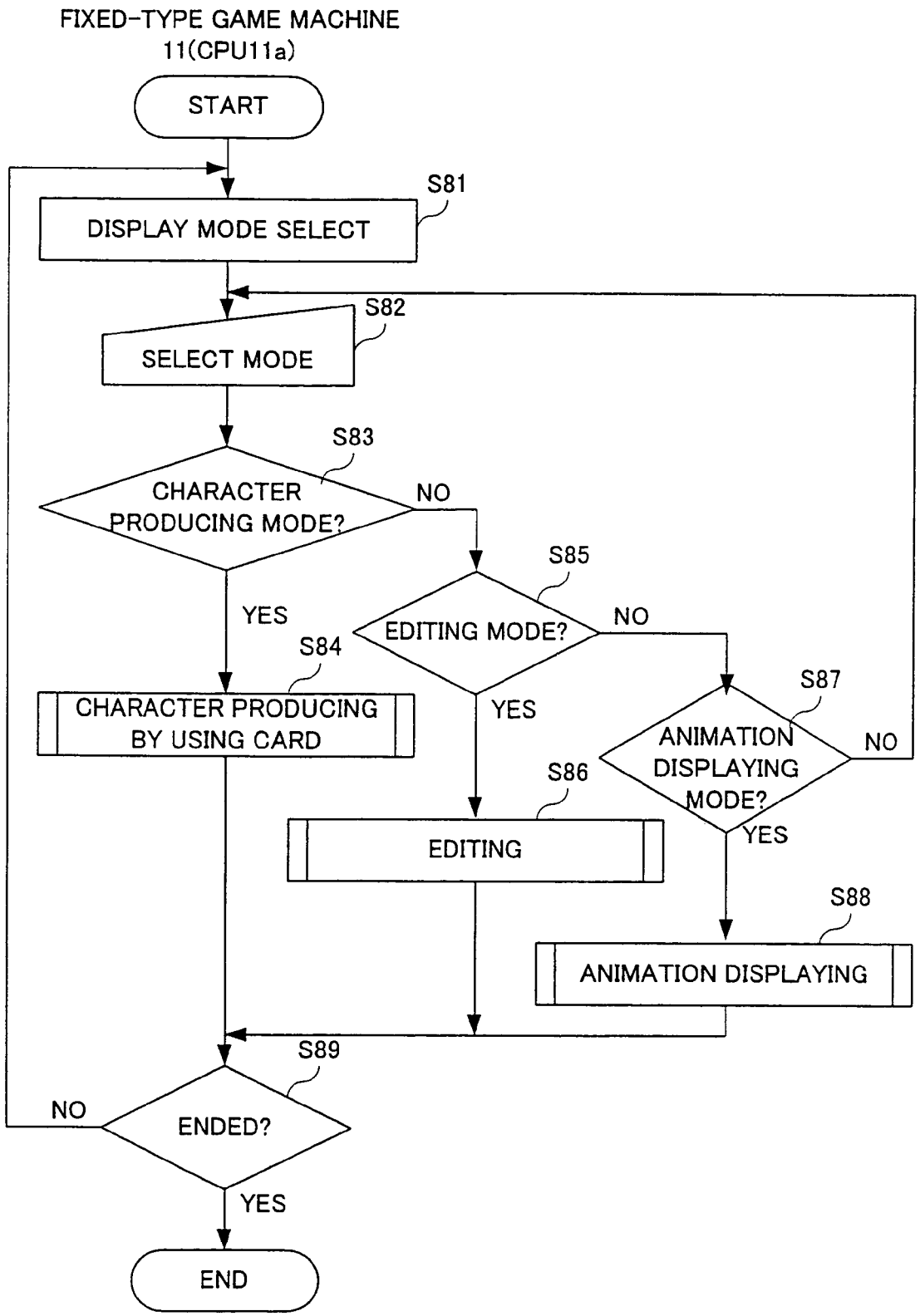
FIG. 21 is a flowchart showing an entire operation of an application of the fixed-type game machine shown in the FIG. 16 embodiment.

As shown in FIG. 21, when a CPU 11a of the fixed-type game machine 11 starts an entire process of an application, a mode selection screen (not shown) is displayed on the image display device 14 in step S81. Although not shown, the mode selection screen is a screen for selecting any one of a character (chara) producing process, an editing (actor editing) process, and an animation displaying process described later.

In succeeding step S82, the operator selects the mode. Then, in step S83, it is determined whether or not the character producing process is selected. Herein, in a case where the character producing process is selected, the process executes the character producing process (see FIG. 22) by a card 23 described later in step S84, and then advances to step S89.

On the other hand, in a case where the character producing process is not selected, it is determined whether or not the editing process is selected in step S85. Herein, in a case that the editing process is selected, the process executes an editing process (see FIG. 23) in step S86, and then advances to step S89.

If the editing process is not selected, it is determined whether or not the animation displaying process is selected in step S87. Herein, if the animation displaying process is not selected, either, then the process returns to step S82, determining that the mode selection is not yet finalized. However, if the animation displaying process is selected, the process executes an animation displaying process (see FIG. 24, and FIG. 25) described later in step S88, and then advances to step S89.

In step S89, whether or not the process is to be ended is determined. That is, it is determined whether or not the operator decides to end the entire process of the application. Herein, if it is not decided to end the entire process of the application, the process directly returns to step S81. However, if it is to end the entire operation, the process ends the process.

Figure 22:
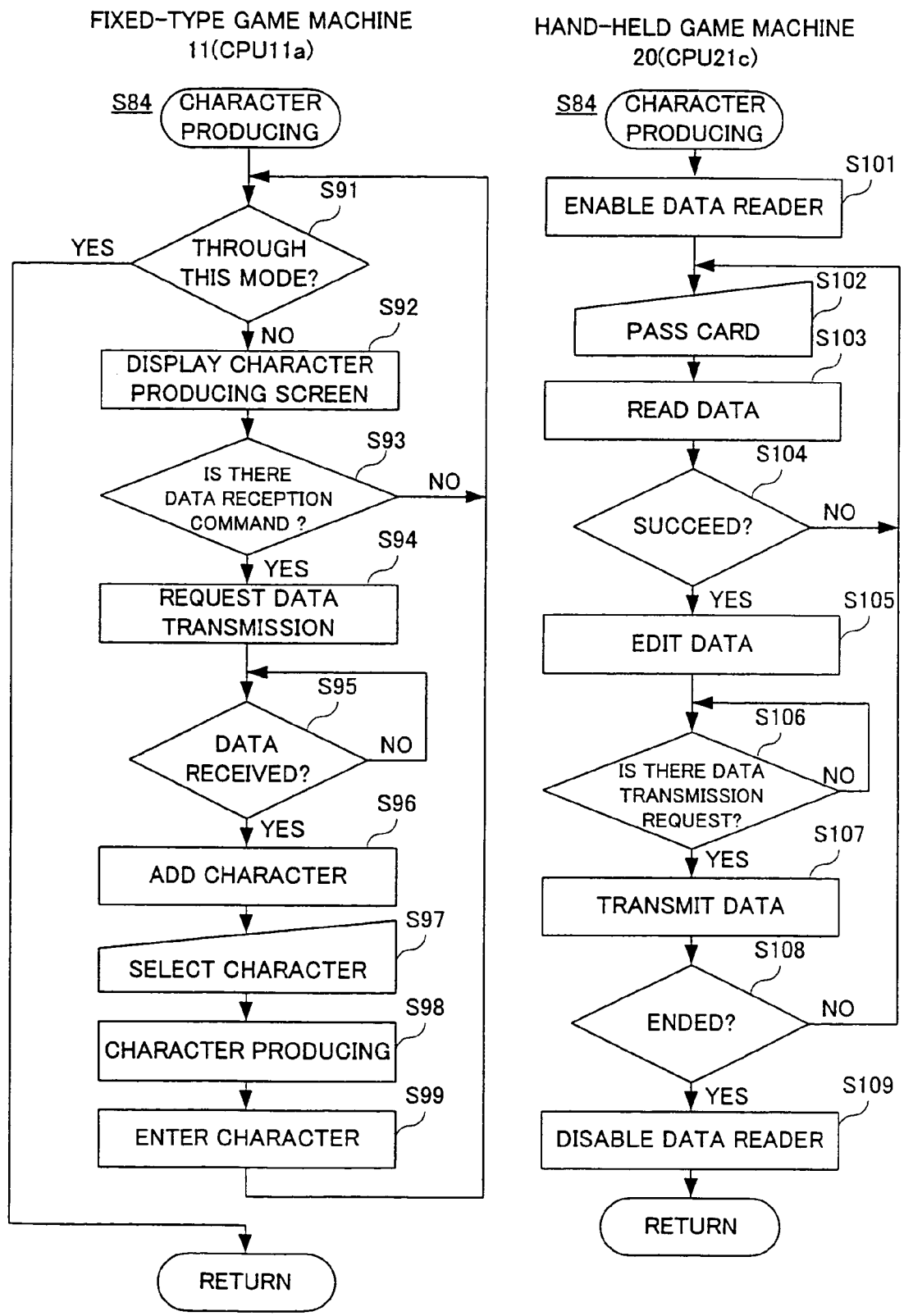
FIG. 22 is a flowchart showing a character producing process of the fixed-type game machine and the hand-held type game machine shown in the FIG. 16 embodiment.

FIG. 22 is a flowchart of the character producing process (S84) by the card 23a. In the character producing process (S84), processes are executed in the respective fixed-type game machine 11 (CPU 11a) and the hand-held type game machine 20 (CPU 20c) as shown in FIG. 22.

The CPU 11a of the fixed-type game machine 11, upon starting the character producing process, determines whether or not to pass through the mode in step S91. That is, it is determined whether or not the operator decides to end the character producing process by operating a controller 12 or an operating switch 21a, for example. In processes that follow, in a case that the operator operates, it is possible to operate using either the controller 12 or the operating switch 21a. Herein, in a case of passing through the mode, although not illustrated, the process returns the character producing process after transmitting the ending instruction of the character producing process to the CPU 21c of the hand-held type game machine 20. However, in a case of not being capable of passing through the mode, the process displays a character producing screen 90 as shown in FIG. 28 in the image display screen 14 in step S92.

Figure 28:
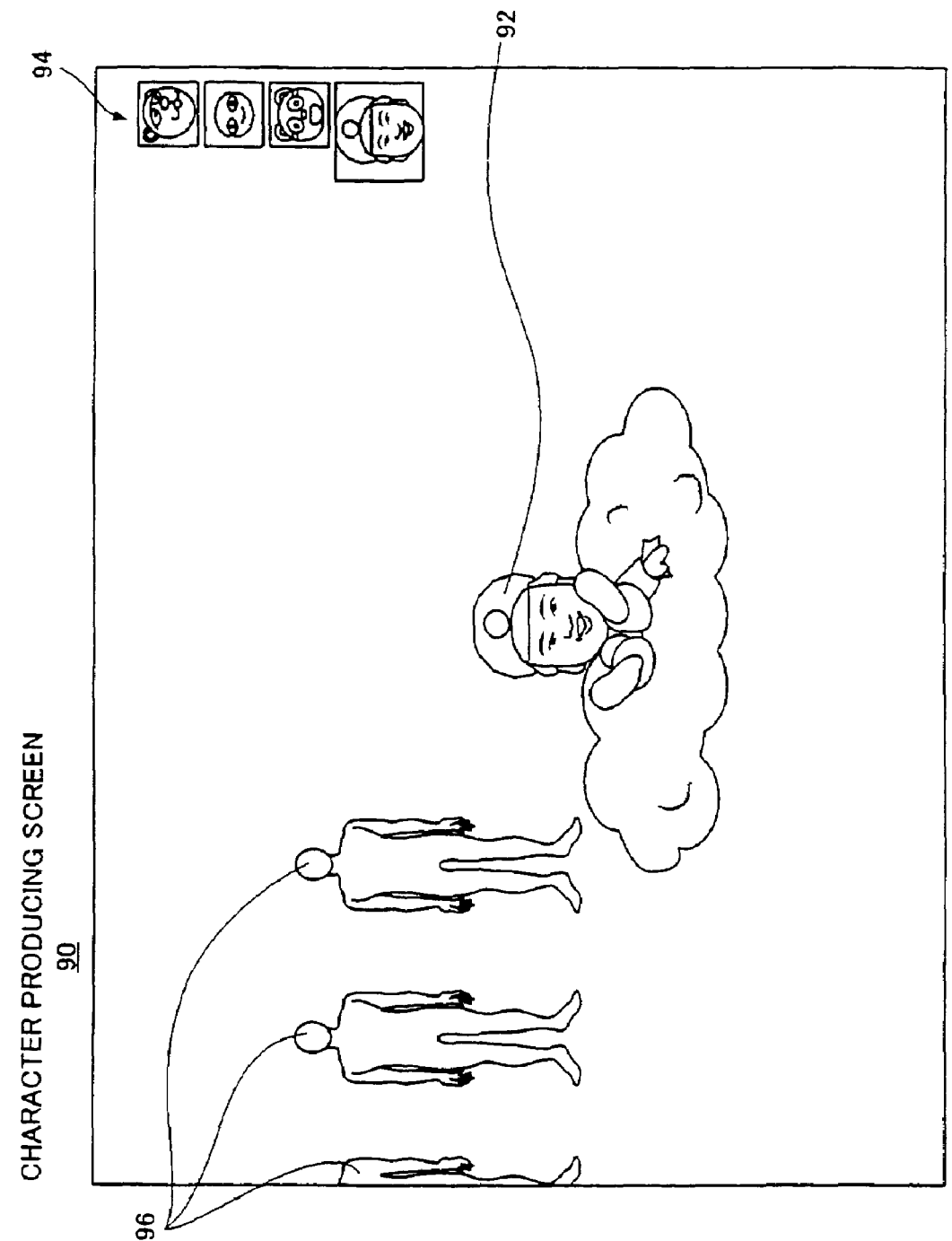
FIG. 28 is an illustrative view showing one example of a character creating screen.

As shown in FIG. 28, the character producing screen 90 displays a produced character 92 at an approximately center. In addition, at an upper right of the character producing screen 90, a face image displaying portion 94 is provided. On the face image displaying portion 94, a reduced image of the fetched face image is displayed. Furthermore, on a left of the character producing screen 90, a plurality of provisional three-dimensional character images 96, which serve as a basic model of the character 92, are displayed.

It is noted that the character producing screen 90 corresponds to the state chart 65, and the state chart 66 (see FIG. 6) of the first embodiment, the character 92 corresponds to the actor 65' to which the face image of the first embodiment is attached, and the provisional three-dimensional character image 96 corresponds to the actor 65a, and 65b of the first embodiment. However, in the provisional three-dimensional character image 96 of the second embodiment, unlike the actor 65a and 65b of the first embodiment, only a human shape of the same body shape (physical characteristic), which does not wear a hair, portions of the face (eye, nose, mouth, etc.), clothes, etc., is displayed.

Returning to FIG. 22, in succeeding step S93, it is determined whether or not an instruction of receiving the data exists. In a case of no instruction of receiving the data, the process directly returns to step S91. However, in a case that the instruction of receiving the data exists, a transmission request of the data is transmitted to the CPU 21c of the hand-held type game machine 20 in step S93.

Next, in step S95, it is determined whether or not the data is received. In a case of not receiving the data, the process directly returns to step S95 so as to wait for a reception of the data. On the other hand, in a case of receiving the data, a character is added in step S96. That is, the image data, and the image feature data are stored in the received data storing area 52. At this time, on the face image displaying portion 94 of the character producing screen 90, a reduced image of the face image based on the received image data is displayed.

In succeeding step S97, the operator selects the face image. In step S98, the character is produced. That is, the face image based on the image data is pasted onto the provisional three-dimensional character image. In addition, at this time, the image feature data is edited, and the shape (body shape), the clothes, the hair style, etc., of the provisional three-dimensional characteristic image 96 are changed. The shape (outer shape) of the provisional three-dimensional character image 96 is changed based on the body shape, and the gender included in the image feature data is changed, for example, and based on the model ID, etc., of the hair, the model ID, etc. of the clothes (jacket, shirt, trousers, pants, socks, and shoes), and the model ID, etc., of the accessory, a texture such as the hair, the clothes, the socks, the shoes, the accessory, etc., is pasted to the deformed provisional three-dimensional character image 96. Then, in step S99, the character regarding the face image selected by the operator is appeared, that is, the character 92 is displayed on the character producing screen 90, and then the process returns to step S91. Therefore, it is possible to continually fetch the data, and in addition, also possible to pass through the mode.

Figure 29:
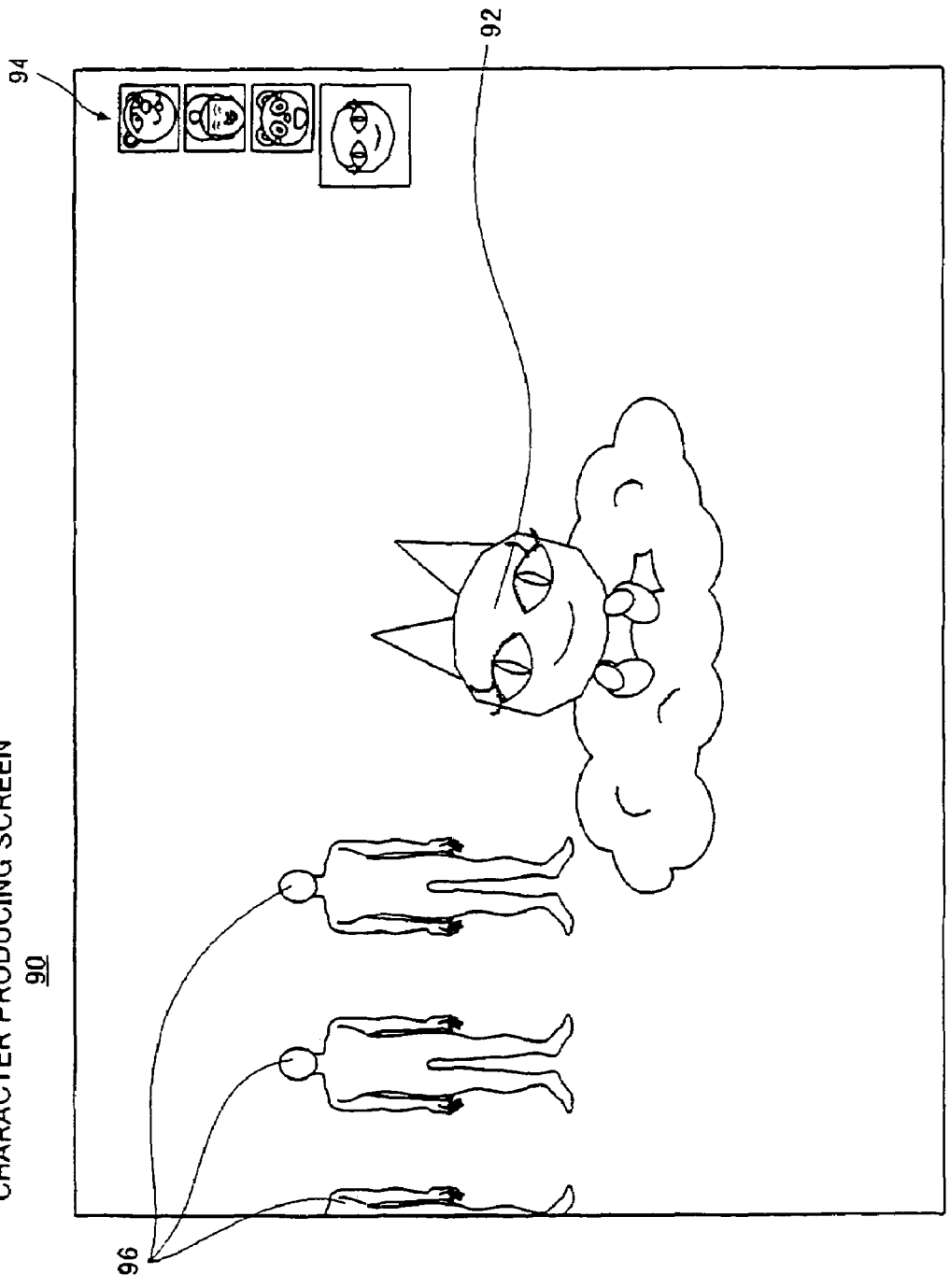
FIG. 29 is an illustrative view showing another example of the character creating screen.

Furthermore, as shown in FIG. 29, in the character producing screen 90, if the face image of the game character displayed on the face image displaying portion 94 is selected, the character 92 corresponding to the face image is displayed (appeared) at the center of the character producing screen 90 in step S98. At this time, the shape and/or the clothes of the provisional three-dimensional character image 96 (in a case of the character that likens to the animal, a kind of the skin, and the skin hair, the manner, etc.) are determined by editing the image feature data, which is described above.

That is, in the character producing process (S84), a default character 92, which is based on the image data, and the image feature data recorded in the card 23a, is produced, and displayed on the screen.

On the other hand, the CPU 21c of the hand-held type game machine 20, upon starting the character producing process, enables a data reader 23e in step S101. Although not illustrated, when the data reader 23e is enabled, a message, which provides information about being capable of reading the data, is displayed on the liquid crystal display screen 21b. In succeeding step S102, the operator inserts the card 23a through the card reader 23 (data reader 23e) so as to read-out the data in step S103. Then, in step S104, it is determined whether or not it is successful in reading the data. Herein, in a case of failing to read the data, the process directly returns to step S102 so as to allow the operator to insert the card 23a through the data reader 23e once again. It is noted that in a case of failing to read the data, a warning message or a warning sound or both, which informs of the failure, may be output.

On the other hand, in a case of succeeding in reading the data, it is determined whether or not there is a transmission request of the data from the CPU 11a of the fixed-type game machine 11 in step S105. Herein, if there is no transmission request of the data, the process returns to step S105 so as to wait for the transmission request of the data. On the other hand, if the transmission request of the data exists, the data read-out this time is transmitted to the fixed-type game machine 11 in step S106.

It is noted that in a case of succeeding in reading the data in step S1104, the process is to directly advance to step S105. However, a message or an informing sound, which informs of the success in reading the data, or both is output, and then the process may advance to step S105.

In addition, in this second embodiment, each of the image data and the image feature data is stored in the respectively different storing area 231 and the storing area 232 so that, in step S102, the operator inserts the card 23a through the card reader 23 so as to read-out both the storing area 231 and the storing area 232, and in step S104, it is to be determined whether or not successful in reading both the image data and the image feature data.

Furthermore, in step S107, it is determined whether or not the character producing process is ended. That is, it is determined whether or not an ending instruction of the character producing process is transmitted from the CPU 11a of the fixed-type game machine 11. Herein, in a case of not ending the character producing process, the process returns to step S102, assuming that the subsequent data of the card 23a is to be read-out. On the other hand, in a case of ending the character producing process, the process disables the data reader 23e in step S108 before returning the character producing process.

It is noted that in the second embodiment, the card 23a is read one by one, and in each case, the image data and the image feature data are to be transmitted. However, after reading a plurality of cards 23a, a plurality of pieces of the image data and the feature data may be transmitted all at once.

Figure 23:
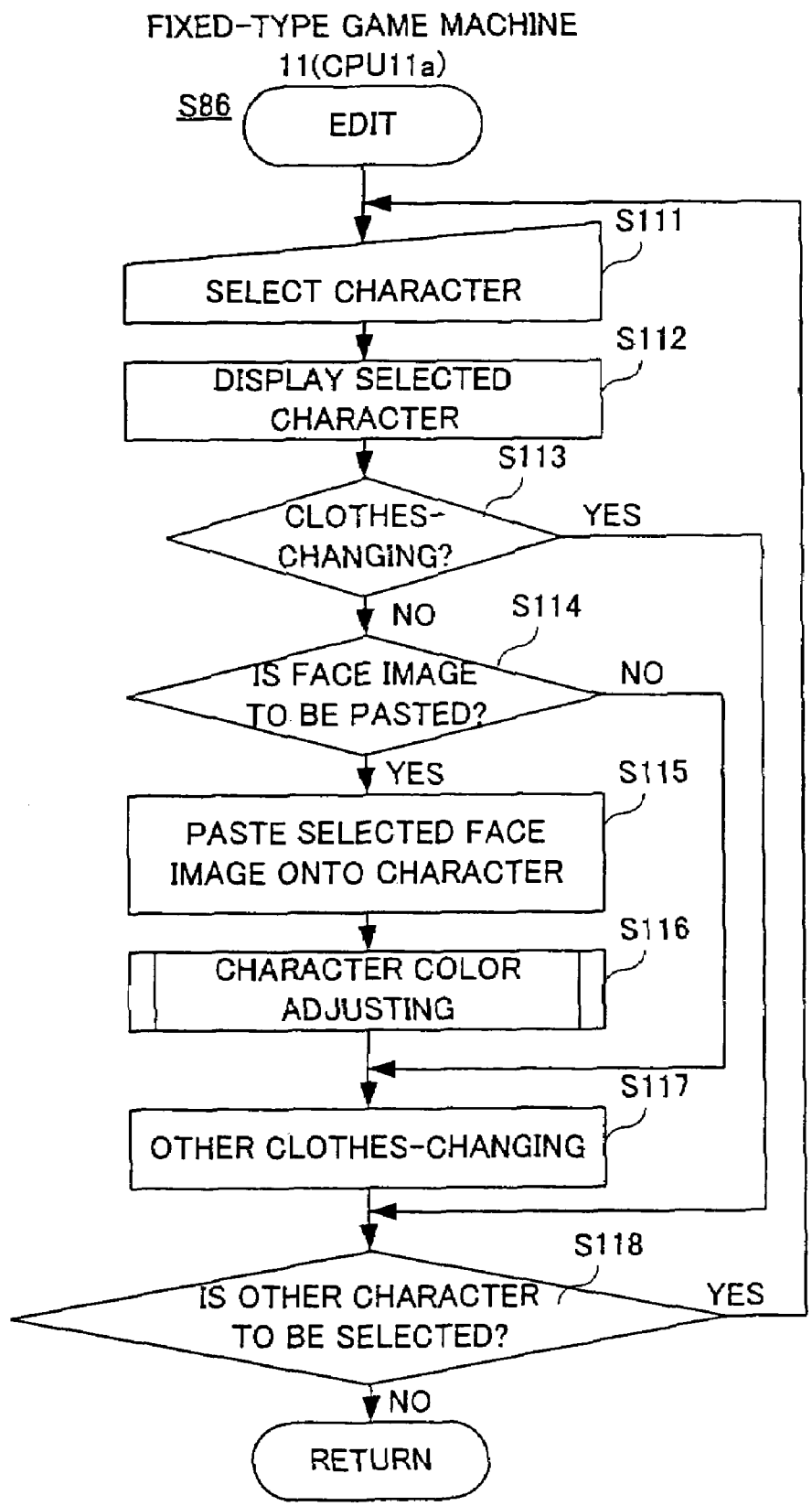
FIG. 23 is a flowchart showing an editing process of the fixed-type game machine shown in FIG. 16.

FIG. 23 is a flowchart showing the editing process (S86). In the editing process (S86), the face image of the generated character, the body portions such as the hair, the nose, etc., or its adjacent portions, the clothes, etc., can be changed. That is, it is possible to edit the default character 92 based on the data fetched from the card 23a. Therefore, it is possible to perform various editing functions such as pasting the face image of the game character to the character 92 of the famous person, pasting a region such as a head portion (head hair) of the game character to the region of the character 92 of the famous person, etc., for example. This allows the operator to produce an original character 92.

More specifically, upon starting the editing process (S86), although not illustrated, a character selection screen for selecting a created character 92 is displayed on the image display device 14. On the character selection screen, in step S111, the operator selects a desired character 92. In succeeding step S112, the selected character 92 is displayed. Then, in step S113, it is determined whether or not to perform clothes-changing such as a clothes, etc. It is noted that a case, in which a region of the body portions other than the face image is changed, is herein also included in the clothes-changing.

Herein, in a case of changing the clothes, the process directly advances to step S117. However, in a case of not changing the clothes, it is determined whether or not to paste the face image in step S114. In a case of not pasting the face image, the process directly advances to step S117. On the other hand, in a case of pasting the face image, the selected face image is pasted to the character in step S115. That is, it is possible to paste another face image onto the selected character 92.

In succeeding step S116, a character color adjustment process is executed, and in step S117, another clothes-changing process is executed. That is, wearing a hat, changing clothes, changing the body portions, etc., are performed. Then, in step S118, it is determined whether or not another character 92 is selected. Herein, in a case of selecting another character 92, the process returns to step S111 in order for the operator to select the character 92. However, in a case of not selecting another character 92, the process directly returns to the editing process.

It is noted that in the second embodiment, since the character color adjustment process executed in step S116 is the same as the actor color adjustment process 39 (see FIG. 13) shown in the first embodiment, detailed descriptions are herein omitted.

Figure 24:
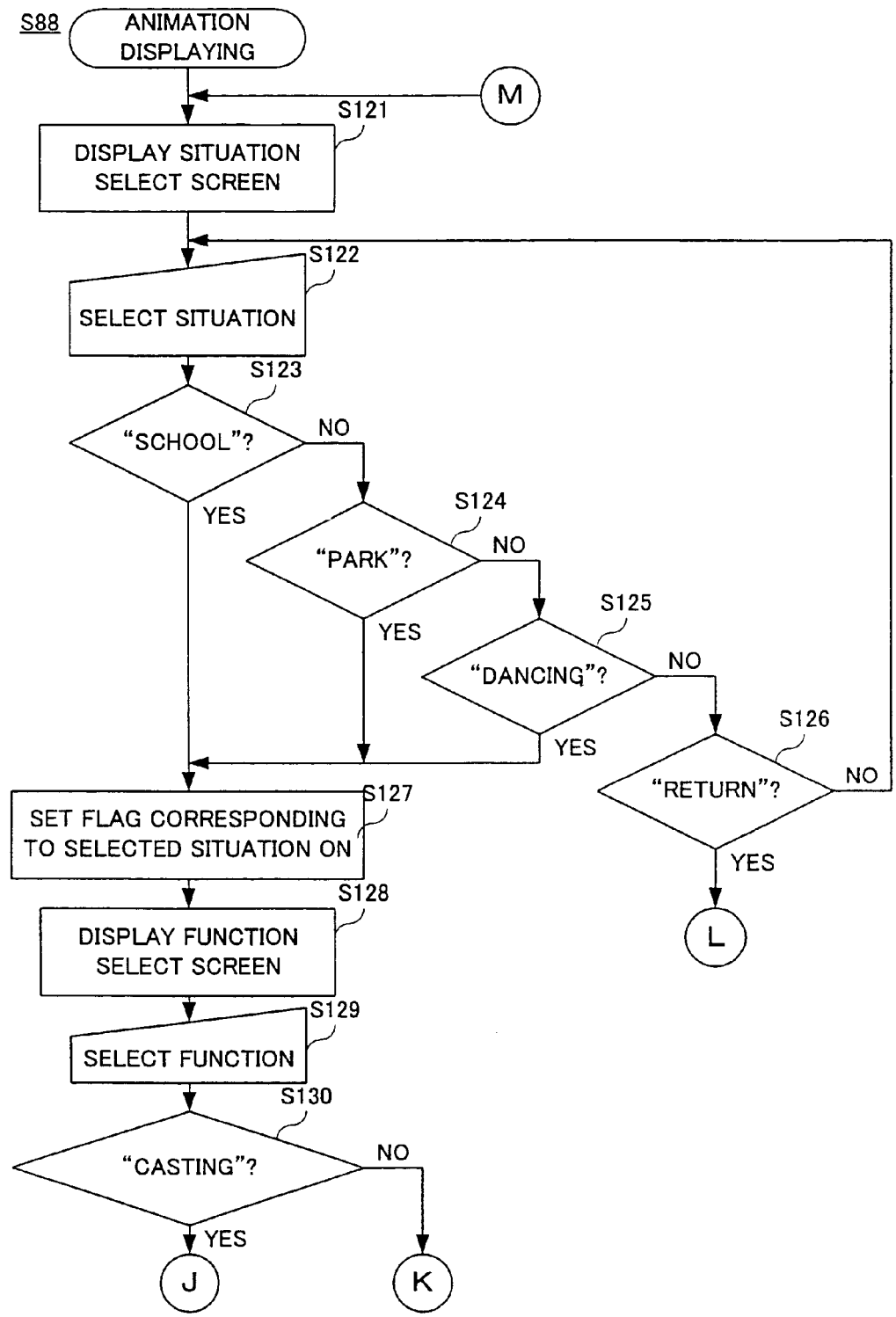
FIG. 24 is a flowchart showing one portion of an animation operation of the fixed-type game machine shown in FIG. 16.
Figure 25:
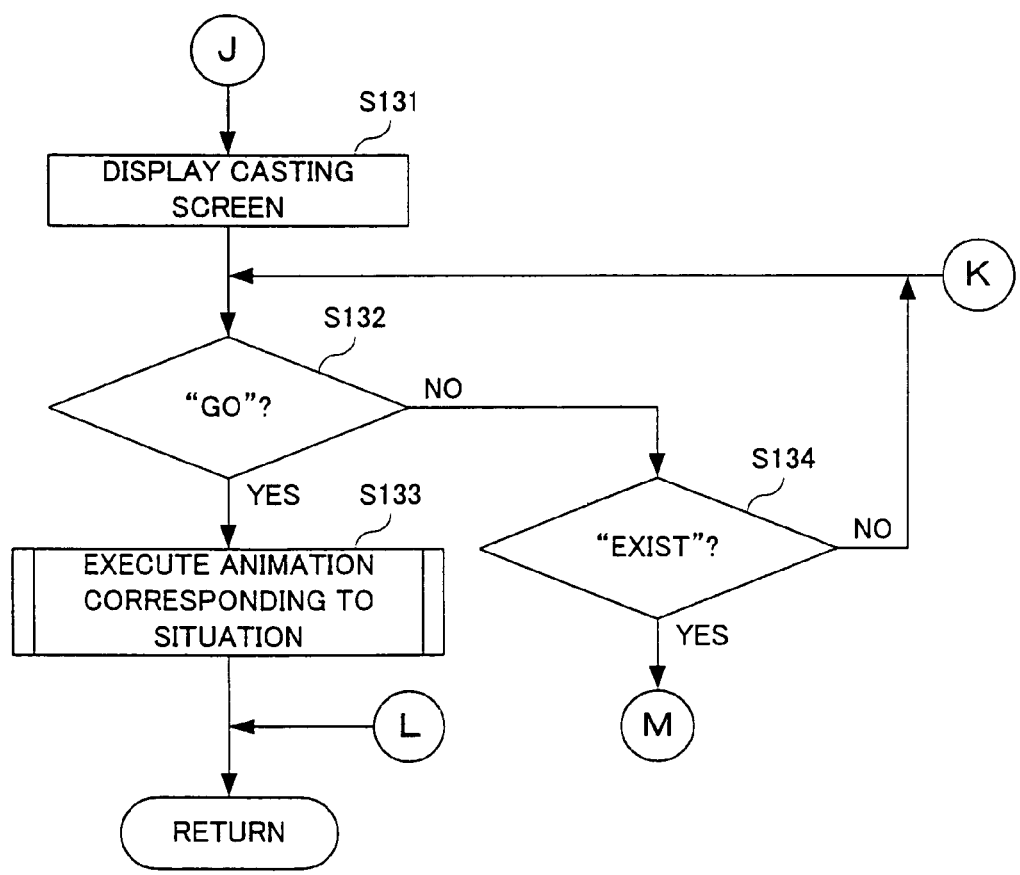
FIG. 25 is a flowchart showing another portion of the animation operation of the fixed-type game machine shown in FIG. 16.

FIG. 24 and FIG. 25 are flowcharts showing the animation displaying process (S88). As shown in FIG. 24, when starting the animation displaying process (S88), the CPU 11a displays a selection screen (not shown) of a situation on the image display device 14 in step S121. In the second embodiment, on the selection screen of the situation, it is possible to select any one of "school", "park" or "dance", for example. In addition, it is also possible to select "return" so as to return to the entire process of the application shown in FIG. 21.

In succeeding step S1122, the operator selects the situation. In succeeding step S123, it is determined whether or not "school" is selected. In case that "school" is selected as the situation, the process directly advances to step S127. However, in a case that "school" is not selected, it is determined whether or not "park" is selected in step S124.

Herein, in a case that "park" is selected as the situation, the process directly advances to step S127. However, in case "park" is not selected, it is determined whether or not "dance" is selected in step S125. In a case that "dance" is selected as the situation, the process directly advances to step S127. However, in a case that "dance" is not selected, it is determined whether or not "return" is selected in step S126. That is, it is determined whether or not to return to the process shown in FIG. 21.

Herein, in a case that "return" is not selected, the process directly returns to step S1122, determining that the operator has not yet selected the situation. However, in a case that "return" is selected, the process directly returns an execution process of the animation, and then returns to the entire process of the application shown in FIG. 21.

In step S127, a flag in accordance with the selected situation (situation flag) is turned-on (set). The situation flag is a register having the same number of bits (in the second embodiment, 3 bits) as the number of situations, for example, and the corresponding situations are previously determined to the respective bits. A data value of the bit having the corresponding situation not selected is "0", and when the corresponding situation is selected, the data value of the bit is rendered "1".

It is noted that although not illustrated in FIG. 20, the situation flag is stored in the data storing area 51 of the RAM 11.

In succeeding step S128, the selection screen of a function (not shown) is displayed on the image display device 14. The selection screen of the function allows to select to set (character set) a cast (character 92) who participates in the selected situation, select an execution of the animation, etc. Next, in step S129, the operator selects the function. Then, in step S130, it is determined whether or not "cast selection" is selected. Herein, in a case that "cast selection" is not selected, the process directly advances to step S132 shown in FIG. 25. However, in a case that "cast selection" is selected, a case setting screen 100 as shown in FIG. 30 is displayed on the image display device 14 in step S131 shown in FIG. 25, and then, the process advances to step S132.

Figure 30:
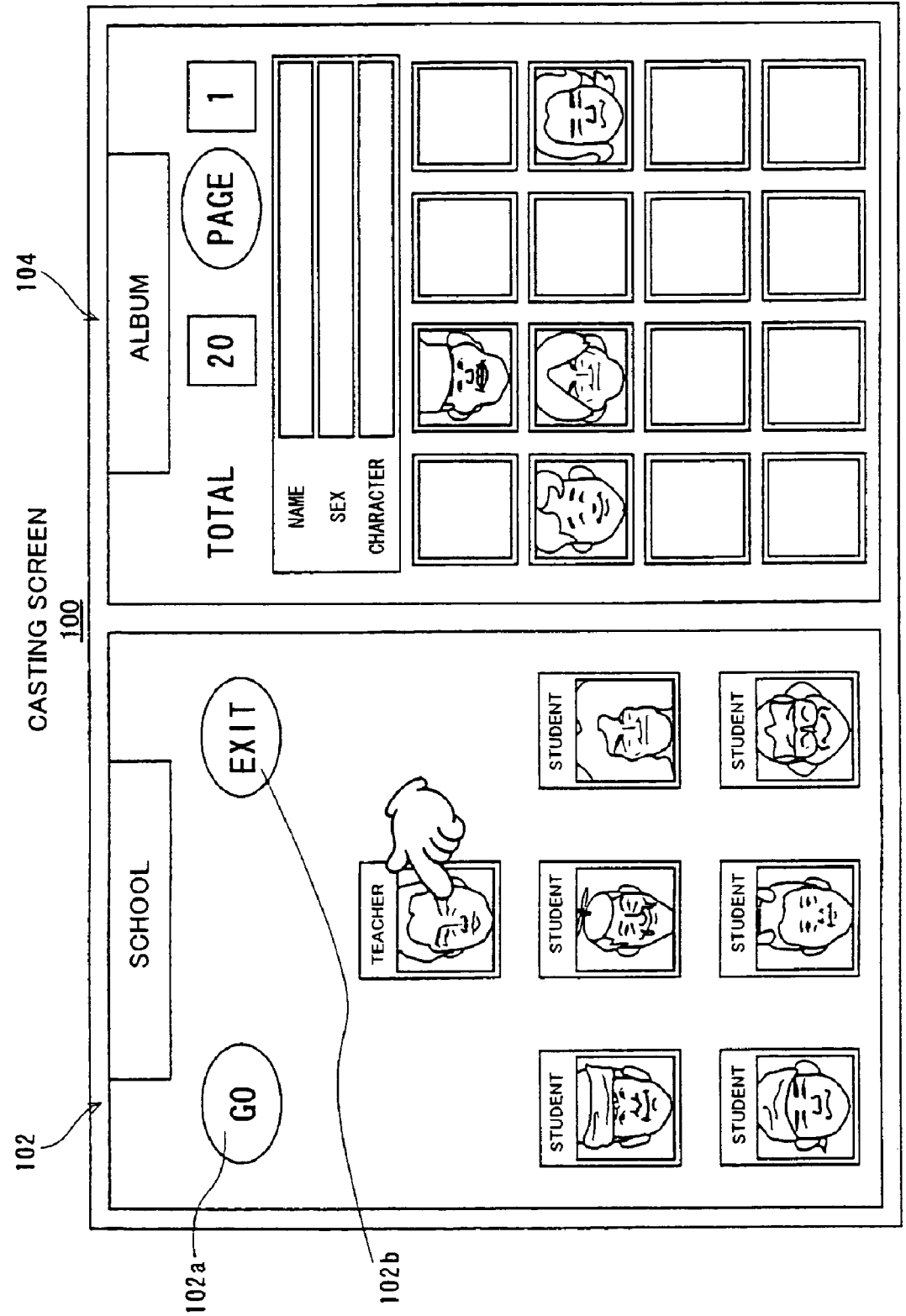
FIG. 30 is an illustrative view showing one example of a cast setting screen.

The cast setting screen 100 shown in FIG. 30 is a screen of a case that "school" is selected (set) as the situation. The cast setting screen 100 is constituted of a setting screen 102 for setting the cast, and a character selection screen 104 for selecting the character 92. Furthermore, at an upper portion of the setting screen 102, a "GO" button 102a, and an "EXIT" button 102b are provided.

On the cast setting screen 100, a reduced face image regarding the produced character 92 is displayed on the character selection screen 104, a role of a teacher and a role of a student as the cast are selected from the character selection screen 104 so as to be set to the setting screen. In addition, an alignment of the teacher and the student on the setting screen 102 represents a chair alignment when the animation is executed. That is, in addition to setting the cast, it is also possible to select the chair alignment. In a case of setting the cast, and executing the animation, the operator turns on the "GO" button 102a. On the other hand, in a case of suspending (interrupting) the setting of the cast, and returning to the selection screen of the situation, the "EXIT" button 102a is depressed.

Returning to FIG. 25, in step S132, it is determined whether or not the "GO" button 102a is turned on in the cast setting screen 100. That is, it is determined whether or not the operator has instructed to execute the animation. In a case that the "GO" button 102a is turned on, the process executes an animation execution process (see FIG. 26, FIG. 27) in accordance with to the situation in step S133, and returns the animation displaying process.

However, in case that the "GO" button 102a is not turned on, it is determined whether or not the "EXIT" button 102b is turned on in the cast setting screen in step S134. That is, it is determined whether or not the operator has instructed to withdraw from the selection screen of the function. Herein, in a case that the "EXIT" button 102b is not turned on, the process returns to step S132, determining that the setting of the cast is not ended. However, in a case that the "EXIT" button 102b is turned on, the process returns to step S1121 shown in FIG. 24 so as to display the selection screen of the situation on the image display device 14.

Figure 26:
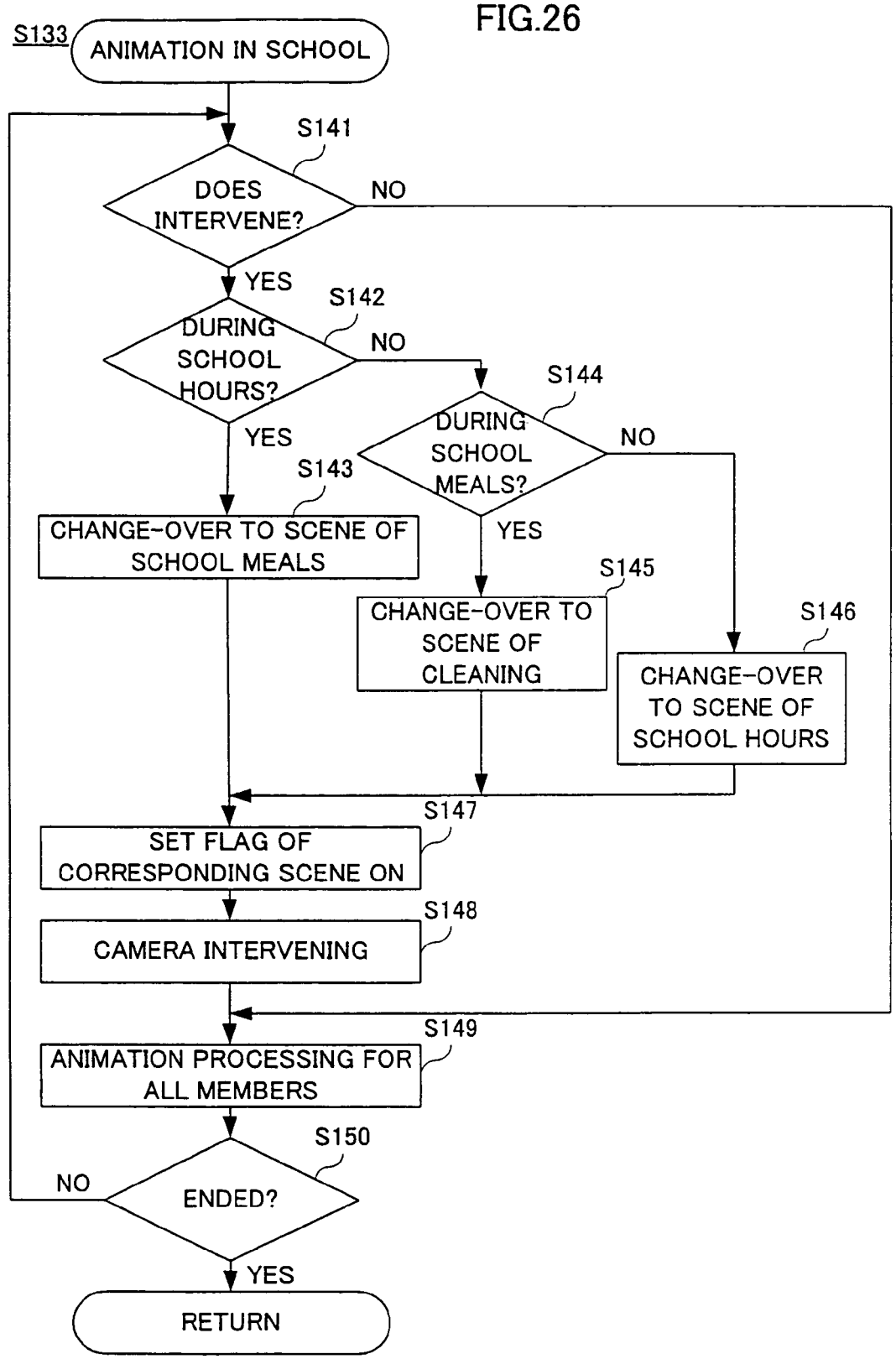
FIG. 26 is a flowchart showing an execution process of an animation at a park of the fixed-type game machine shown in FIG. 16.

FIG. 26 is a flowchart showing the animation execution process (S133) of a case that "school" is selected as the situation. As shown in FIG. 26, when the CPU 11a of the fixed-type game machine 11 starts the animation execution process (S133) of the school, it is determined whether or not to intervene in the situation in step S141. Herein, "intervene" means that the character corresponding to the operator, with a camera, intrudes into a scene in a virtual space in the situation, for example. In addition, in a case of intervening, the scene is changed according to a predetermined rule. That is, in step S141, it is determined whether or not the operator inputs the instruction to intervene. Herein, in a case of not intervening, the process directly advances to step S149. However, in a case of intervening, it is determined whether or not the current scene is "during school hours" in step S142.

It is noted that a scene determination is easily executed based on a scene flag described later.

Figure 31:
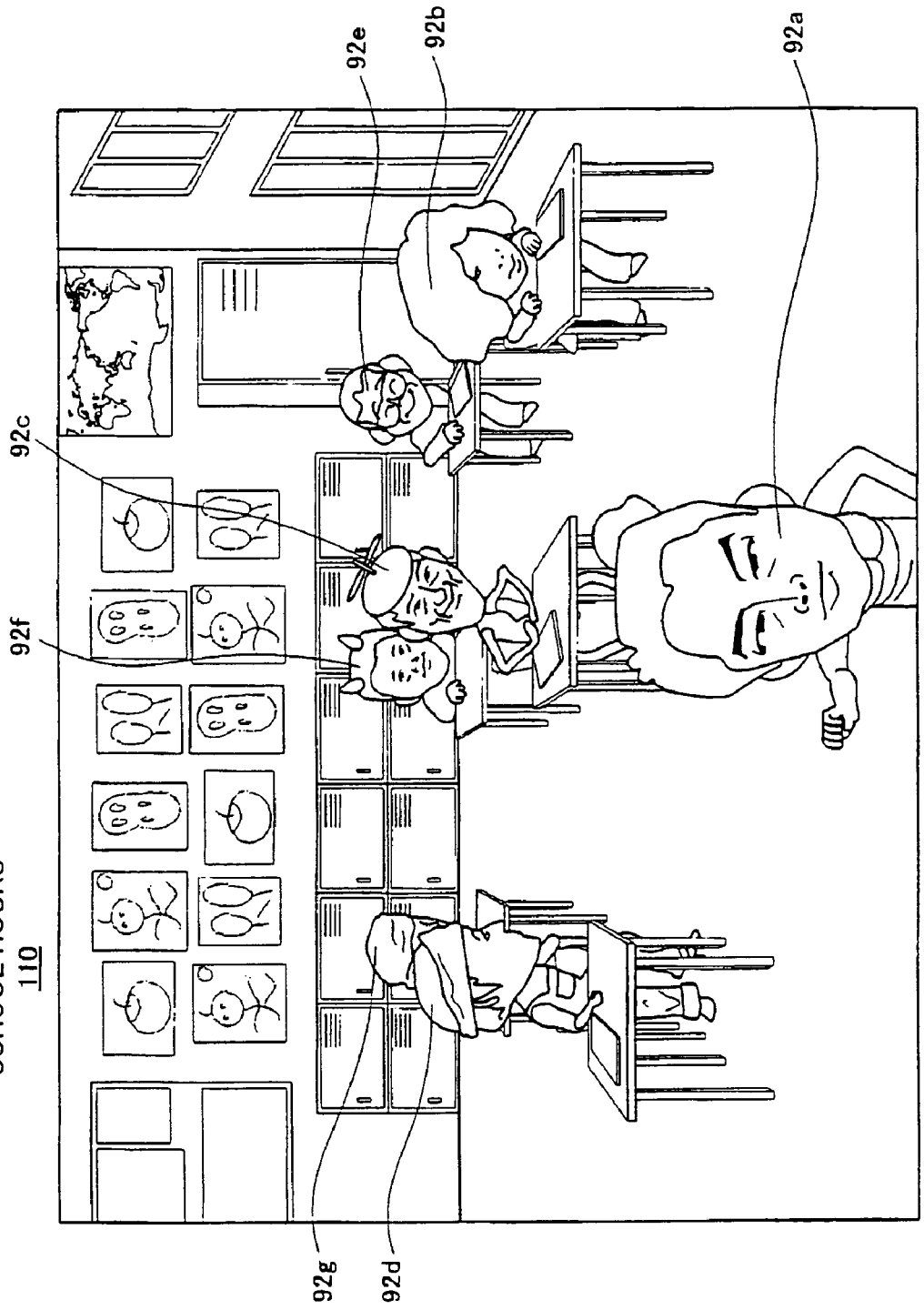
FIG. 31 is an illustrative view showing one example of an animation display screen in class at school.

In a case that the current scene is "during school hours", the process changes (moves) to the scene of "school meals" in step S143, and then, advances to step S147. In the scene of the during school hours, an animation display screen 110 of the during school hours as shown in FIG. 31 is displayed on the image display device 14, and on the display screen 110, a situation of school hours in a classroom is animation-displayed. As shown in FIG. 31, during the school hours, characters 92a-92g are arranged by the cast set on the cast setting screen 100. The character 92a plays the teacher role, and an animation in which a class is held is executed by a process in step S149 described later. The other characters 92b-92g play the student role, sit on the chairs set on the cast setting screen 100, and an animation in which to participate in a class is executed by the process in step S149 described later.

Figure 32:
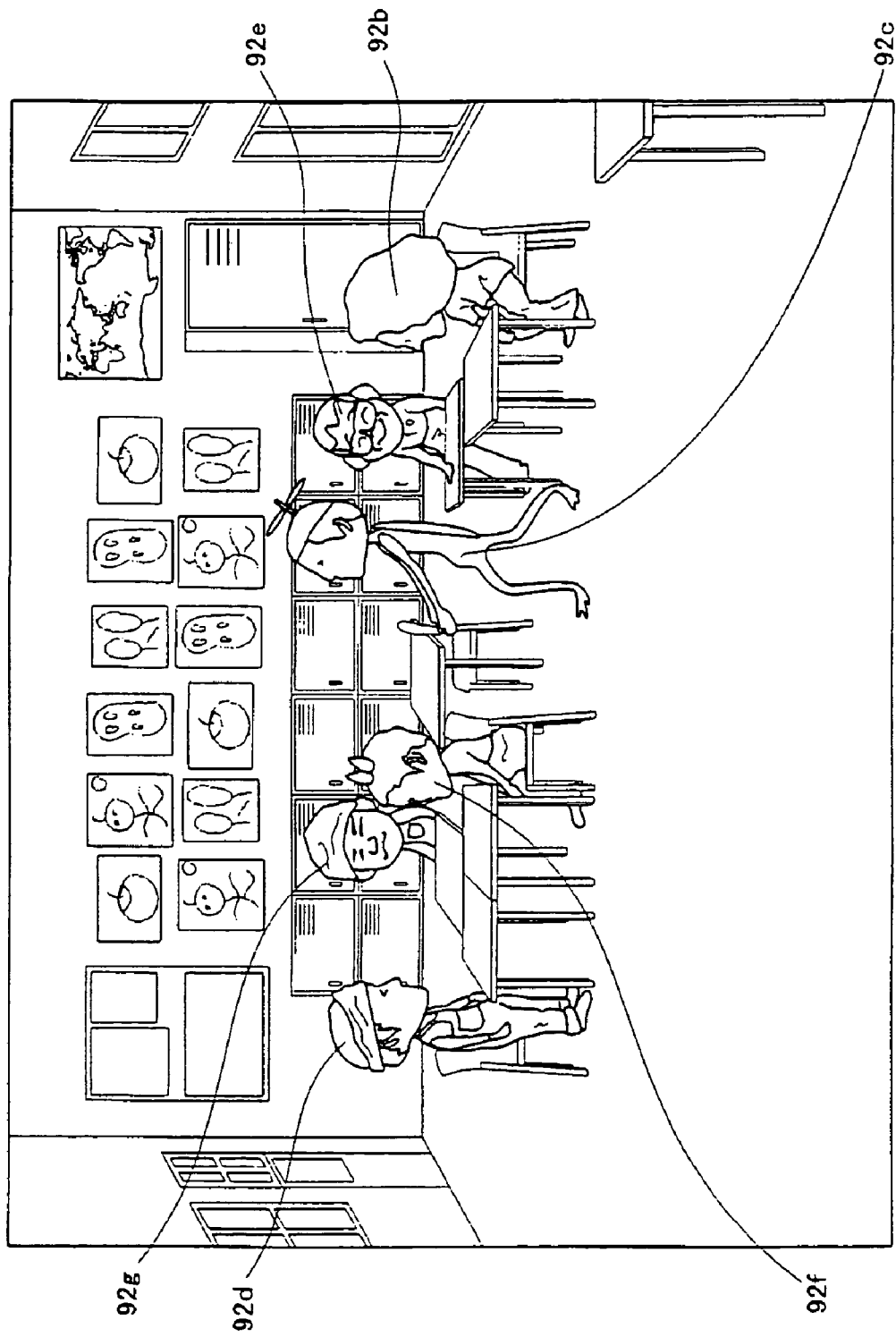
FIG. 32 is an illustrative view showing one example of the animation display screen when a school meal is being prepared at school.

Herein, if the operator intervenes, an animation display screen 120 in which the school meal is prepared is displayed on the image display device 14 as shown in FIG. 32. On the display screen 120, the characters 92b-92g who play the student role move their own tables and chairs, change the alignment of the tables, and then set for preparing the school meal so as to eat the school meal in a group unit. This animation is to be executed in step S143.

Figure 33:
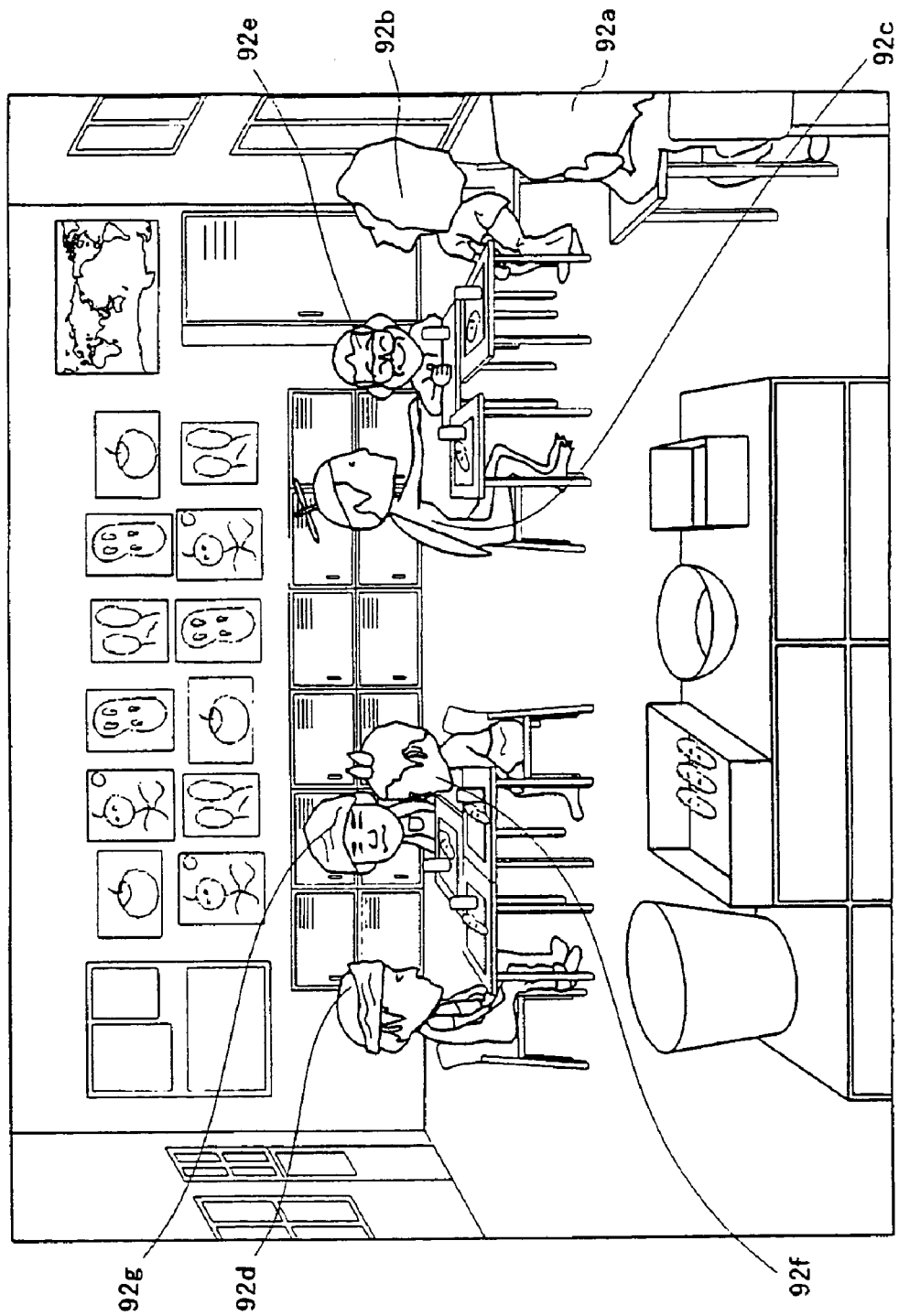
FIG. 33 is an illustrative view showing one example of the animation display screen when the school meal is being served at school.

Returning to FIG. 26, in case the current scene is not "during class hours", it is determined whether or not the current scene is "during school meals" in step S144. If the current scene is "during school meals", the process moves to the scene of "cleaning" in step S145, and then advances to step S147. In the scene of the during school meals, the animation display screen 130 of the during the school meals as shown in FIG. 33 is displayed on the image display device 14. On the display screen 130, an animation of the situation in which the school meal is being eaten in a classroom is executed in the character 92s who plays the teacher role, and the characters 92b-92g who play the student role, respectively, by a process in step S149 described later.

Figure 34:
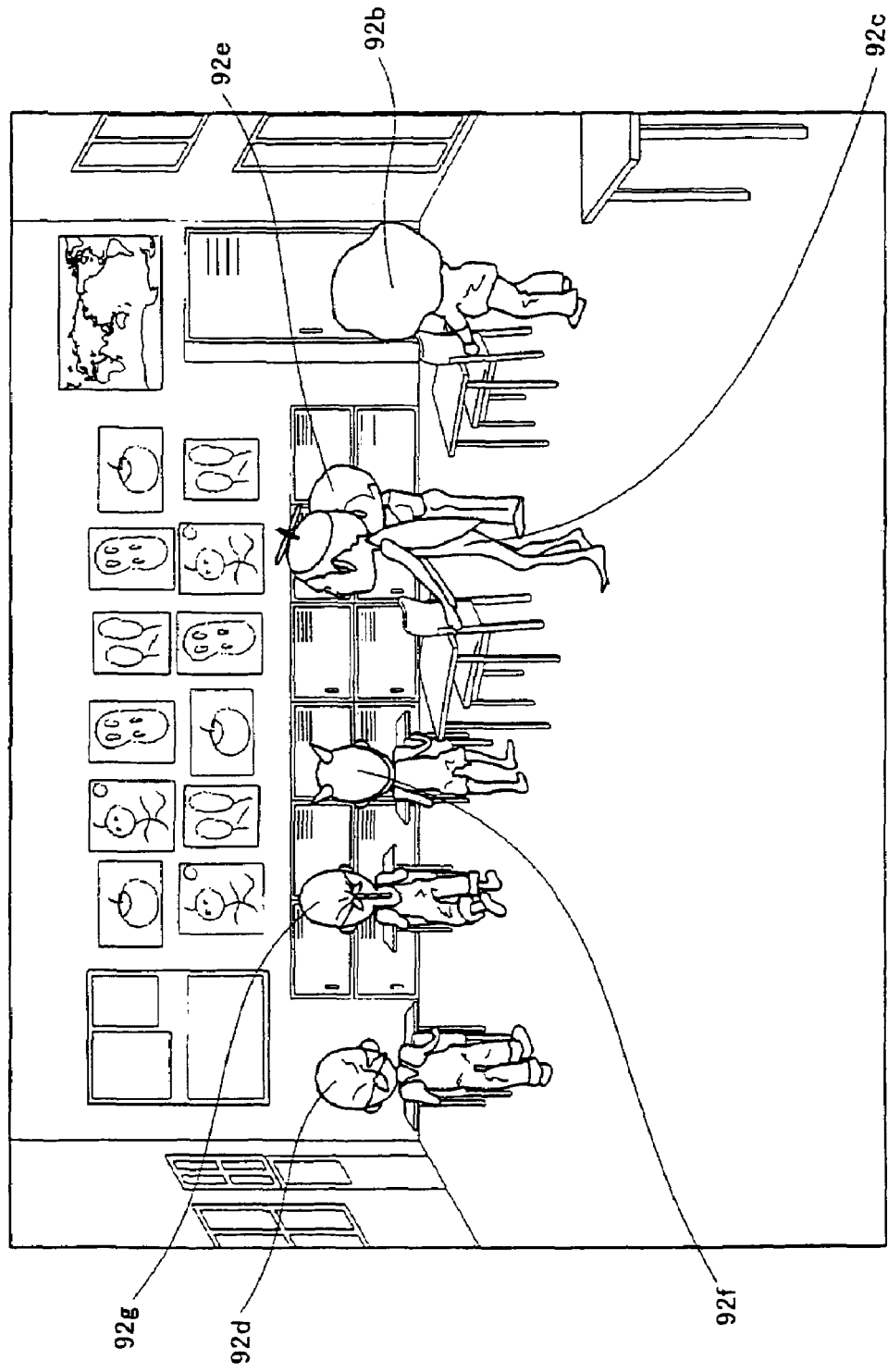
FIG. 34 is an illustrative view showing one example of the animation display screen when a cleaning is being prepared at school.

Herein, if the operator intervenes, although not illustrated, after an animation in which to clear the school meal is executed, an animation display screen 140 in which to prepare for a cleaning as shown in FIG. 34 is displayed on the image display device 14. On the display screen 140, the characters 92b-92g who play the student role move their own tables, and chairs toward a rear of the classroom so as to start cleaning. This animation is executed in step S145.

Figure 35:
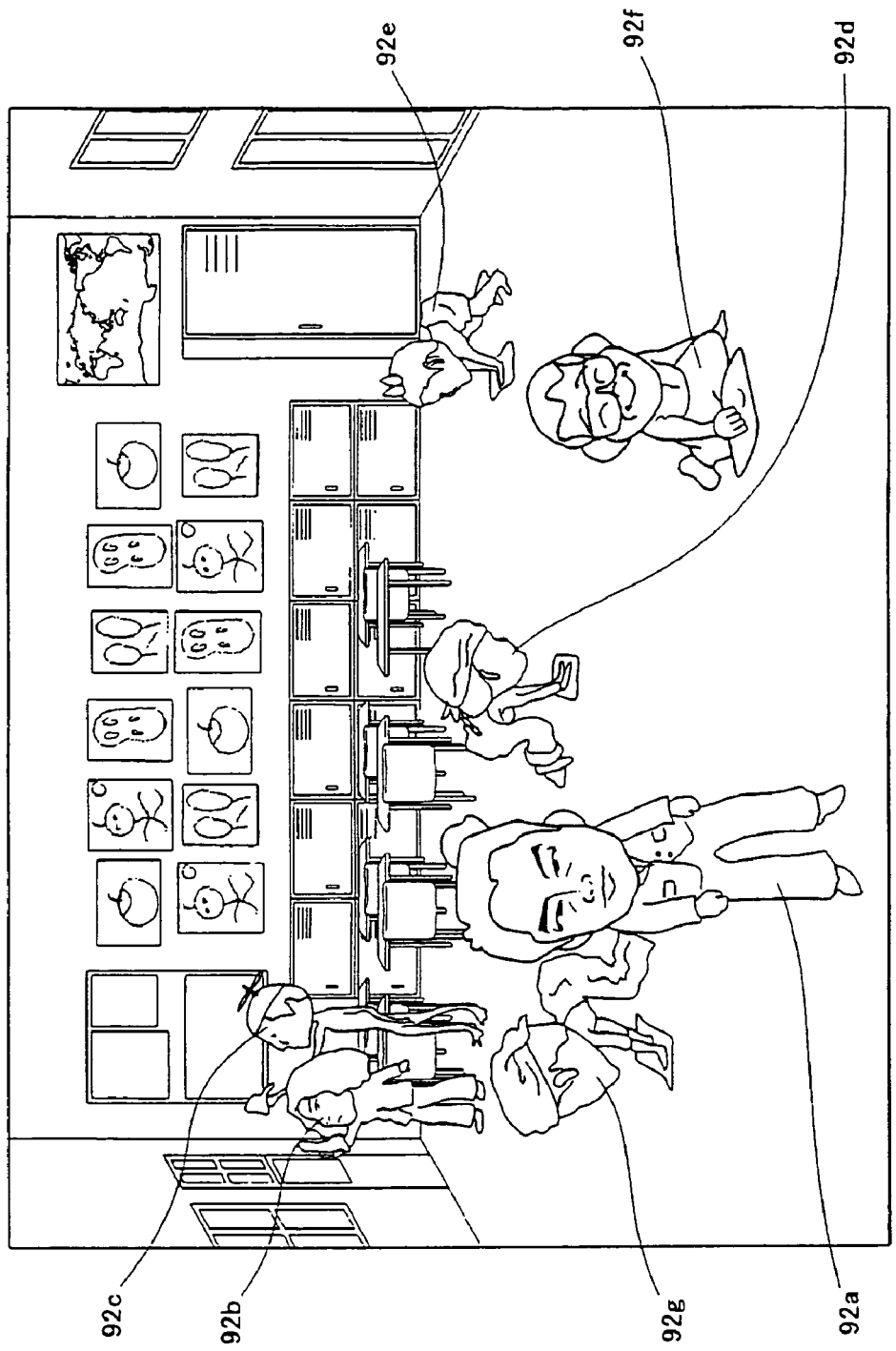
FIG. 35 is an illustrative view showing one example of the animation display screen when the cleaning is being operated at school.

Returning to FIG. 26, in case the current scene is not "during school meals", the process determines that the current scene is "cleaning", and moves to the scene of "school hours" in step S146 before advancing to step S147. In the scene of cleaning, an animation display screen 150 of cleaning as shown in FIG. 35 is displayed on the image display device 14. On the display screen 150, the characters 92b-92g who play the student role clean in their own role, and the character 92a who plays the teacher role watches the situation of the cleaning. This animation is executed in step S1149 described later.

Herein, if the operator intervenes, although not illustrated, in the character 92a-92g who play the student role, an animation, in which cleaning tools are put away, and the tables are restored to the alignment of the scene of the school hours, is executed, the scene is moved to the school hours, and the animation display screen 110 of the during class hours as shown in FIG. 31 is displayed on the image display device 14. This animation is executed in step S146.

In step S147, the flag of the corresponding scene (scene flag) is set (turned on). Herein, the scene flag is constituted of a register having the number of bits (in the second embodiment, 3) corresponding to the number of the scenes (during class hours, during school meals, and cleaning). The corresponding scene is previously set to each bit. If the scene is not set, the data value of the corresponding bit is "0", and if the scene is set, the data value of the corresponding bit is rendered "1".

It is noted that although not illustrated in FIG. 20, the scene flag is stored in the data storing area 51 of the RAM 11.

In succeeding step S148, a camera intervention process is executed. That is, the character (not shown) corresponding to the operator, with a camera, intrudes (intervenes) into the situation. Although not illustrated, when the character corresponding to the operator intervenes into the scene, it becomes possible to photograph an image inside the scene by an angle or a magnification in accordance with an operation of the operator, and the photographed image is displayed on the image display device 14. Then, in step S149, the animation process of all members is executed. That is, in the scene set to the scene flag, an expression, a gesture, a hand signal, and an action of the character to be appeared are expressed by the animation.

During the class hours, for example, as shown in FIG. 31, the animation showing a situation in which the class is held in the classroom is executed, and the character 92a who plays the teacher role writes a letter toward a blackboard, points his finger at the characters 92b-92g who play the student role, etc. The characters 92b-92g who play the student role listen to the class, read a book, etc. That is, each of the characters 92a-92g executes the animation previously assigned to the role. It is noted that a point in which even if the role is the same, the animation is automatically selected depending upon the personality of the character 92a, and then, executed is the same as in the first embodiment.

In addition, in a case that the character corresponding to the operator intervenes into the situation, and any one of the desired characters 92a-92g is photographed according to an instruction of the operator, an animation in which the characters to be photographed (92a-92g) face toward the camera, show their gesture toward the camera, etc., is also executed.

Then, in step S150, it is determined whether or not to end the animation execution process of the school. That is, it is determined whether or not the operator has input an end instruction. Herein, in a case of not ending, the process directly returns to step S141. However, in a case of ending, the process returns the animation execution process of school.

Figure 27:
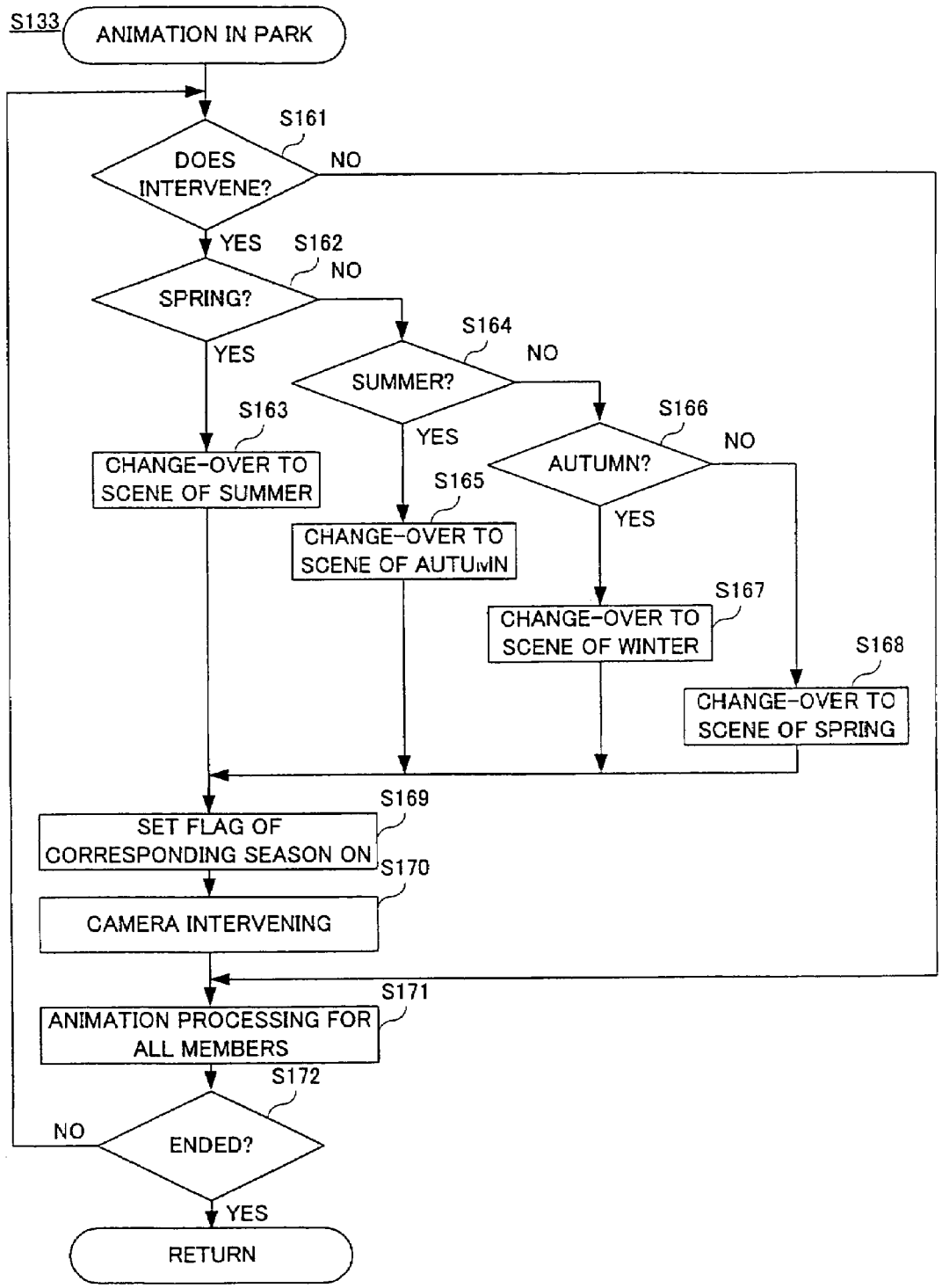
FIG. 27 is a flowchart showing an execution process of an animation at a school of the fixed-type game machine shown in FIG. 16.

FIG. 27 is a flowchart showing an animation execution process (S133) of a case that "park" is selected as the situation. The animation execution process of the park is approximately the same as the above-described animation execution process of the school, and therefore, duplicated contents are briefly described. As shown in FIG. 27, when the CPU 11a of the fixed-type game machine 11 starts the animation execution process (S133) of the park, it is determined whether or not to intervene into the situation in step S161. That is, it is determined whether or not the operator inputs an intervention instruction.

Herein, in a case of not intervening, the process directly advances to step S171. However, in a case of intervening, it is determined whether or not the current scene is "spring" in the situation in step S162. A determination of a season is executed based on a season flag described later.

Figure 36:
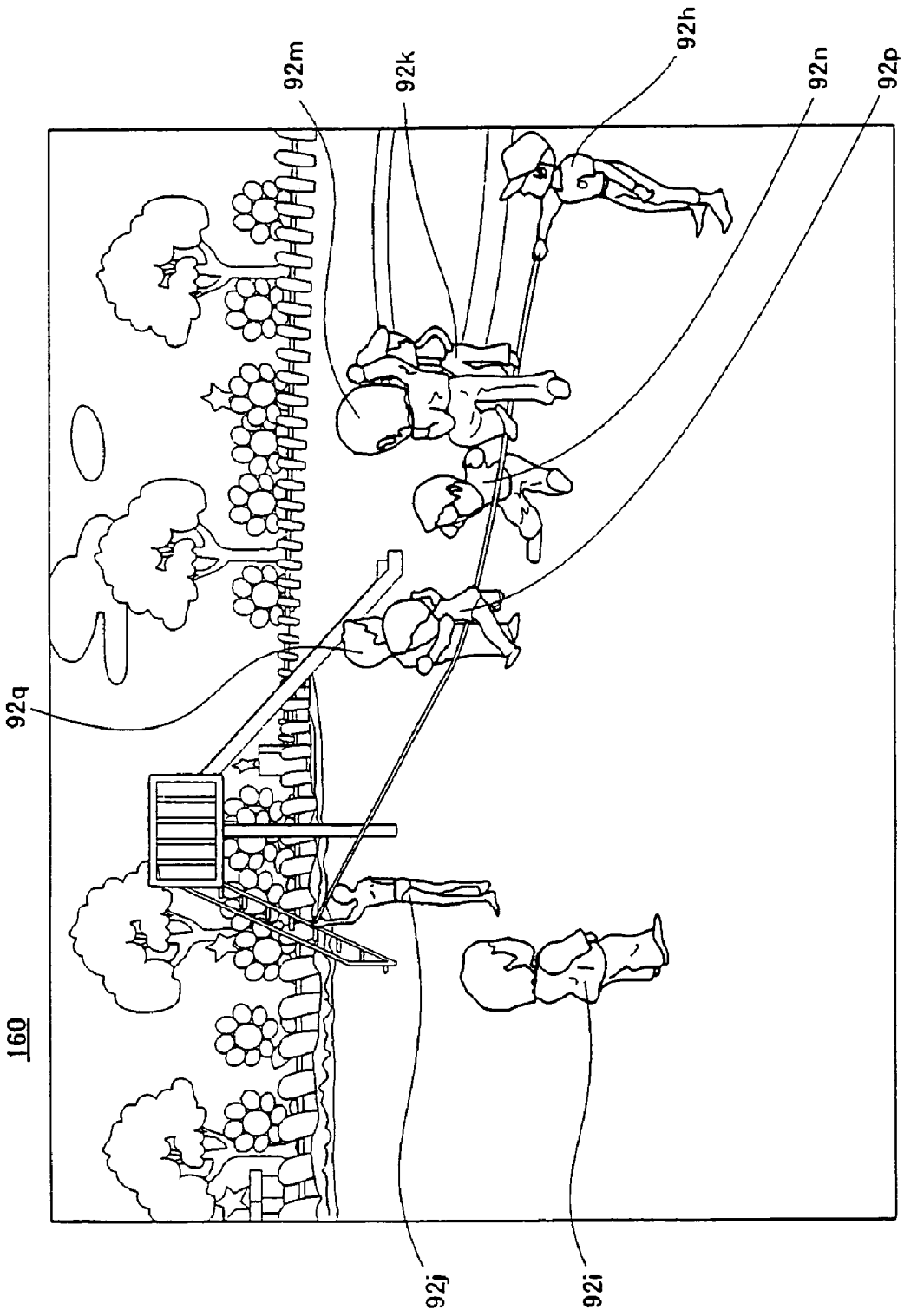
FIG. 36 is an illustrative view showing one example of the animation display screen in spring at a park.

In a case of the current scene is "spring", the process moves the scene to "summer" in step S163, and then, advances to step S169. In the scene of "spring", for example, an animation display screen 160 of the spring as shown in FIG. 36 is displayed on the image display device 14, and a situation in which a jump-roping is played in the park or the situation to see such the situation is animation-displayed, for example.

Characters 92h, 92i, 92, 92k, 92m, 92n, 92p, and 92q executes the animation according to the role similar to a case of the situation being the school. The animation is executed in step S171 described later. Although not illustrated, in the cast setting screen of the situation of the park, a school year, an age, a leader in a company for playing, etc., are set. In addition, in the characters 92h, 92i, 92, 92k, 92m, 92n, 92p, and 92q, the animation corresponding to the set cast (role) is executed, and furthermore, the animation corresponding to the personality of the respective characters is automatically selected, and then executed. This point is the same as in a case that the situation of the school is set.

Herein, in a case that the operator intervenes, although not illustrated, the scene is moved to "summer", which displays cumulonimbus clouds in a background, a locust rested on a tree, etc., for example. The animation of the situation in which such the background, and others change are executed in step S163. In addition, in the scene of the summer, in the characters 92h, 92i, 92j, 92k, 92m, 92n, 92p, and 92q, the animation, in which the locust is caught by a net, water from a fountain provided in the park is spread to each other for a purpose of fan, is executed in step S171 described later.

Returning to FIG. 27, if the current scene is not "spring", it is determined whether or not the current scene is "summer" in step S164. Herein, in a case that the current scene is "summer", the process moves to a scene of "autumn" in step S165 before advancing to step S169.

Figure 37:
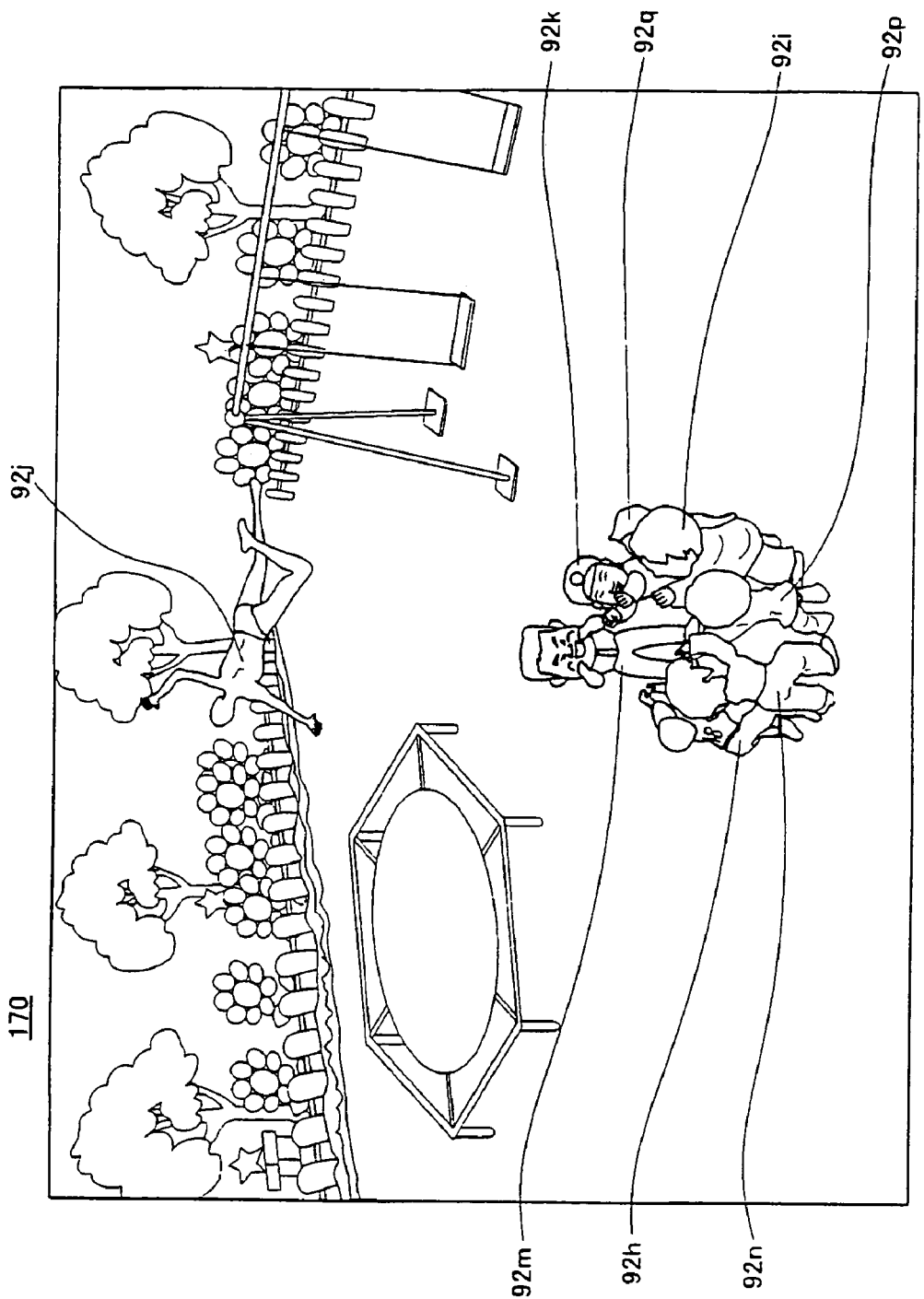
FIG. 37 is an illustrative view showing one example of the animation display screen in autumn at a park.

In the scene of the above-described summer, if the operator intervenes, an animation display screen 170 of autumn as shown in FIG. 37 is displayed on the image display device 14. Although not possible to express, in a case of moving to the scene of the autumn, a change is made in such a manner that the background is described by a sunset sky, and trees are turned into a shallow red, etc., for example. This animation is executed in step S165. Furthermore, on the display screen 170 shown in FIG. 37, an animation of a situation, in which a human body is thrown into a sky in celebration, is executed, for example. That is, the character 92j is thrown into the sky, and other characters 92h, 92i, 92, 92k, 92m, 92n, 92p, and 92q throw the character 92j into the sky.

Returning to FIG. 27, in a case that the current scene is not "summer", it is determined whether or not the current scene is "autumn" in step S1166. If the current scene is not "autumn", the process moves to the scene of "spring" in step S168, determining that the current scene is "winter", and then advances to step S169. However, if the current scene is "autumn", the process moves to the scene of "winter" before advancing to step S169.

That is, when the scene of autumn as shown in FIG. 37 is displayed, and the operator intervenes, although not illustrated, the scene is moved to the winter, which shows a situation that all of leaves of the trees are fallen in the background, and it snows, for example. This animation is executed in step S1167. In addition, in the characters 92h, 92i, 92j, 92k, 92m, 92n, 92p, and 92q, an animation of the situation of a snowball fight is executed in step S1171 described later, for example. In the scene of the winter, when the operator intervenes, the scene is moved to the spring shown in FIG. 36.

Returning to FIG. 27, in step S169, the flag corresponding to the current season (season flag) is set (turned on). Although not illustrated, the season flag is the same as the above-described scene flag, and constituted of a register having the number of bits according to four seasons (four bits). Corresponding seasons (period) are previously set to the respective bits, the data value of the bit corresponding to the season not set to the current scene is "0", and the data value of the bit corresponding to the season set to the current scene is "1".

It is noted that although not illustrated in FIG. 20, the season flag is stored in the data storing area 51 of the RAM 11.

In succeeding step S1170, the camera intervention process is executed, and in step S171, the animation process of the all members is executed. That is, in the season set to the season flag, an expression, a gesture, a hand signal, and an action of the character to be appeared are expressed by the animation. As shown in FIG. 36, if the season is in spring, in addition to displaying a background of the park corresponding to the season (scenery), an animation in which a plurality of characters play a jump-roping in the park, an animation to see a situation of the jump-roping, etc., are executed.

It is noted that as described above, when the operator intervenes into the scene, and the operator photographs the desired character, an animation in which the photographed character faces toward the camera, etc., are also executed.

Furthermore, in step S172, it is determined whether or not to end the animation execution process of the park. That is, it is determined whether or not the operator has input an end instruction. Herein, in a case of not ending, the process directly returns to step S161. On the other hand, in a case of ending, the process returns the animation execution process of the park.

It is noted that although detailed descriptions are omitted, an animation execution process of a dance is the same as the animation execution process of the above-described "park" or "school". In addition, regarding an animation execution process of the dance, its descriptions are briefly made in the first embodiment.

According to the second embodiment, it is possible to produce the character based on the image data and the image feature data obtained from the card, and allow the produced character to execute the animation in various situations. That is, as a result of preparing cards regarding various famous persons, the game character, and the animation character, it becomes possible to enjoy seeing various characters move, thus increasing the entertainment of the image process.

In addition, it is possible to edit the default character based on the data read from the card so as to be edited to the unique character.

It is noted that in the second embodiment, three situations are rendered selectable. However, at least one situation may be selectable, and in addition, more than four situations may be prepared.

Furthermore, in the second embodiment, although descriptions are made only regarding a case of producing the character based on the data read from the card 23a, it may be possible to add the character produced based on the imaging data and the object feature data as shown in the first embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An external storage device detachably attached to a hand-held type game machine provided at least with a data transmitter for transmitting data to an image composing apparatus, comprising:
   face image fetching programmed logic circuitry for fetching face image data;
   feature data fetching programmed logic circuitry for fetching feature data associated with the face image corresponding to said face image data; and
   data storing programmed logic circuitry for storing said face image data and said feature data in a manner that the both data are associated with each other,
   wherein the feature data is used by the image composing apparatus for image composition processing.

2. An external storage device detachably attached to a hand-held type game machine provided at least with photographing processing programmed logic circuitry for executing a photographing process in accordance with a photographing instruction by an operator, image displaying programmed logic circuitry for displaying at least an image of an object during when the photographing process is being executed by said photographing processing programmed logic circuitry, and object feature data inputting programmed logic circuitry for inputting object feature data representing a feature of the object corresponding to the imaging data fetched as a result of the photographing process by said photographing processing programmed logic circuitry, comprising:
   imaging programmed logic circuitry for imaging or photographing the object so as to generate the imaging data; and
   data storing programmed logic circuitry for associating, and storing the imaging data generated by said imaging programmed logic circuitry and the object feature data input by said object feature data inputting programmed logic circuitry,
   wherein the object feature data is used by the image composing apparatus for image composition processing.

3. An external storage device according to claim 2, further comprising a photographing process executing a program for executing said photographing process, and a program storing medium for storing an imaging index displaying program for displaying on said image displaying programmed logic circuitry an imaging index for setting an image of the object to a desired location when said photographing process is being executed.

4. A hand-held type game machine including an external storage device detachably attached thereto, the hand-held type game machine including at least a data transmitter for transmitting data to an image composing apparatus, the external storage device comprising:
   face image fetching programmed logic circuitry for fetching face image data;
   feature data fetching programmed logic circuitry for fetching feature data associated with the face image corresponding to said face image data; and
   data storing programmed logic circuitry for storing said face image data and said feature data in a manner that the both data are associated with each other,
   wherein the feature data is used by the image composing apparatus for image composition processing.

5. A hand-held type game machine including an external storage device detachably attached thereto, the hand-held type game machine comprising:
   photographing processing programmed logic circuitry for executing a photographing process in accordance with a photographing instruction by an operator;
   image displaying programmed logic circuitry for displaying at least an image of an object during when the photographing process is being executed by said photographing processing programmed logic circuitry; and
   object feature data inputting programmed logic circuitry for inputting object feature data representing a feature of the object corresponding to the imaging data fetched as a result of the photographing process by said photographing processing programmed logic circuitry, wherein said external storage device comprises (1) imaging programmed logic circuitry for imaging or photographing the object so as to generate the imaging data, and (2) data storing programmed logic circuitry for associating, and storing the imaging data generated by said imaging programmed logic circuitry and the object feature data input by said object feature data inputting programmed logic circuitry, and wherein the object feature data is used by the image composing apparatus for image composition processing.

6. A hand-held type game machine according to claim 5, wherein the external storage device further comprises a photographing process executing a program for executing said photographing process, and a program storing medium for storing an imaging index displaying program for displaying on said image displaying programmed logic circuitry an imaging index for setting an image of the object to a desired location when said photographing process is being executed.

7. In an external storage device detachably attached to a hand-held type game machine provided at least with a data transmitter for transmitting data to an image composing apparatus, a method comprising:
fetching face image data via face image fetching programmed logic circuitry;
fetching feature data associated with the face image corresponding to said face image data via feature data fetching programmed logic circuitry;
storing said face image data and said feature data in a manner that the both data are associated with each other via data storing; and
performing image composition processing using the feature data.

8. A method according to claim 7, further comprising:
identifying a visual attribute from within the face image data based on user input; and
storing an association between the attribute and the face image data.

9. A method according to claim 7, wherein the feature data represents at least one aspect of the associated face or object, including one or more of: a gender, a body shape, a personality, and an age.

10. In an external storage device detachably attached to a hand-held type game machine provided at least with photographing processing programmed logic circuitry for executing a photographing process in accordance with a photographing instruction by an operator, image displaying programmed logic circuitry for displaying at least an image of an object during when the photographing process is being executed by said photographing processing programmed logic circuitry, and object feature data inputting programmed logic circuitry for inputting object feature data representing a feature of the object corresponding to the imaging data fetched as a result of the photographing process by said photographing processing programmed logic circuitry, a method comprising:
imaging or photographing the object so as to generate the imaging data;
associating and storing the generated imaging data and the object feature data input by said object feature data inputting programmed logic circuitry; and
performing image composition processing using the feature data.

* * * * *